United States Patent [19]

Daitoku et al.

[11] Patent Number: 5,606,383
[45] Date of Patent: Feb. 25, 1997

[54] CAMERA CAPABLE OF TRIMMING PHOTOGRAPHING AND HAVING ZOOM FINDER WITH CONVERTER LENSES

[75] Inventors: Koichi Daitoku, Sagamihara; Yoshio Imura, Kawasaki, both of Japan

[73] Assignee: Nikon Corporation, Tokyo, Japan

[21] Appl. No.: 631,609

[22] Filed: Apr. 10, 1996

Related U.S. Application Data

[63] Continuation of Ser. No. 533,672, Sep. 26, 1995, abandoned, which is a continuation of Ser. No. 395,186, Feb. 27, 1995, abandoned, which is a continuation of Ser. No. 319,771, Oct. 7, 1994, abandoned, which is a continuation of Ser. No. 169,541, Dec. 20, 1993, abandoned, which is a continuation of Ser. No. 868,039, Apr. 13, 1992, abandoned.

[30] Foreign Application Priority Data

| Apr. 16, 1991 | [JP] | Japan | 3-111070 |
| Apr. 16, 1991 | [JP] | Japan | 3-111072 |
| May 2, 1991 | [JP] | Japan | 3-130664 |
| May 2, 1991 | [JP] | Japan | 3-130665 |
| May 10, 1991 | [JP] | Japan | 3-135811 |

[51] Int. Cl.$^6$ ........................................ G03B 13/10
[52] U.S. Cl. ........................ 396/60; 396/85; 396/379
[58] Field of Search .................. 354/195.1, 195.12, 354/199, 219, 222

[56] References Cited

U.S. PATENT DOCUMENTS 4,652,104  3/1987  Harvey .................. 354/222 X
4,887,109  12/1989  Fujita et al. ............. 354/222

FOREIGN PATENT DOCUMENTS 61-285432  12/1986  Japan.

*Primary Examiner*—Safet Metjahic
*Assistant Examiner*—J. K. Han
*Attorney, Agent, or Firm*—Shapiro and Shapiro

[57] ABSTRACT

A camera capable of trimming photographing has an electric-powered zoom lens, an operating device for zooming the electric-powered zoom lens, a trimming photographing device for obtaining a pseudo zoomed-up photography by partially trimming a photographed picture at a trimming magnification β which can be previously set, and a control device which sets the trimming magnification β of the trimming photographing device to a maximum trimming magnification βmax if the operating device is moved to the zoom-up side when the electric-powered zoom lens is at the position of a maximum focal length FT, which zooms down the electric-powered zoom lens while maintaining the maximum trimming magnification βmax if the operating device is thereafter operated to the zoom-down side, and which changes the trimming magnification β of the trimming photographing device from the maximum trimming magnification βmax to 1 if the operating device is further operated to the zoom-down side when the electric-powered zoom lens is at the position of a minimum focal length FW.

2 Claims, 36 Drawing Sheets

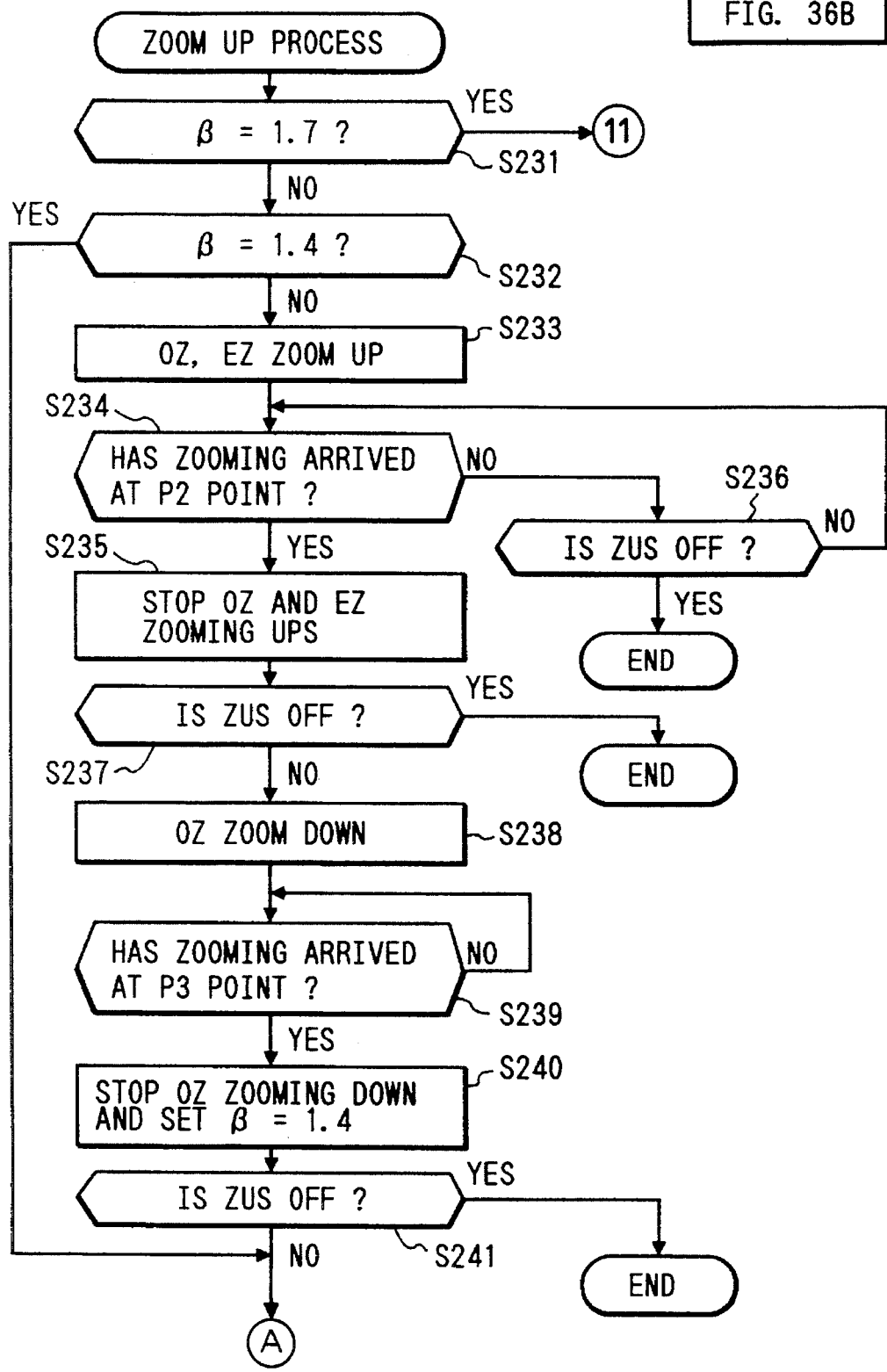

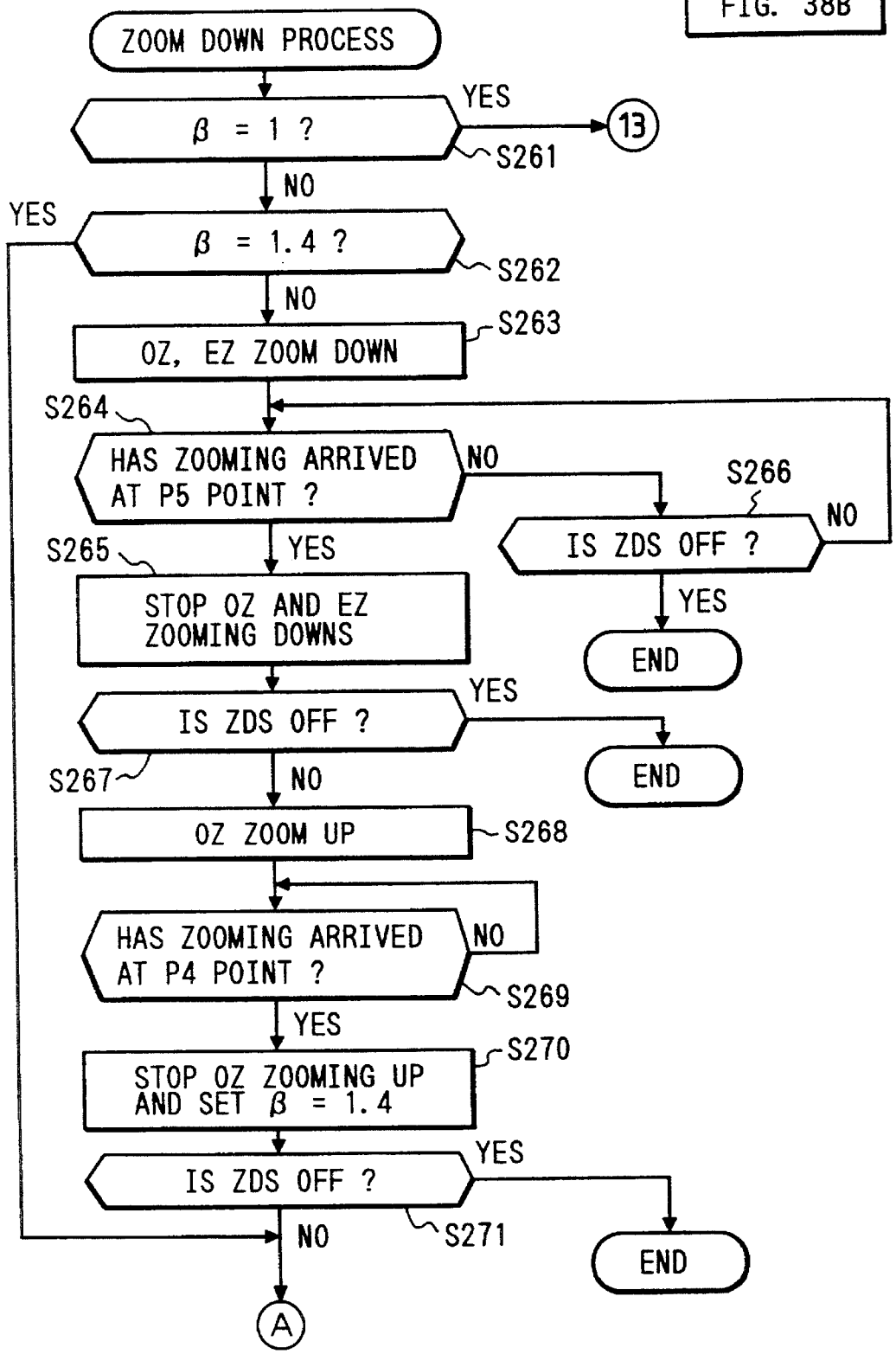

CAMERA CAPABLE OF TRIMMING PHOTOGRAPHING AND HAVING ZOOM FINDER WITH CONVERTER LENSES

This is a continuation of application Ser. No. 08/533,672 filed Sep. 26, 1995, which is a continuation of application Ser. No. 08/395,186 filed Feb. 27, 1995, which is a continuation of application Ser. No. 08/319,771 filed Oct. 7, 1994, which is a continuation of application Ser. No. 08/169,541 filed Dec. 20, 1993, which is a continuation of application Ser. No. 07/868,039 filed Apr. 13, 1992, all now abandoned.

BACKGROUND OF THE INVENTION

1. Field of the Invention

This invention relates to a camera having a zoom lens and capable of trimming photographing.

2. Related Background Art

A camera capable of trimming photographing is known which sets a trimming magnification at the time of photographing. The photographed picture is trimmed at its top, bottom, left and right sides in accordance with the set trimming magnification at the time of printing. A photograph can thereby be obtained which is equivalent to a photograph taken by zoom-up photographing at a magnification greater than the magnification determined by the maximum focal length of the zoom lens. (For example, a camera of this type is disclosed in Japanese Patent Laid-Open Application No. 61-285432).

FIG. 1 shows the relationship between a focal length F ranging from 35 to 80 mm of a zoom lens capable of trimming photographing, a trimming magnification $\beta$ and a pseudo focal length GF.

When a zooming switch for moving the zoom lens is operated to a zoom-up side, the zooming lens is moved from a minimum focal length FW ((F=35 mm) position (hereinafter referred to as "wide-angle end") to a maximum focal length FT (F=80 mm) position (hereinafter referred to as "telephoto end"). When the trimming magnification $\beta$ is 1, the pseudo focal length GF has the same value as the focal length of the zoom lens in the optical zooming range of the zoom lens (F=35 to 80 mm).

If the zoom switch is further operated to the zoom-up side when the zoom lens is at the telephoto end FT, the photography mode is changed from an ordinary mode to a trimming photographing mode, so that the pseudo focal length GF is increased with the increase in the trimming magnification $\beta$. That is, as the trimming magnification $\beta$ is successively increased from 1 to 1.5, 2.0, and 2.5, the pseudo focal length GF is increased from 80 to 120, 160, and 200. The trimming magnification $\beta$ can be set in a range as determined by the maximum trimming rate of enlarging printing of the ordinary laboratory print size.

When a picture is taken in this trimming photographing mode, the trimming magnification $\beta$ determined at the time of photographing is recorded on a film portion in the vicinity of the picture frame. At the time of printing, the picture frame is trimmed at the top, bottom, left and right sides in accordance with the trimming magnification $\beta$ set at the time of photographing and is enlarged to a predetermined size by adjusting the focal length of the printing lens.

In the case of a conventional camera capable of trimming photographing, since various magnifications are set in the variable range of the trimming magnification according to different photographed subjects, it is necessary to frequently change the focal length of the printing lens during printing according to the trimming magnifications set at the time of photographing. The time required for printing is thereby increased and the printing cost is correspondingly increased.

In the case of compact cameras having a simplified photographing lens construction, the zoom lens tends to have a greater F value on the long focus side (hereinafter referred to as "telephoto side") in comparison with the short focus side (hereinafter referred to as "wide-angle side"). Therefore, if zoom-up photographing is performed at a telephoto side of the zoom lens, there is a possibility of automatic exposure (AE) control failure with respect to a low-luminance subject, and there is a problem of a reduction in the linkage distance at the time of flash photography by linkage to a strobe unit or an increase in the frequency of use of the strobe unit and, hence, a reduction in the battery life.

To prevent these problems, trimming photographing on the wide-angle side of the zoom lens may be performed to take a pseudo zoomed-up photograph, and such trimming photographing is more advantageous than taking a zoomed-up photograph on the telephoto side of the zoom lens in some cases. By trimming photographing, however, the enlargement magnification at the time of printing is increased so that the printed image is grainy. It is therefore preferable to use the zoom lens on the telephoto side as widely as possible to limit the trimming rate.

In conventional cameras capable of trimming photographing, however, the ordinary photographing range and the trimming photographing range are changed at the telephoto end of the zoom lens, and trimming photographing cannot be selected according to photographing conditions at the wide angle end.

At the time of pseudo zoom photographing, it is desirable to set an optimum photographing magnification, i.e., an optimum focal length according to photographing conditions as in the case of ordinary zoom photographing. There is therefore a need to continuously change the focal length at the time of changeover from the optical zooming range to the pseudo zooming range, and there is also a need to set a desired pseudo focal length in the pseudo zooming range as in the optical zooming range.

In conventional cameras capable of trimming photographing, however, if the pseudo focal length for pseudo zoom photographing is continuously changed, an arbitrary trimming magnification is set according to photographing conditions each time a picture is taken and it is necessary to frequently change the focal length of the printing lens during printing according to trimming magnifications set at the time of photographing. The time required for printing is thereby increased and the printing cost is correspondingly increased.

If as shown in FIG. 2 the zooming switch is operated to the zoom-down side while setting the trimming magnification $\beta$ to, for example 2.5, the focal length F and the pseudo focal length GF of the zoom lens are reduced, so that the pseudo focal length GF is 87.5 mm at the wide-angle end (F=35 mm) of the zoom lens. That is, in a pseudo zoom photographing mode of a trimming magnification of $\beta$=2.5, a pseudo focal length GF of 87.5 to 200 mm can be obtained. Similarly, in a pseudo zoom photographing mode of a trimming magnification of $\beta$=2.0, a pseudo focal length GF of 70 to 160 mm can be obtained and, in a pseudo zoom photographing mode of a trimming magnification of $\beta$=1.5, a pseudo focal length GF of 52.5 to 120 mm can be obtained. That is, if a plurality of values of trimming magnification $\beta$ are set, the zooming range at one magnification overlaps the zooming range at another magnification. If the number of stepped values of trimming magnification β are increased, each overlapping range is extended. Accordingly, a pseudo focal length GF of, for example, 120 mm can be achieved by setting the focal length F of the zoom lens to 80 mm at the telephoto end with respect to a trimming magnification β=1.5, and can also be achieved by setting the focal length F of the zoom lens to 60 mm with respect to a trimming magnification β=2.0 or by setting the focal length F of the zoom lens to 48 mm with respect to a trimming magnification β=2.5. That is, if a plurality of values of trimming magnification β are finely set within the range determined by the maximum trimming rate of enlarging printing of the ordinary laboratory print size, the same pseudo focal length GF can be obtained with respect to a plurality of trimming magnifications.

When a picture is taken in such a pseudo zoom photographing mode, the trimming magnification β at the time of photographing is recorded on a film portion in the vicinity of the picture frame. At the time of printing, the picture frame is trimmed at the top, bottom, left and right sides in accordance with the trimming magnification β set at the time of photographing and is enlarged to a predetermined size by adjusting the focal length of the printing lens. If the trimming magnification β is increased, the enlargement magnification is also increased so that the resulting print is markedly grainy.

In conventional cameras capable of trimming photographing, however, when a desired focal length is set, the selection of one of a plurality of possible trimming magnifications with which the focal length can be set is not specified. In such an event, therefore, there is a possibility of the desired focal length being set with a greater trimming magnification even though the desired focal length can be set with a smaller trimming magnification. In this case, the enlargement magnification at the time of printing is increased so that the resulting print is poor in quality.

Various cameras having zoom lenses have been proposed, including those having a zooming type finder (hereinafter referred to as "zoom finder") whose magnification is changed according to the focal length of the photographing lens by moving a finder zooming lens along the optical axis of the zooming lens by interlocking with zooming (a change in the photographing magnification) of the photographing lens (zoom lens).

A type of camera capable of trimming photographing is also known in which information (trimming information) that only a predetermined trimmed region in an exposed region defined on a film by a shutter release is to be printed is recorded, for example, on a marginal portion of the film (as in the camera disclosed in Japanese Patent Laid-Open Application No. 61-285432. The recorded trimming information is read in the laboratory process, and only the trimmed region is enlarged and printed in accordance with this information. Since the trimmed region is smaller than the printed area of the ordinary photography, the photographing magnification is changed at the time of changeover between a trimming photographing mode and an ordinary photographing mode, and there is a need to change the finder magnification by interlocking with the mode changeover.

The camera disclosed in Japanese Patent laid-Open Application No. 61-285432 has a photographing zoom lens and a zoom finder zoomed with a zoom lens barrel. The zoom lens and the zoom finder are interlocked. More specifically, when the zoom lens barrel is further moved to the long-focus side from the telephoto end of the photographing zoom lens, an ordinary photographing mode is automatically changed into a trimming photographing mode and the zoom finder is further zoomed up while the photographing zoom lens is stopped at the same position. When the zoom lens barrel is further moved to the short-focus side from the wide-angle end, the ordinary photographing mode is automatically changed into another trimming photographing mode while the zoom lens and the zoom finder are maintained in the same position. In this manner, the magnification of the zoom finder is changed by interlocking with changeover between the trimming photographing modes and the ordinary photographing mode.

The conventional cameras capable of trimming photographing are designed to zoom a zoom finder through the whole range of zooming in ordinary and trimming photographing modes, and therefore require a zoom finder having a high zooming ratio and, hence, a large zoom finder unit.

To limit the size of the finder unit, a method may be adopted in which a converter lens is inserted in a trimming photographing mode or ordinary photographing mode or two converter lenses are interchanged at the time of mode changeover, so that the finder magnification is changed separately of zooming of the zoom finder. However, it is disadvantageous in terms of economy to separately provide a drive source for zooming the zoom finder and another drive source for inserting (interchanging) the converter lens, and there is also a possibility of an increase in the overall size of the finder unit including the zoom finder and the converter lens.

SUMMARY OF THE INVENTION

An object of the present invention is to provide a camera which is capable of trimming photographing, which has only necessary stepped values of trimming magnification, and in which the focal length of the zoom lens can be changed continuously from the minimum focal length to the maximum focal length.

In one aspect of the present invention, as shown in FIG. 3, the present invention is applied to a camera capable of trimming photographing and having an electric-powered zoom lens 1, and operation devices 2 and 3. A picture taken with this camera is partially trimmed at a trimming magnification β, which can be previously set, to obtain a pseudo zoomed-up photography.

A control device 4 is provided which sets the trimming magnification β to a maximum trimming magnification βmax if the operation device 2 is moved to the zoom-up side when the electric-powered zoom lens 1 is at the position of a maximum focal length FT, which zooms down the electric-powered zoom lens 1 while maintaining the maximum trimming magnification βmax, if the operation device 3 is thereafter operated to the zoom-down side, and which changes the trimming magnification β from the maximum trimming magnification βmax to 1, if the operation device 3 is further operated to the zoom-down side when the electric-powered zoom lens 1 is at the position of a minimum focal length FW. The above object is achieved by this arrangement.

In another aspect of the present invention, as shown in FIG. 4, a control device is provided which sets the trimming magnification β in a stepping manner in the range from the maximum focal length FT=70 mm to a pseudo focal length which is determined as a product of the minimum focal length FW=35 mm and the maximum trimming magnification βmax=2.5, i.e., FW×βmax=35×2.5=87.5, when the maximum trimming magnification βmax=2.5 is greater than the zoom ratio FT/FW=2 of the electric-powered zoom lens.

The control device 4 of the camera capable of trimming photorgaphing in accordance with the present invention sets the trimming magnification β to the maximum trimming magnification βmax if the operation device 2 is moved to the zoom-up side when the electric-powered zoom lens 1 is at the position of the maximum focal length FT. If the operation device 3 is thereafter operated to the zoom-down side, the control device 4 zooms down the electric-powered zoom lens 1 while maintaining the maximum trimming magnification βmax. If the operation device 3 is further operated to the zoom-down side when the electric-powered zoom lens 1 is at the position of the minimum focal length FW, the control device 4 changes the trimming magnification β from the maximum trimming magnification βmax to 1.

The control device of the camera capable of trimming photogaphing in accordance with the present invention sets the trimming magnification β in a stepping manner in the range from the maximum focal length FT=70 mm to a pseudo focal length determined as a product of the minimum focal length FW=35 mm and the maximum trimming magnification βmax=2.5, i.e., FW×βmax=35×2.5=87.5, when the maximum trimming magnification βmax=2.5 is greater than the zoom ratio FT/FW=2 of the electric-powered zoom lens.

Another object of the present invention is to provide a camera which is capable of trimming photographing, and which can select pseudo zoom photographing on the wide-angle side of the zoom lens or ordinary zoom photographing on the telephoto side of the zoom lens according to photographing conditions.

In yet another aspect of the present invention, as shown in FIG. 5 with respect to the relationship between a real focal length F and a pseudo focal length GF, the present invention is applied to a camera capable of trimming photographing and having a zoom lens, an ordinary photographing mode for photographing with a focal length F=35 to 70 mm (A to C) in an optical zooming range of the zoom lens, and a pseudo zoom photographing mode for a process in which a focal length GF=59.5 to 119 mm (D to F) in a pseudo zooming range obtained by multiplying the focal length F=35 to 70 mm in the optical zooming range by a trimming magnification β is set and a photographed picture is partially trimmed to obtain a pseudo zoomed-up photography. The trimming magnification β is set so that that a part of the range of focal length F=59.5 to 70 mm (B to C) in the optical zooming range and a part of the range of focal length GF=59.5 to 70 mm (D to E) in the pseudo zooming range coincide with each other. The above object is achieved by this arrangement.

Since a part of the range of focal length F=59.5 to 70 mm (B to C) in the optical zooming range a part of the range of focal length GF=59.5 to 70 mm (D to E) in the pseudo zooming range coincide with each other, either of the ordinary zoom photographing mode or the pseudo zoom photographing mode can be selected according to photographing conditions.

Yet another object of the present invention is to provide a camera which is capable of trimming photographing and in which the pseudo focal length in the pseudo zooming range can be smoothly changed subsequent to the focal length in the optical zooming range with a necessary minimum number of trimming magnifications.

In a further aspect of the present invention, as shown in FIG. 6, the present invention is applied to a camera capable of trimming photographing and having a zoom lens 1 and changing devices 5 and 6 for changing an ordinary zoom photographing mode for photographing with a focal length in an optical zooming range of the zoom lens 1 and a pseudo zoom photographing mode for performing pseudo zoom photographing with a focal length in a pseudo zooming range obtained by multiplying the focal length in the optical zooming range by a trimming magnification.

A control device 7 is provided which, if the ordinary photographing mode is changed to the pseudo zoom photographing mode by the changing device 5, zooms down the zoom lens 1 to a position such that the focal length in the optical zooming range before the change and the pseudo focal length in the pseudo zooming range after the change are approximately equal to each other. The above object is achieved by this arrangement.

In accordance with the present invention, this camera also includes a control device 7A which, if the pseudo zoom photographing mode is changed to the ordinary photographing mode by the changing device 6, zooms up the zoom lens 1 to a position such that the pseudo focal length in the pseudo zooming range before the change and the focal length in the optical zooming range after the change are approximately equal to each other.

This camera further includes a control device 7B which, when the ordinary zoom photographing mode is changed to the pseudo photographing mode, zooms down the zoom lens 1 to a position such that the focal length of the zoom lens 1 after the change is 1/1.4 to 1/2 of the maximum focal length of the zoom lens 1.

In this camera, if the ordinary photographing mode is changed to the pseudo zoom photographing mode by the changing device 5, the control device 7 zooms down the zoom lens 1 to a position such that the focal length in the optical zooming range before the change and the pseudo focal length in the pseudo zooming range after the change are approximately equal to each other.

In this camera, if the pseudo zoom photographing mode is changed to the ordinary photographing mode by the changing device 6, the control device 7A zooms up the zoom lens 1 to a position such that the pseudo focal length in the pseudo zooming range before the change and the focal length in the optical zooming range after the change are approximately equal to each other.

In this camera, when the ordinary zoom photographing mode is changed to the pseudo photographing mode, the control device 7B zooms down the zoom lens 1 to a position such that the focal length of the zoom lens 1 after the change is 1/1.4 to 1/2 of the maximum focal length of the zoom lens 1.

A further object of the present invention is to provide a camera which is capable of trimming photographing and which can select, when a desired focal length is set, the smallest magnification from a plurality of trimming magnifications with which the desired focal length can be set.

In still a further aspect of the present invention as shown in FIG. 7, the present invention is applied to a camera which is capable of trimming photographing, which has a zoom lens and a plurality of trimming magnifications, and which performs pseudo zoom-up photographing with a focal length in a pseudo zooming range obtained by multiplying a focal length in an optical zooming range of the zoom lens by one of the trimming magnifications. A magnification selection device, i.e., a control circuit 8 is provided which selects, if the plurality of magnifications include two or more trimming magnifications with each of which a desired focal length can be set, the smallest of the trimming magnifications with which the desired focal length can be set, thereby achieving the above object.

If the plurality of magnifications include two or more trimming magnifications with each of which a desired focal length can be set, the magnification selection device 8 selects the smallest of the trimming magnifications with which the desired focal length can be set. The desired focal length can thereby be set with the minimum trimming magnification. It is thereby possible to obtain a print having improved quality.

A further object of the present invention is to provide a camera which is capable of trimming photographing, which is of a type such that a converter lens is inserted into the optical path of a zoom finder at the time of trimming photographing or ordinary photographing, and in which zooming of the zoom lens and insertion/retreat of the converter lens can be effected by a single drive source.

In still a further aspect of the present invention, as shown in FIGS. 8, 9, 41, 42, and 44, the present invention is applied to a camera which is capable of trimming photographing, which has an ordinary (normal) photographing mode for printing the whole of a photographed picture 9 and a trimming photographing mode for obtaining a pseudo zoomed-up photograph or a panoramic photograph by partially trimming the photographed picture 9, and which has a photographing zoom lens, a drive device for zooming the photographing zoom lens with the rotation of a zoom ring 10, and a zoom finder 11 which is zoomed by being interlocked with this drive device to change a finder magnification.

In accordance with the present invention, the zoom ring 10 is arranged to be rotatable in each of an ordinary photographing driving range A in which rotation of the zoom ring causes the drive means to zoom the photographing zoom lens when the ordinary photographing mode is selected and ranges C and E out of the ordinary photographing driving range A. Also, in accordance with the present invention, the camera is provided with converter lenses C1 and C2 each inserted in an optical path of the zoom finder 11 to change the finder magnification separately of zooming of the zoom finder 11, and an insertion/retreat device for inserting each of the conversion lenses C1 and C2 in the optical path of the zoom finder 11 and for retreating the conversion lens from the optical path of the zoom finder 11 by being interlocked with the rotation of the zoom ring 10 into or from the range C or E out of the ordinary photographing range, thereby achieving the above object.

The insertion/retreat device inserts the converter lens C1 or C2 in the optical path of the zoom finder 11 or retreats the lens from the optical path by being interlocked with the rotation of the zoom ring 10 into or from the range C or E out of the ordinary photographing range. By this movement of the converter lens C1 or C2 into or from the optical path of the zoom finder 11, the finder magnification is changed to set a magnification in accordance with the ordinary photographing mode of the trimming photographing mode. Thereafter, the finder magnification can be changed in correspondence with zooming of the photographing zoom lens by zooming the zoom finder 11.

Also, the arrangement of this camera may alternatively such that the zoom ring 10 is arranged to be rotatable in each of an ordinary photographing driving range A in which the zooming ring is driven and rotated to drive the drive means when the ordinary photographing mode is selected and ranges C and E out of the ordinary photographing driving range A, and the camera has a first converter lens C1 inserted in the optical path of the zoom finder 11 in the ordinary photographing mode to change the finder magnification separately of zooming of the zoom finder 11, a second converter lens C2 inserted in the optical path of the zoom finder 11 in the trimming photographing mode to change the finder magnification separately of zooming of the zoom finder 11, an insertion device for inserting one of the first and second conversion lenses C1 and C2 in the optical path of the zoom finder 11 by being interlocked with the rotation of the zoom ring into the range C or E out of the ordinary photographing range, and a retreat device for retreating one of the first and second conversion lenses C1 and C2 from the optical path of the zoom finder 11 when the other of the first and second conversion lenses C1 and C2 is inserted in the optical path of the zoom finder 11. The above object can also be achieved by this arrangement.

The insertion device inserts one of the converter lenses C1 and C2 in the optical path of the zoom finder 11 by being interlocked with the rotation of the zoom ring 10 into the range C or E out of the ordinary driving range, and the retreat device retreats the other of the converter lenses C1 and C2 from the optical path of the zoom finder 11 by being interlocked with this movement. By this insertion of the converter lens C1 or C2 into the optical path of the finder 11, the finder magnification is changed to set a magnification in accordance with the ordinary photographing mode or the trimming photographing mode. Thereafter, the finder magnification can be changed in correspondence with zooming of the photographing zoom lens by zooming the zoom finder 11.

BRIEF DESCRIPTION OF THE DRAWINGS

FIGS. 36A, 36B, and 37 are flowcharts of an example of a zoom-up process program;

FIGS. 38A, 38B, and 39 are flowcharts of an example of a zoom-down process program;

DETAILED DESCRIPTION OF THE PREFERRED EMBODIMENTS

Figure 10:
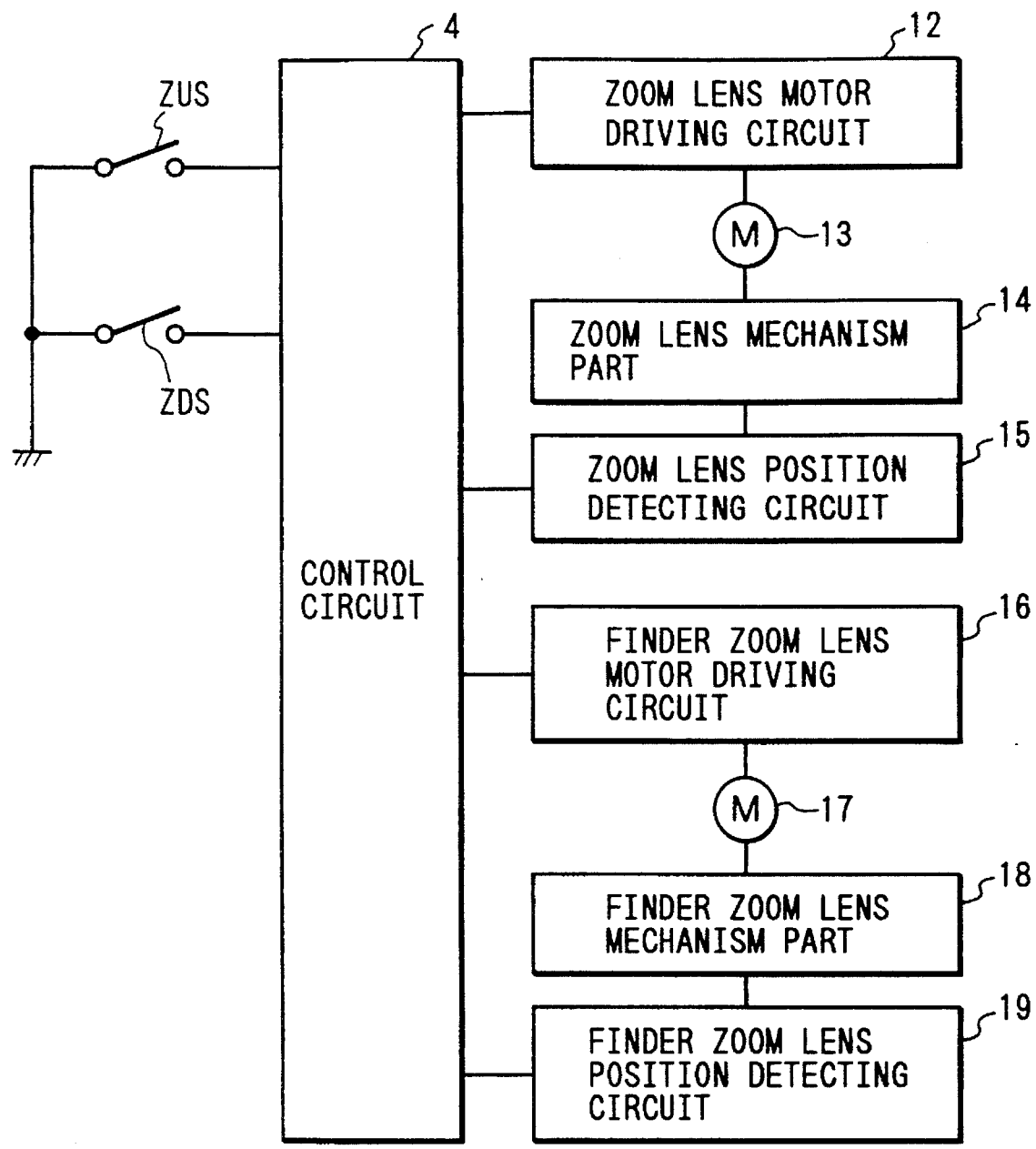
FIG. 10 is a block diagram of the construction of a first embodiment of the present invention.

FIG. 10 is a block diagram which illustrates the structure of a first embodiment.

Referring to FIG. 10, reference numeral 12 represents a zoom lens motor driving circuit for moving a zoom lens by rotating a zoom lens motor 13. Reference numeral 14 represents a zoom lens mechanism part for zooming up/down the zoom lens, and 15 represents a zoom lens position detecting circuit which detects the position of the zoom lens so as to output a signal denoting focal length F. Reference numeral 16 represents a finder zoom lens motor driving circuit for driving a finder zoom lens motor 17 so as to move a finder zoom lens to be described later. Reference numeral 18 represents a finder zoom lens mechanism part driven by the finder zoom lens motor 17 so as to zoom up/down the finder zoom lens. Reference numeral 19 represents a finder zoom lens position detecting circuit which detects the position of the finder zoom lens so as to output a signal denoting the focal length. Description will be made hereinafter in such a manner that the focal length of this finder zoom lens is called "pseud focal length GF". Symbol ZUS represents a switch for zooming up the zoom lens and ZDS represents a switch for zooming down the zoom lens. Reference numeral 4 represents a control circuit composed of a microcomputer and its peripheral elements, the control circuit 4 performing various calculation operations and operation sequence process of the camera. The control circuit 4 further executes a control program to be described later to cause the zoom lens and the finder zoom lens to perform zooming.

Figure 11:
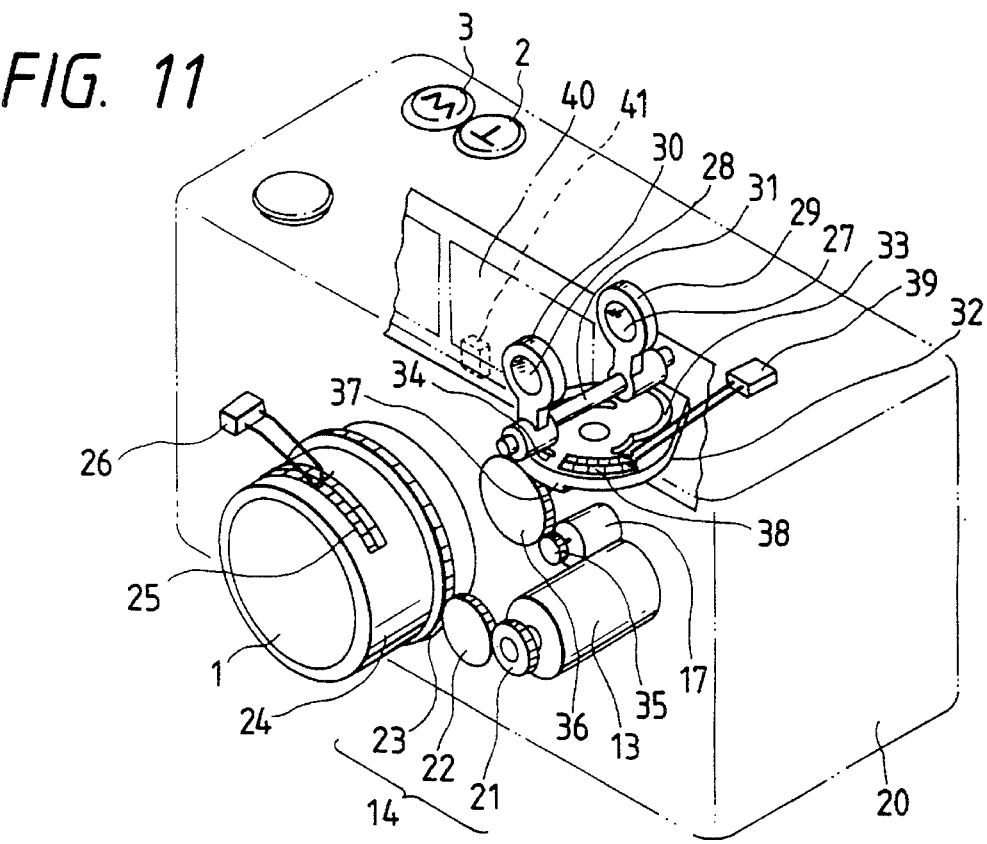
FIG. 11 is a perspective view of a camera capable of trimming photographing in accordance with the present invention.

FIG. 11 is a perspective view which illustrates a camera capable of performing trimming photographing.

A zoom lens 1 is fastened to a camera body 20. The zoom lens 1 is driven by a zoom lens motor 13 by means of a zoom lens mechanism part 14 composed of a gear 21 fastened to the rotational shaft of the zoom lens motor 13, a synchronizing gear 22 and a lens-barrel ring 24. As a result, the zoom lens 1 is zoomed between the shortest focal length FW (wide end) and the longest focal length FT (telephoto end). According to this embodiment, a zoom lens 1 will be described which has a focal length F=35 to 70. In order to distinguish the focal length F of the zoom lens 1 from that of a finder zoom lens to be described later, it is called a "real focal length F".

The lens-barrel ring 24 has an encoder pattern 25 formed on the outer surface thereof. A brush 26 slides on the encoder pattern 25, the brush 26 detecting an electric signal denoting the position of the zoom lens 1 moved due to the rotation of the lens-barrel ring 24 so as to output a position signal to the zoom lens position detection circuit 15.

The finder zoom lenses 27 and 28 are respectively held by lens holding members 29 and 30. The lens holding members 29 and 30 are held by a shaft 31 slidably in the longitudinal direction, and are also respectively engaged with grooves 33 and 34 of a cam 32. The cam 32 is driven by the finder zoom lens motor 17 by means of a gear 35 fastened to the rotational shaft of the finder zoom lens motor 17, a synchronizing gear 36 and a gear part 37 fastened to the reverse side of the cam 32. When the cam 32 is rotated, the lens holding members 29 and 30 slide on the shaft 31 in the forward/reverse direction. As a result, the finder zoom lenses 27 and 28 are zoomed from the shortest focal length 35 mm to the longest focal length 119 mm. Description will be made hereinafter that each of the focal length of the finder zoom lenses 27 and 28 is called "pseud focal length GF" in order to be distinguished from the aforesaid real focal length F of the zoom lens.

The cam 32 has an encoder pattern 38 formed on the outer surface thereof. A brush 39 slides on the encoder pattern 38. The brush 39 detects an electric signal denoting the position of each of the zoom lenses 27 and 28 moved due to the rotation of the cam 32 so as to output a position signal to the finder zoom lens position detection circuit 19.

Trimming photographing information about each photographed frame of a film 40 is optically or magnetically imprinted to the film by a known information imprinter 41. In accordance with the trimming information, the focal length of the expansion lens is adjusted at the time of a trimming operation to be performed in a laboratory. Furthermore, the camera body 20 has, on its upper surface thereof, a zoom-up button 2 for zooming up the zoom lens 1 and a zoom-down button 3 for zooming down the same. When each of the button 2 or the 3 is depressed, the aforesaid corresponding switch ZUS or ZDS is switched on.

Figure 12:
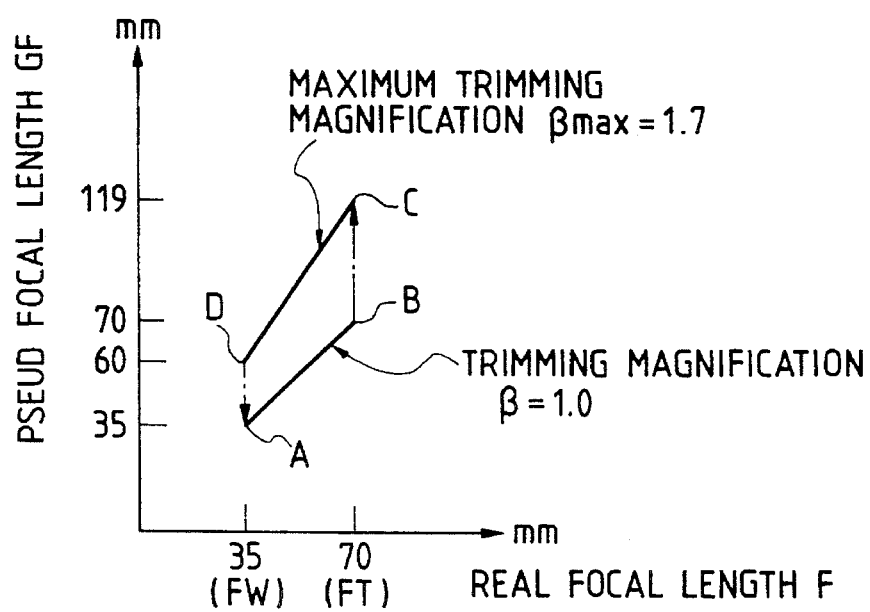
FIG. 12 is a diagram of the relationship between the real focal length and the pseudo focal length of the camera capable of trimming photographing shown in FIG. 11.

FIG. 12 illustrates the relationship between the real focal length F with which trimming photographing can be performed and the pseud focal length GF. The maximum trimming magnification βmax of the camera according to this embodiment is assumed to be 1.7.

When the trimming magnification β is 1, that is when the normal photographing operation is performed, both of the real focal length F and the pseud focal length GF are changed in a range from 35 to 70 mm in synchronization with zooming of the zoom lens 1. When the trimming photographing operation is performed at the maximum trimming magnification βmax=1.7, the pseud focal length GF is changed in a range from 59.5 to 119 mm in synchronization with the zooming operation performed in a range of the real focal length F from 35 to 70 mm. The longest pseud focal length GF=119 mm of the finder zoom lenses 27 and 28 corresponds to the focal length in a case where the trimming photographing operation is performed with the maximum trimming magnification βmax=1.7 at the telephoto end FT=70 mm of the zoom lens 11, while the shortest pseud focal length GF=59.5 mm corresponds to the focal length in a case where the trimming photographing operation is performed with the maximum trimming magnification βmax=1.7 at the wide end FW=35 mm of the zoom lens 1.

According to this embodiment, the trimming photographing operation is performed with the trimming magnification β=1.7, that is, the maximum magnification βmax. When the zoom up button 2 or the zoom down button 3 is operated, the real focal length F of the zoom lens 1, the trimming magnification β and the pseud focal length GF are changed as follows: assumptions are made here that the zoom lens 1 is located at the wide end FW and the trimming magnification β is 1. When the zoom up button 2 is operated, the zoom lens 1 is zoomed up from point A shown in FIG. 12 and both of the real focal length F and the pseud focal length GF are increased to arrive at point B. As a result, zooming up of the zoom lens 1 is stopped. When the zoom up button 2 is further operated at the point B, the trimming magnification β is set to the maximum magnification 1.7 and zooming arrives at point C at which the pseud focal length GF is 119 mm. When the zoom down button 3 is then operated at point C, the zoom lens 1 is zoomed down while maintaining the maximum trimming magnification βmax. As a result, both of the real focal length F and the pseud focal length GF are decreased. As a result, zooming arrives at point D and zooming down of the zoom lens 1 is stopped. When the zoom down button 3 is further operated at point D, the trimming magnification β is again set to 1 and the zoom lens 1 returns to point A. That is, the normal photographing operation is performed at any of the real focal length F on a straight line passing from the point A to the point D, while the trimming photographing operation with the maximum trimming magnification βmax=1.7 is performed at any of the pseudo focal length GF on a straight line passing from the point C to the point D.

Figure 13:
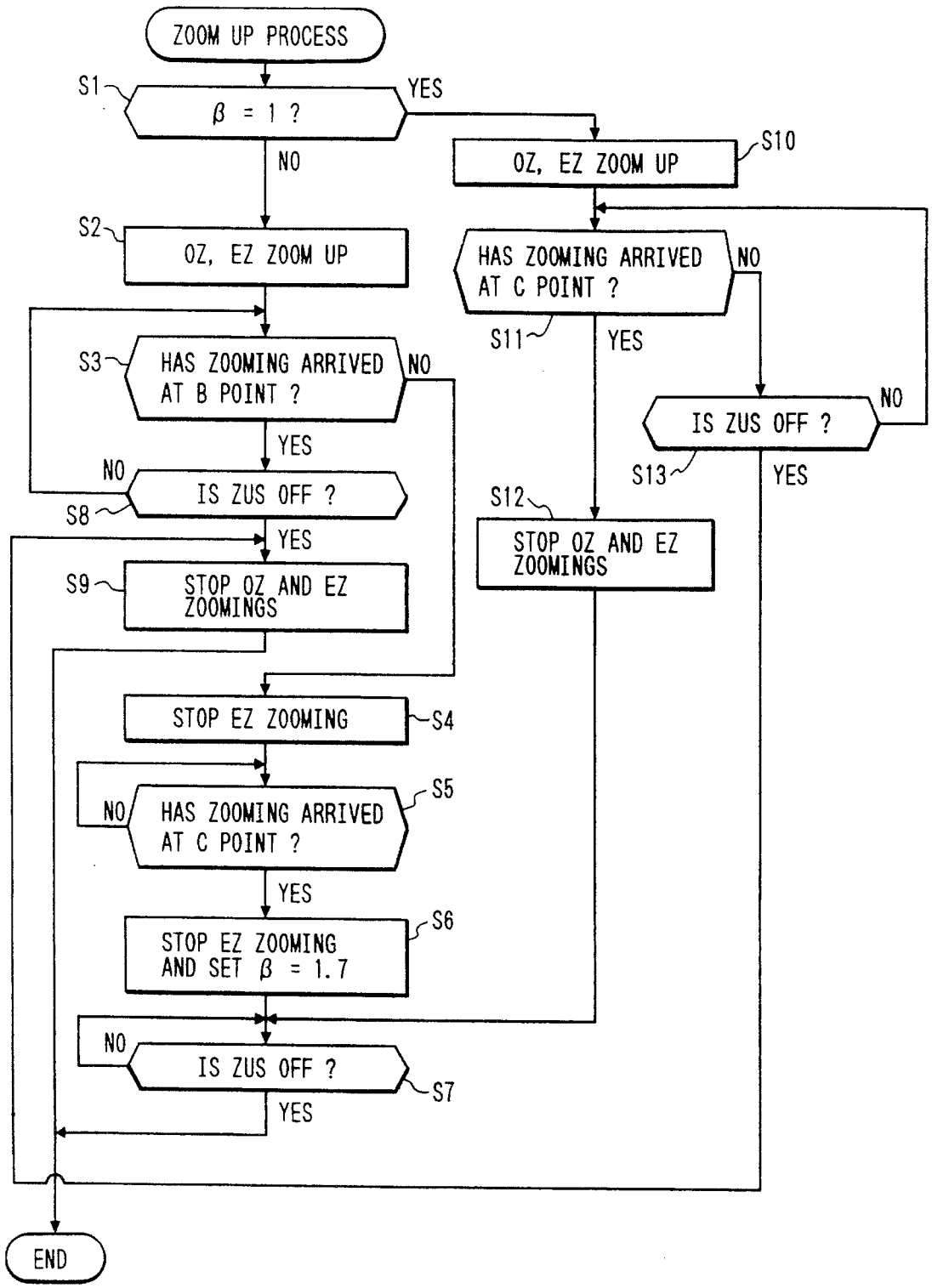
FIG. 13 is a flowchart of an example of a zoom-up process program.

FIG. 13 illustrates a program for the zoom up process to be performed by the microcomputer of the control circuit 4.

The microcomputer starts executing the program when the zoom up button 2 is operated and thereby the switch ZUS is switched on. The zoom up operation will now be described with reference to FIG. 13. Description will made in such a manner that zooming of the zoom lens 1 is called "OZ zooming" and zooming of the finder lenses 27 and 28 is called "EX zooming".

In step S1, whether or not the trimming magnification β is 1 is discriminated. If β is 1, that is the normal photographing mode, the flow-proceeds to step S2. If it is negated, the flow proceeds to step S10. In step S2, the zoom lens motor driving circuit 12 is controlled so as to start OZ zooming of the zoom lens 1. Furthermore, the finder zoom lens motor driving circuit 16 is controlled so as to start EZ zooming of the finder zoom lenses 27 and 28. In next step S3, whether or not zooming has arrived at the point B shown in FIG. 12, that is the telephoto end FT, is discriminated according to the signal denoting the real focal distance F of the zoom lens 1 supplied from the zoom lens position detection circuit 15. If it has arrived at the telephoto end FT, the flow proceeds to step S4 in which the zoom lens motor driving circuit 12 is controlled so as to stop the OZ zooming-up operation of the zoom lens 1. At this time, the EZ zooming-up operation of the finder zoom lenses 27 and 28 is continued.

In step S5, the focal length of the finder zoom lenses 27 and 28 from the finder zoom lens position detection circuit 19, that is the pseud focal length GF, is detected so as to discriminate whether or not zooming has arrived at point C at which the pseudo focal length is the longest length (GF=119 mm). If it has arrived at the point C, the flow proceeds to step S6 in which EZ zoom-up of the finder zoom lenses 27 and 28 is stopped and as well as the trimming magnification β is set to the maximum magnification βmax= 1.7. In next step S7, whether or not the zoom up button 2 has been released by the switch ZUS is discriminated. If it has been released, the execution of the program is completed.

If zooming has not arrived at the point B in step S3, the flow proceed to step S8 in which whether or not the zoom up button 2 has been released by the switch ZUS is discriminated. If it has been released, the flow proceeds to step S9. It it has not been released, the flow returns to step S3. In step S9, the OZ and EZ zoom up operations of the zoom lens 1 and the finder zoom lenses 27 and 28 are stopped. Then, the execution of the program is completed.

If a discrimination has been made in step S1 that the trimming magnification β is not 1, that is the trimming photographing mode has been set, the flow proceeds to step S10 in which the OZ and EZ zoom up operations of the zoom lens 1 and the finder zoom lenses 27 and 28 are started. In next step S11, whether or not zooming has arrived at the point C at which the pseud focal length is the longest distance. If it has arrived the point C, the flow proceeds to step S12. If it has been negated, the flow proceeds to step S13. In step S12, OZ and EX zoomings of the zoom lens 1 and the finder zoom lenses 27 and 28 are stopped. Then, the flow proceeds to step S7. In step S13, whether or not the zoom up button 2 has been released by the switch ZUS is discriminated. If it has been released, the flow proceeds to step S9 in which the OZ and EZ zoom up operations of the zoom lens 1 and the finder zoom lenses 27 and 28 are stopped. If it has not been released, the flow returns to step S11.

Figure 14:
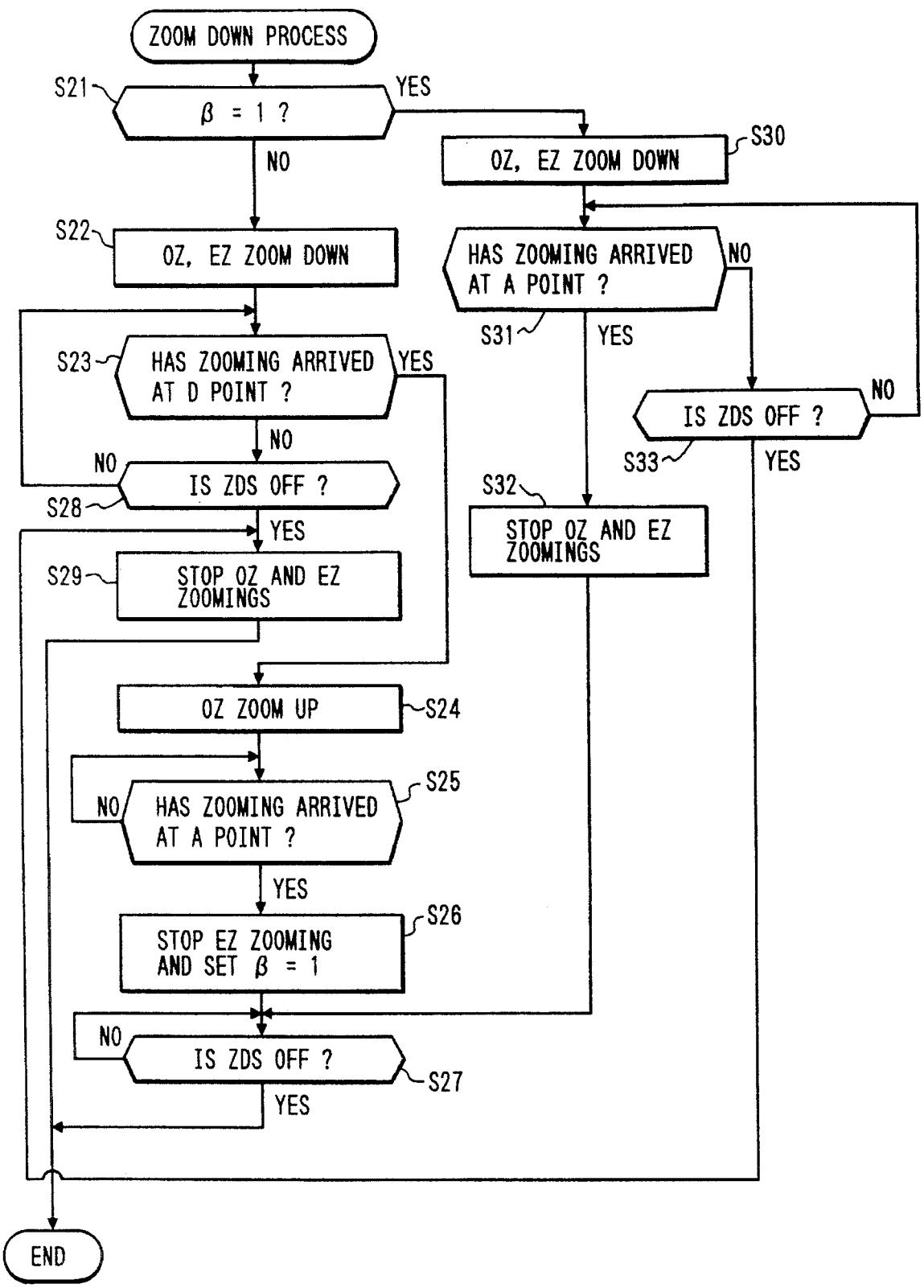
FIG. 14 is a flowchart of an example of a zoom-down process program.

FIG. 14 illustrates a program for the zoom down process to be executed by the microcomputer of the control circuit 4. The microcomputer starts executing the program when the zoom down button 3 is operated and the switch ZDS is switched on. Referring to FIG. 14, the zoom down operation will now be described.

In step S21, whether or not the trimming magnification β is 1 is discriminated. If β is 1, that is, if the normal photographing mode has been selected, the flow proceeds to step S30. If it is negated, the flow proceeds to step S22. In step S22, the OZ and EZ zoom down operations of of the zoom lens 1 and the finder zoom lenses 27 and 28 are started. In next step S23, whether or not zooming has arrived at the point D is discriminated. If it has arrived at the point D, the flow proceeds to step S24. If it has been negated, the flow proceeds to step S28. In step S24, OZ zooming down of the zoom lens 1 is stopped. In next step S25, whether or not zooming has arrived at point A is discriminated. If zooming has arrived at point A, the flow proceeds to step S26, EZ zoom down of the finder zoom lenses 27 and 28 is stopped and as well as the trimming magnification β is set to 1. In next step S27, whether or not the zoom down button 3 has been released by the switch ZDS is discriminated. If it has been released, the execution of the program is completed. If a discrimination has been made in step S23 that zooming has not arrived at the point D, whether or not the zoom down button 3 has been released by the switch ZDS is discriminated in step S28. If it has been released, the flow proceeds to step S29. It is has been negated, the flow returns to step S23. In step S29, the OZ and EZ zoom down operations of the zoom lens 1 and the finder zoom lenses 27 and 28 are stopped. Thus, the execution of the program is completed.

If a discrimination has been made in step S21 that the trimming magnification β is 1, that is, the normal photographing mode, the OZ and EZ zoom down operations of the zoom lens 1 and the finder zoom lenses 27 and 28 are started in step S30. In next step S31, whether or not zooming has arrived at A is discriminated. If zooming has arrived at the point A, the flow proceeds to step S32. If it has been negated, the flow proceeds to step S33. In step S32, the OZ and EZ zoom down operations of the zoom lens 1 and the finder zoom lenses 27 and 28 are stopped. If it has been then discriminated in step S27 that the zoom down button 17 has been released by the switch ZDS, the execution of the program is completed. In step S33, whether or not the zoom down button 17 has been released by the switch ZDS is discriminated. If it has been released, the flow proceeds to step S29. If it has been negated, the flow returns to step S31. In step S29, the OZ and EZ zoom down operations of the zoom lens 1 and the finder zoom lenses 27 and 28 are stopped. Then, the execution of the program is completed.

A second embodiment will now be described in which the maximum trimming magnification βmax is larger than the zoom ratio FT/FW of the zoom lens. According to the second embodiment, if the maximum trimming magnification βmax is different, the camera constituted as shown in FIGS. 10 and 11 and capable of performing the trimming photographing operation is used and its description is omitted here.

Figure 4:
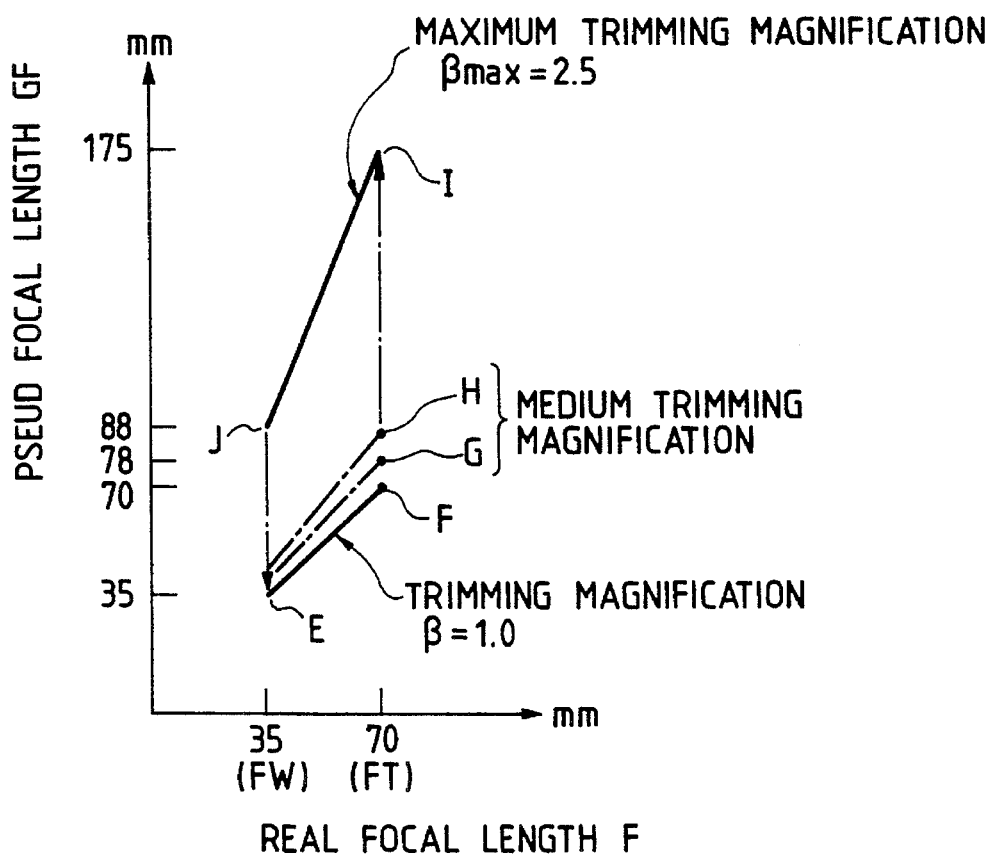
FIG. 4 is a diagram of the relationship between the real focal length F and the pseudo focal length GF of a camera having a maximum trimming magnification $\beta max=2.5$ and capable of trimming photographing in another aspect of the present invention.

FIG. 4 illustrates the relationship between the real focal length F and the pseud focal length GF of a camera according to the second embodiment, having the maximum trimming magnification βmax=2.5 and capable of performing the trimming photographing operation.

The camera capable of performing the trimming photographing operation has the maximum trimming magnification βmax=2.5 which is larger than the trimming ratio FT/FW=70/35=2. Similarly to the camera according to the first embodiment, both of the real focal length F and the pseud focal length GF are changed in a range from 35 to 70 mm (from point E to point F) in synchronization with zooming of the zoom lens 1 in a case where the trimming magnification β=1, that is, the normal photographing operation is performed. In a case of the trimming photograph with the maximum trimming magnification βmax=2.5, the pseud focal length GF is changed in a range from 87.7 to 175 mm (from point J to point I) in synchronization with zooming of the zoom lens 1 performed in a range of its real focal length F from 35 to 70 mm. However, if the maximum trimming magnification βmax=2.5 is larger than the trimming ratio FT/FW=2.0 of the zoom lens 1, it is impossible to set the pseud focal length GF to a range from 70 to 87.5 mm. Therefore, trimming photographing, which corresponds to the aforesaid range, cannot be performed. As a result, trimming photographing is performed while setting the trimming magnifications β to 1.12 (the point G) and 1.25 (the point H) which are intermediate values with which trimming photographing can be performed. In this case, the maximum trimming magnification βmax is made to be smaller than the maximum trimming ratio in a case of the expansion and printing process of a normal size to be performed in a laboratory.

Figure 15:
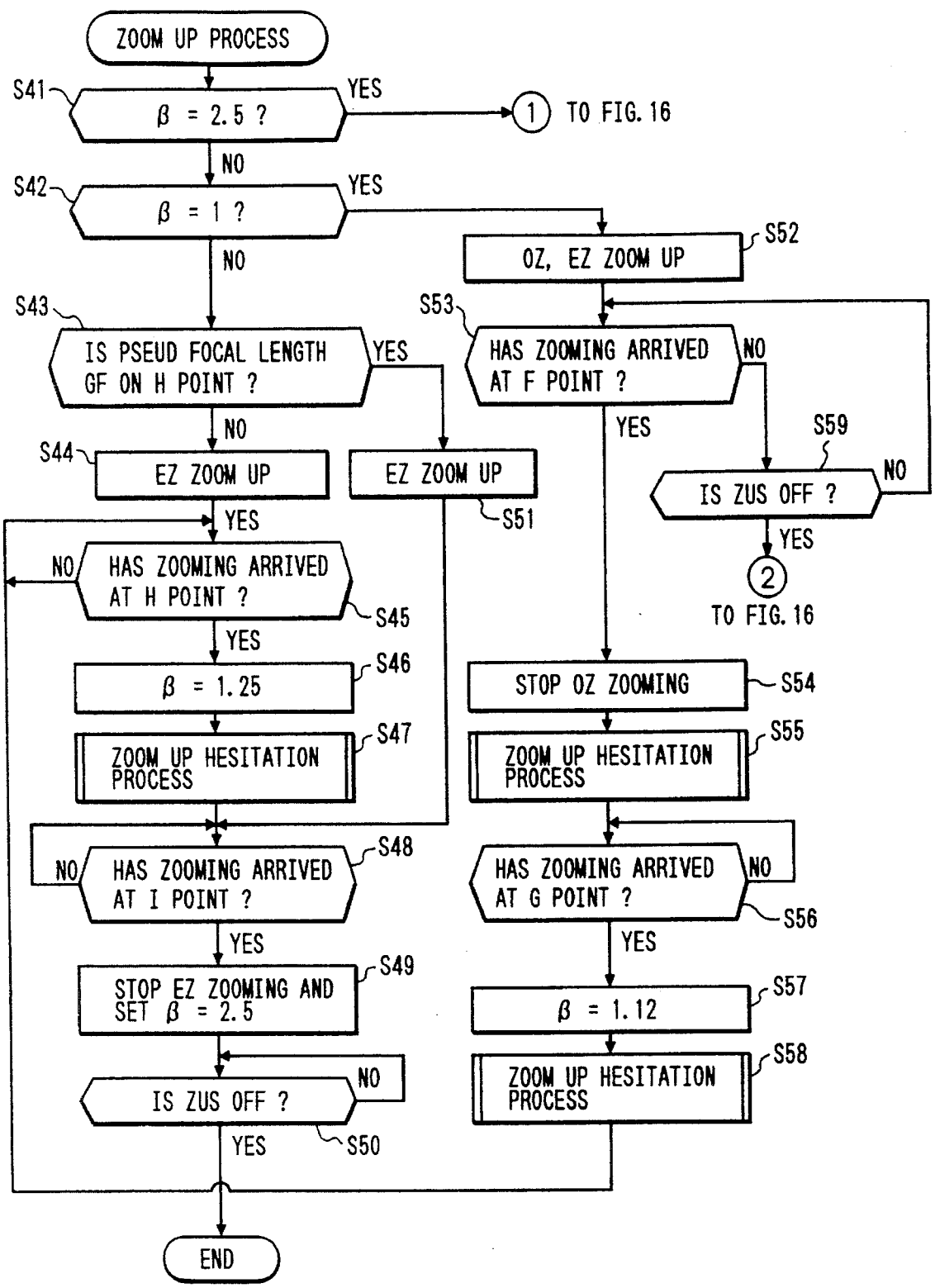
FIGS. 15 and 16 are flowcharts of another example of the zoom-up process program.
Figure 16:
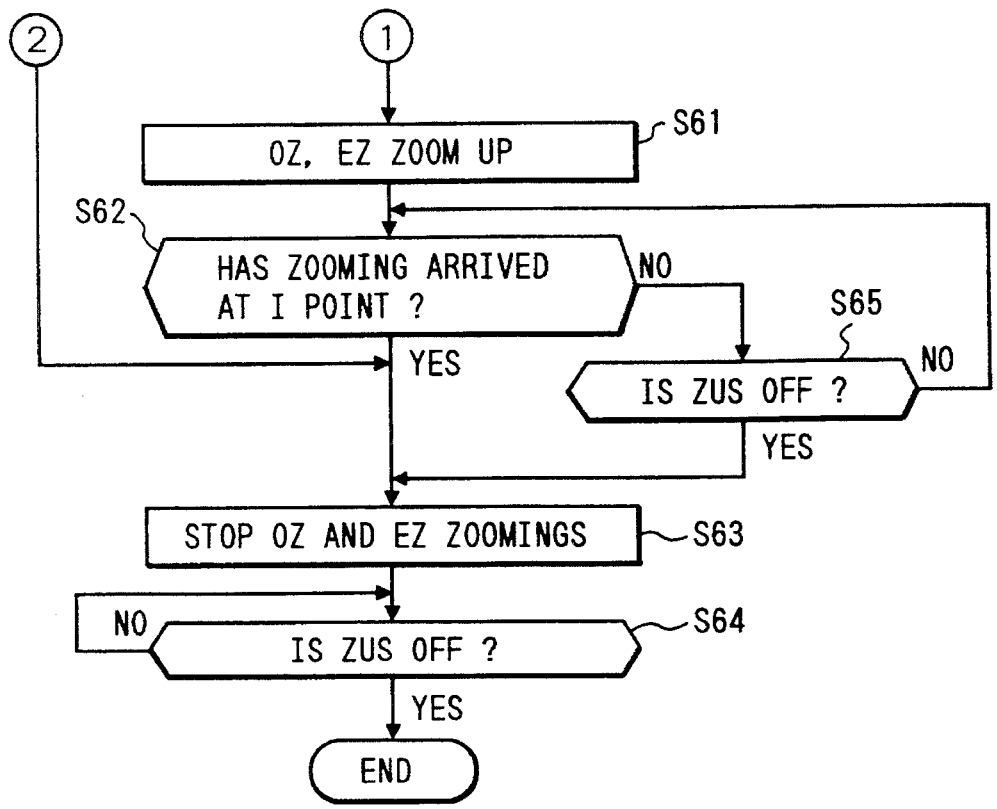

FIGS. 15 and 16 are flow charts which illustrate a program for the zoom up process. The microcomputer of the control circuit 4 starts executing the program when the switch ZDS is switched on. The zoom up process according to the second embodiment will now be described with reference to the flow chart.

In step S41, whether or not the trimming magnification β is 2.5, that is whether or not it is the maximum magnification βmax, is discriminated. If it is the maximum trimming magnification, the flow proceeds to step S61 shown in FIG. 16. If it is negated, the flow proceeds to step S42. In step S42, whether or not the trimming magnification β is 1, that is, whether or not the photographing mode is the normal photographing mode, is discriminated. If it is the normal photographing mode, the flow proceeds to step S52. If it is negated, the flow proceeds to step S43. In step S43, whether or not the pseud focal length GF is present on the point H shown in FIG. 4 is discriminated. If it is present on the point H, the flow proceeds to step S51. If it is negated, the flow proceeds to step S44. In step S44, the EZ zoom up operation is started. Then, in step S45, whether or not zooming has arrived at the point H is discriminated. If zooming has arrived at the point H, the flow proceeds to step S46 in which the trimming magnification β is set to 1.25. In next step S47, a zoom up hesitation process subroutine shown in FIG. 17 is executed.

Figure 17:
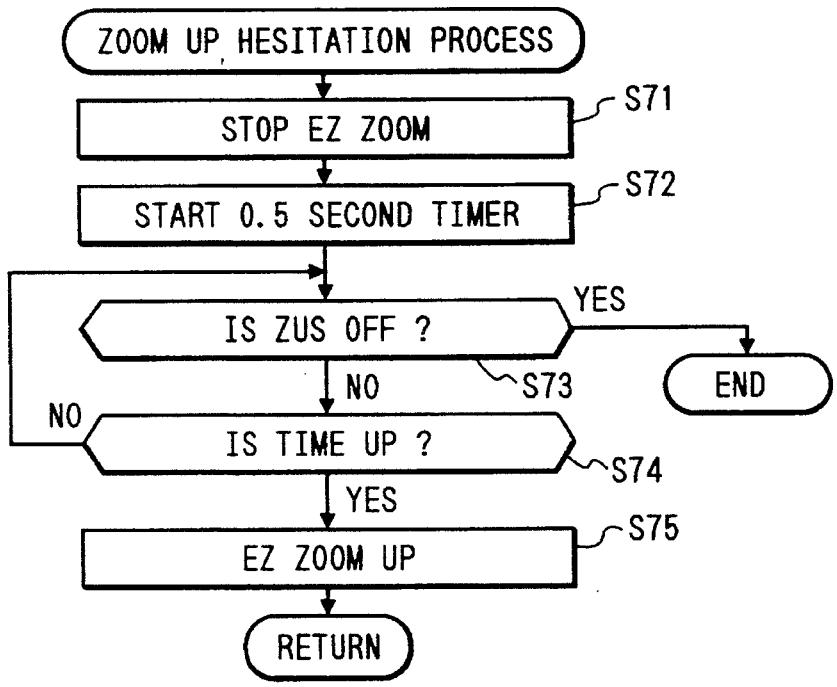
FIG. 17 is a flowchart of a zoom-up hesitation process subroutine.

In step S71 shown in FIG. 17, the EZ zoom operation is stopped. Then, in step S72, a 0.5-second timer is started. The 0.5-second timer acts to measure the time in which the zoom up button 2 is operated continuously at a predetermined position. The time which is measured by the timer is not limited to the aforesaid 0.5 seconds. In next step S73, whether or not the switch ZUS has been switched off is discriminated. If it has been switched off, the execution of the program is completed. If it has been negated, the flow proceed to step S74. In step S74, whether or not the time set by the 0.5-second timer has passed is discriminated. If it has passed, the flow proceeds to step S75. If it has not passed, the flow returns to step S73. In step S75, the EZ zoom up operation is again started. Then, the flow returns to the program shown in FIG. 15. That is, in the zoom up hesitation process subroutine, the EZ zoom up operation is restarted if the zoom up button 2 is operated for 0.5 seconds or longer.

In step S48 shown in FIG. 15 to which the flow has been returned, whether or not zooming has arrived at point I is discriminated. If it has arrived at the point I, the flow proceeds to step S49 in which the EZ zoom up is stopped and the trimming magnification β is set to 2.5. In next step S50, whether or not the switch ZUS has been switched off is discriminated. If it has been switched off, the execution of the program is completed. If a negative discrimination is made in step S43, the flow proceeds to step S51 in which the EZ zoom up operation is started. Then, the flow proceeds to step S48.

If a discrimination is made that the photographing mode is the normal photographing mode in which the trimming magnification β is 1, the OZ and EZ zoom up operations are started in step S52. In step S53, whether or not zooming has arrived at the point F is discriminated. If it has arrived at the point F, the flow proceeds to step S54. If it has been negated, the flow proceeds to step S59. In step S54, the OZ zoom up operation is stopped. In next step S55, the aforesaid zoom up hesitation process subroutine shown in FIG. 17 is executed. That is, if the zoom up button 2 has been operated for 0.5 seconds or longer at the point F after the EZ zoom up operation had been temporarily stopped, the zoom up operation is restarted. Then, the flow proceeds to step S56. If it has been negated, the execution of the program is completed. In step S56, whether or not zooming has arrived at point G is discriminated. If zooming has arrived at the point G, the flow proceeds to step S57. In step S57, the trimming magnification β is set to 1.12. Then, in next step S58, the zoom up hesitation process subroutine is again executed. If the zoom up button 2 has been operated for 0.5 seconds at the point G after the EZ zoom up operation had been stopped, the EZ zoom up operation is restarted. Then, the flow proceeds to step S45. If it has been negated, the execution of the program is completed. If a negative discrimination is made in step S53, whether or not the switch ZUS has been switched off is discriminated in step S59. If it has been switched off, the flow proceeds to step S63 shown in FIG. 16. If it has been negated, the flow returns to step S53.

If a negative discrimination is made in step S41, the OZ and EZ zoom up operations are started in step S61 shown in FIG. 16. In next step S62, whether or not zooming has arrived at the point I is discriminated. If zooming has arrived at the point I, the flow proceeds to step S63. If it has been negated, the flow proceeds to step S65. In step S63, the OZ and EZ zoom up operations are stopped. Then, in step S64, whether or not the switch ZUS has been switched off is discriminated. If it has been switched off, the execution of the program is completed. If a negative discrimination has been made in step S62, whether or not the switch ZUS has been switched off is discriminated. If it has been switched off, the flow proceeds to step S63. If it has been negated, the flow returns to step S62.

Figure 18:
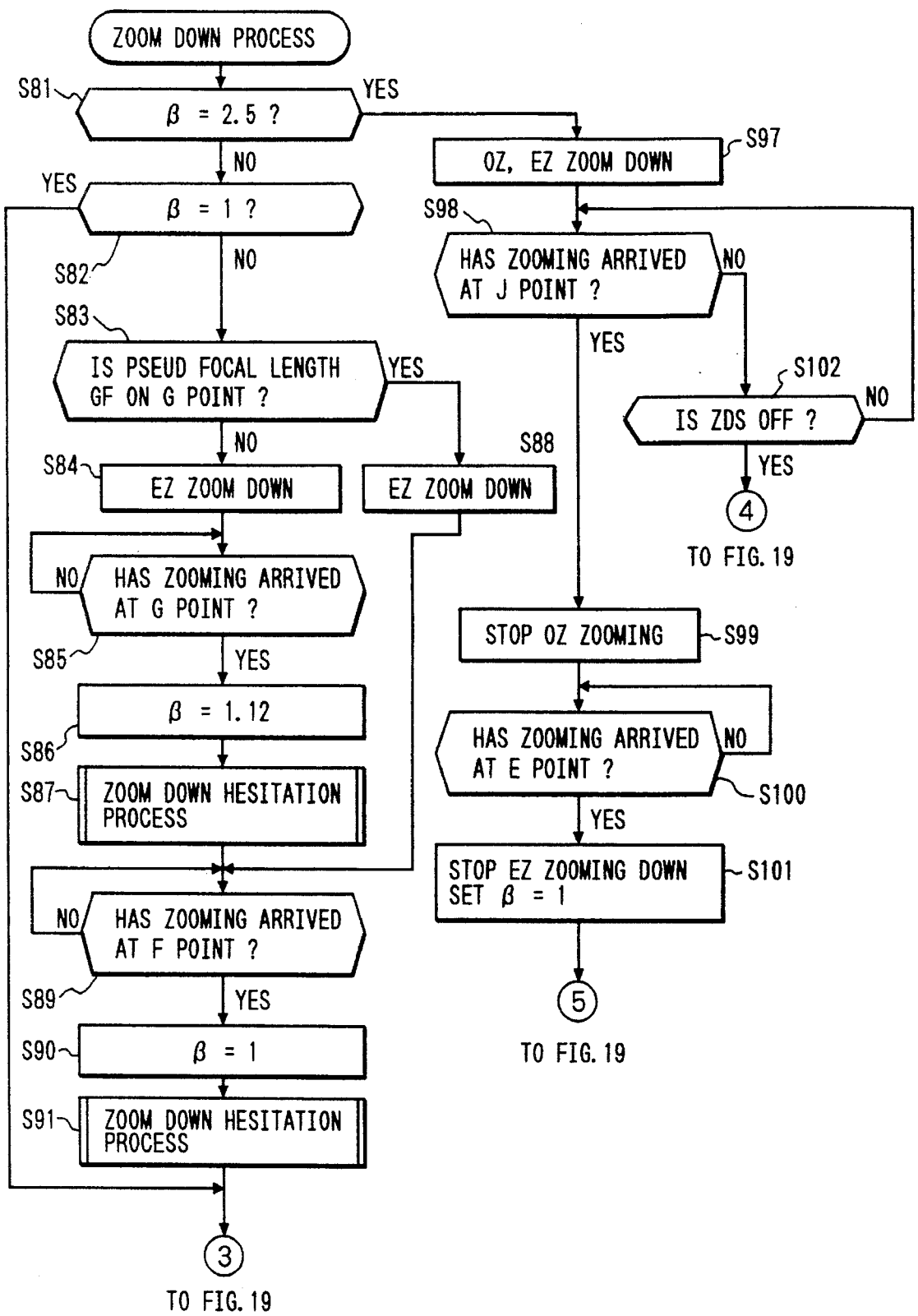
FIGS. 18 and 19 are flowcharts of another example of the zoom-down process.
Figure 19:
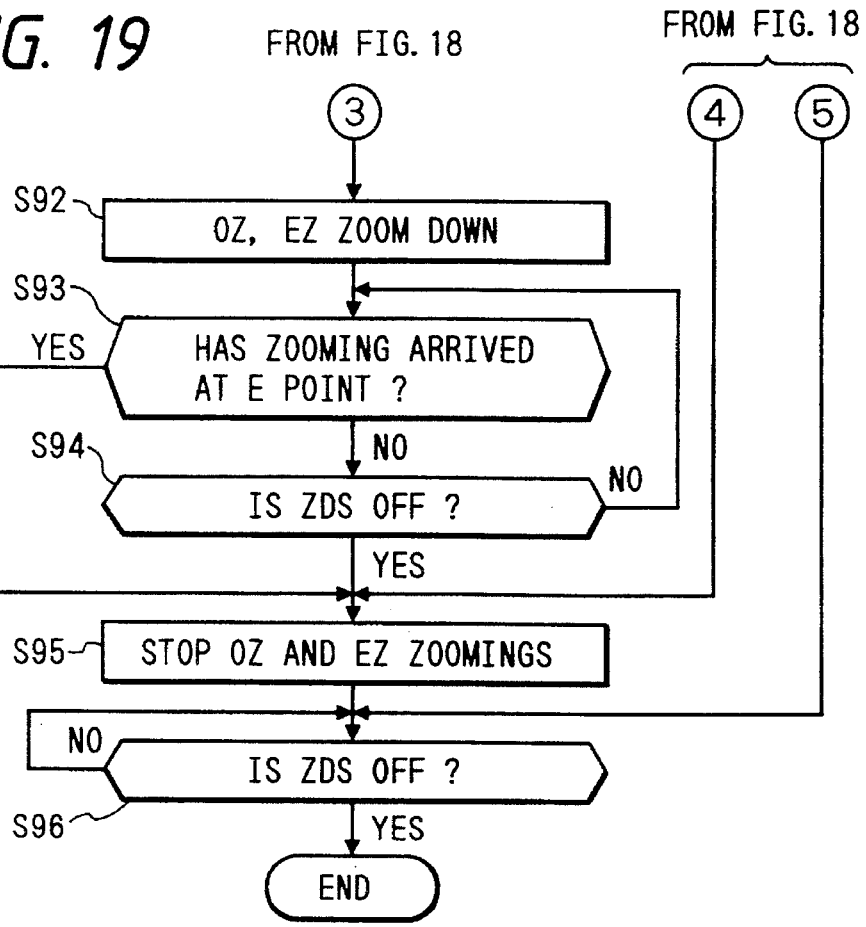

FIGS. 18 and 19 are flow charts for a program for the zoom down process. The microcomputer of the control circuit 4 starts executing the program when the switch ZDS is switched on. The zoom down process according to the second embodiment will now be described with reference to the flow chart.

In step S81, whether or not the trimming magnification β is the maximum magnification βmax is discriminated. If it has been negated, the flow proceeds to step S97. If it has been negated, the flow proceeds to step S82. In step S82, whether or not the photographing mode is the normal photographing mode in which the trimming magnification β is 1 is discriminated. If an affirmative discrimination has been made, the flow proceeds to step S92 shown in FIG. 19. If it has been negated, the flow proceeds to step S83. In step S83, whether or not the pseud focal length GF is present on the point G is discriminated. If an affirmative discrimination is made, the flow proceeds to step S88. If a negative discrimination is made, the flow proceeds to step S84. In step S84, the EZ zoom down operation is started. In next step S85, whether or not zooming has arrived at the point G is discriminated. If zooming has arrived at the point G, the flow proceeds to step S86. In step S86, the trimming magnification β is set to 1.12. In next step S87, the zoom down hesitation process subroutine shown in FIG. 20 is executed.

Figure 20:
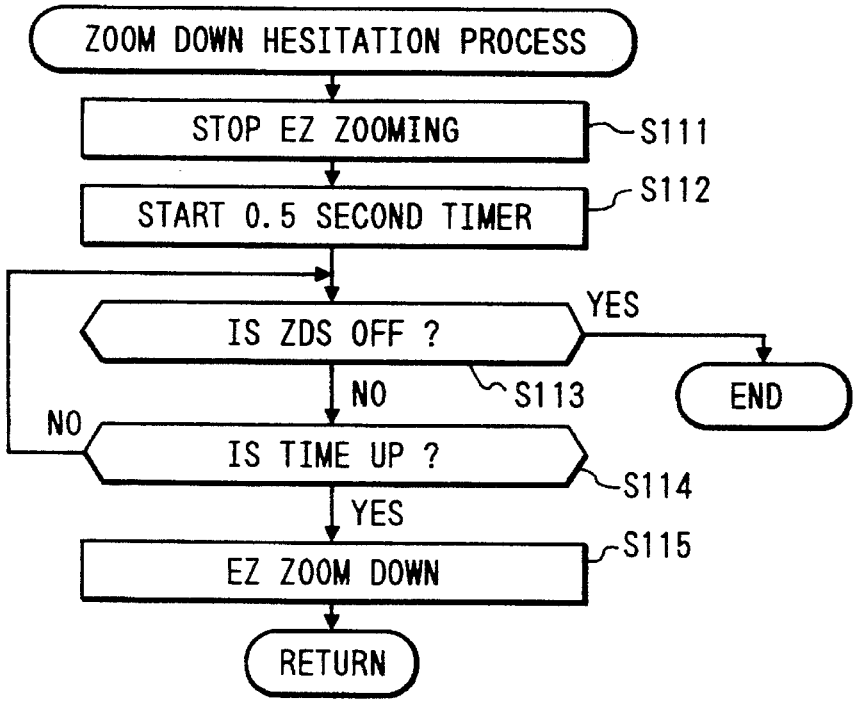
FIG. 20 is a flowchart of a zoom-down hesitation process subroutine.

In step S111 shown in FIG. 20, the EZ zoom down operation is stopped. In next step S112, the 0.5-second timer is started. The 0.5-second timer acts to measure the time in which the zoom up button 3 is operated continuously at a predetermined position. The time which is measured by the timer is not limited to the aforesaid 0.5 seconds. In step S113, whether or not the switch ZDS has been switched off is discriminated. If it has been switched off, the execution of the program is completed. If it has been negated, the flow proceed to step S114. In step S114, whether or not the time set by the 0.5-second timer has passed is discriminated. If it has passed, the flow proceeds to step S115. If it has not passed, the flow returns to step S113. In step S115, the EZ zoom down operation is again started. Then, the flow returns to the program shown in FIG. 18. That is, in the zoom down hesitation process subroutine, the EZ zoom down operation is restarted if the zoom down button 3 is operated for 0.5 seconds or longer.

In step S89 shown in FIG. 18 to which the flow has been returned, whether or not zooming has arrived at point F is discriminated. If it has arrived at the point F, the flow proceeds to step S90 in which the trimming magnification β is set to 1. In step S91, the zoom down hesitation process subroutine shown in FIG. 20 is again executed. If the zoom down button 3 has ben operated for 0.5 seconds for the point F after the EZ zoom down operation had been temporarily stopped, the EZ zoom down operation is restarted. In next step S92 shown in FIG. 19, also the OZ zoom down operation is started. Then, in step S93, whether or not zooming has arrived at the point E is discriminated. If zooming has arrived at the point E, the flow proceeds to step S95. It it has been negated, the flow proceed to step S94. In step S94, whether or not the switch ZDS has been switched off is discriminated. If it has been switched off, the flow proceeds to step S95. If it has been negated, the flow returns to step S93. In step S95, the OZ and EZ zoom down operations are stopped. In next step S96, whether or not the switch ZDS has been switched off is discriminated. If it has been switched off, the execution of the program is completed. If a negative discrimination is made in step S83 shown in FIG. 18, the EZ zoom down operation is started in step S88. Then, the flow proceeds to step S89.

If an affirmative discrimination is made in step S81, the OZ and EZ zoom down operations are started in step S97. In step S98, whether or not zooming has arrived at the point J is discriminated. If zooming has arrived at point J, the flow proceeds to step S99. If a negative discrimination is made, the flow proceeds to step S102. In step S99, the OZ zoom down operation is stopped. In step S102, whether or not the switch ZDS has been switched off is discriminated. If it has been switched off, the flow proceeds to step S95 shown in FIG. 19. If it has been negated, the flow returns to step S98. In next step S100, whether or not zooming has arrived at point E is discriminated. If zooming has arrived at the point E, the flow proceeds to step S101 in which the EZ zooming down operation is stopped and the trimming magnification β is set to 1. Then, the flow proceeds to step S96 shown in FIG.

19 in which whether or not the switch ZDS has been switched off is discriminated. If the switch ZDS has been switched off, the execution of the program is completed.

Then, a third embodiment will now be described in which the OZ and EZ zooming up/down operations are performed by operating only the zoom up button 2 will now be described. According to the third embodiment, zooming is performed sequentially in the following order: point A→point B→point C→point D→point A as shown in FIG. 12. The structure according to the third embodiment is arranged in such a manner that the zoom down button 3 and the switch ZDS are omitted from the structure according to the first embodiment shown in FIGS. 10 and 11. Therefore, the description about the structure is omitted here. According to this embodiment, the maximum trimming magnification βmax is set to 1.7.

Figure 21:
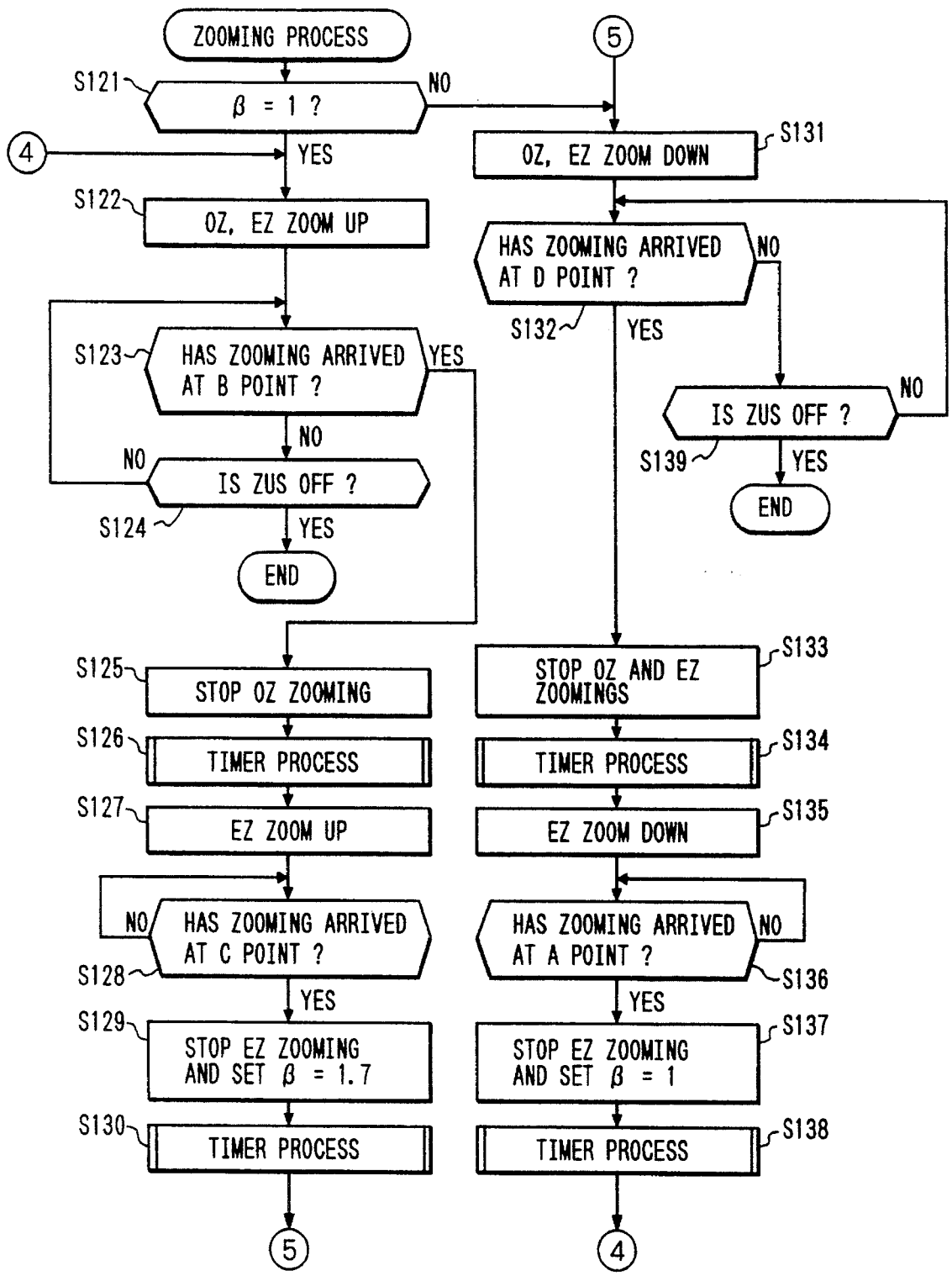
FIG. 21 is a flowchart of a zooming process program.

FIG. 21 is a flow chart which illustrates a program for the zoom process. The microcomputer of the control circuit 4 starts executing the program when the switch ZUS is switched on.

In step S121, whether or not the trimming magnification β is 1, that is, whether or not the photographing mode is the normal photographing mode, is discriminated. If it is the normal photographing mode, the flow proceeds to step S122. If it has been negated, the flow proceeds to step S131. In step S122, the OZ and EZ zoom up operations are started. In next step S123, whether or not zooming has arrived at the point B is discriminated. If zooming has arrived at the point B, the flow proceeds to step S125. If it has been negated, the flow proceeds to step S124. In step S124, whether or not the switch ZUS has been switched off is discriminated. If it has ben switched off, the execution of the program is completed. If it has been negated, the flow returns to step S123. In step S125, the OZ zoom up operation is stopped. In next step S126, the timer process subroutine shown in FIG. 22 is executed.

Figure 22:
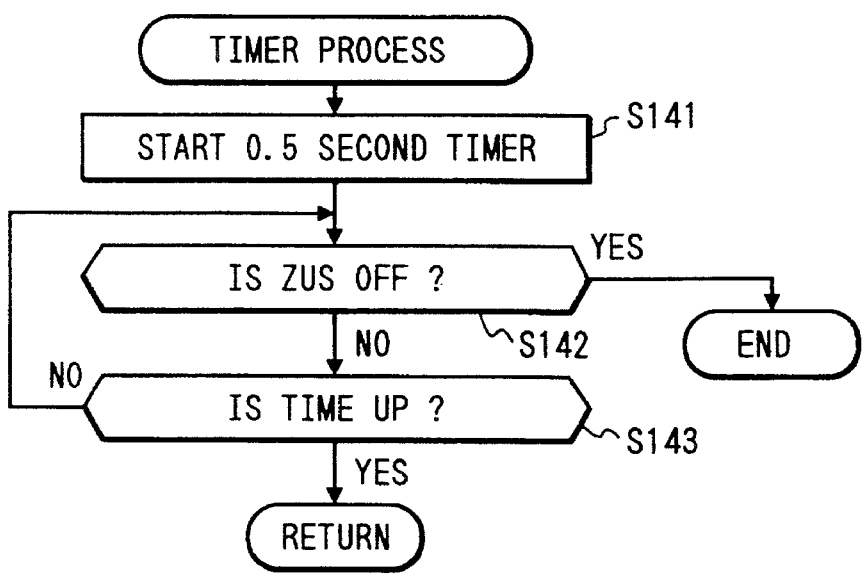
FIG. 22 is a flowchart of a timer process subroutine.

In step S141 shown in FIG. 22, the 0.5-second timer is started. In next step S142, whether or not the switch ZUS has been switched off is discriminated. If it has been switched off, the execution of the program is completed. If it has been negated, the flow proceeds to step S143 in which whether or not the time set by the 0.5-second timer has passed is discriminated. If the time has passed, the flow returns to the program shown in FIG. 21. If it has been negated, the flow returns to step S142. That is, in this timer process subroutine, whether or not the zoom up button 2 has been operated for 0.5 seconds is discriminated. If it has been operated for 0.5 seconds, the zooming operation is continued. If it has been released, the execution of the program is completed. The time which is measured by the timer is not limited to the aforesaid 0.5 seconds.

In step S127 shown in FIG. 21 to which the flow has been returned, the EZ zoom up operation is started. In next step S128, whether or not zooming has arrived at the point C is discriminated. If it has arrived at the point C, the flow proceeds to step S129 in which the EZ zoom up operation is stopped and the trimming magnification β is set to 1.7. In next step S130, the timer process subroutine shown in FIG. 22 is again executed. If the zoom up button 2 has been operated for 0.5 seconds at the point C as described above, the flow proceeds to step S131. In step S131, the OZ and EZ zoom down operations are started. In next step S132, whether or not zooming has arrived at the point D is discriminated. If zooming has arrived at the point D, the flow proceeds to step S133. If it has been negated, the flow proceeds to step S139. In step S133, the OZ and EZ zoom down operations are stopped. In next step S134, the timer process subroutine is executed. If the zoom up button 2 has been operated for 0.5 seconds at the point D, the flow proceeds to step S135 in which the EZ zoom down operation is started. In step S136, whether or not zooming has arrived at the point A is discriminated. If zooming has arrived at the point A, the flow proceeds to step S137. In step S137, the EZ zoom down operation is stopped and the trimming magnification β is set to 1. Then, the timer process subroutine is executed. If the zoom up button has been operated for 0.5 seconds at the point A, the flow returns to step S122. If a negative discrimination is made in step S132, whether or not the switch ZUS has been switched off is discriminated in step S139. If it has been switched off, the execution of the program is completed. If it has been negated, the flow returns to step S132.

As described above, when the zoom up button 2 has been operated for a predetermined time at position of the longest focal length FT of the zoom lens 1, the trimming magnification β is set to the maximum trimming magnification βmax. If the zoom button 3 is then operated, the zoom lens 1 is zoomed down while maintaining the maximum trimming magnification βmax. If the zoom down button 3 has been operated for a predetermined time at the position of the shortest focal length FW of the zoom lens 1, the trimming magnification β is set to 1. Therefore, the focal length of the zoom lens can be continuously changed from the shortest focal length FW to the longest pseud focal length. Furthermore, the conventional necessity of adjusting the focal length of the printing lens at the time of the printing process according to the various trimming magnifications β at the time of the photography operation can be eliminated. Therefore, the time taken to complete the printing process can be shorted and thereby the cost required to perform the printing process can be reduced.

Furthermore, as described in the second embodiment, in a case where the maximum trimming magnification βmax is larger than the zoom ratio FT/FW of the zoom lens 1, the trimming magnification β can be set in a stepped manner in the range from the longest focal length FT to the pseud focal length which is defined by the product of the shortest focal length FW and the maximum trimming magnification βmax. Therefore, the focal length of the zoom lens can be continuously changed from the shortest focal length FW to the longest pseud focal length with the minimum kinds of the trimming magnifications β. Furthermore, the time taken to complete the printing process can be shortened and the cost required to complete the printing process can be reduced.

Furthermore, since the zoom up and zoom down operations are performed by one zoom lens operation button as described above, the handling facility can be improved.

The maximum trimming magnification βmax and the intermediate trimming magnification are not limited to the aforesaid magnifications. Any magnification may be employed so far as it is smaller than the maximum trimming ratio which is used at a process of enlarging and printing the normal size in a laboratory.

In the structures according to the aforesaid embodiments, the zoom up button 2 and the zoom down button 3 constitute an operation device, the control circuit 4 constitutes a control device and the zoom lens constitutes an electromotive zoom lens.

As described above, according to an embodiment of the present invention, when the operation device is further operated to the zoom up side at the position of the longest focal length FT of the electromotive zoom lens, the trimming magnification β is set to the maximum trimming magnification βmax. When the operation device is then operated to the zoom down side, the electromotive zoom lens is zoomed down while maintaining the maximum trimming magnification βmax. When the operation device is further operated to the zoom down side at the position of the shortest focal length FW of the electromotive zoom lens, the trimming magnification β is changed from the maximum trimming magnification βmax to 1. Therefore, the focal length of the zoom lens can be continuously changed from the shortest focal length FW to the longest pseud focal length. Furthermore, the magnification β at the time of trimming photographing can be reduced to one type, that is, the maximum magnification βmax. As a result, the time taken to complete the printing process can be shortened and thereby the cost required to complete the printing process can be reduced.

Furthermore, as described in the embodiment of the present invention, in a case where the maximum trimming magnification βmax is larger than the zoom ratio FT/FW of the electromotive zoom lens, the trimming magnification β can be set in a stepped manner in the range from the longest focal length FT to the pseud focal length which is defined by the product of the shortest focal length FW and the maximum trimming magnification βmax. Therefore, the focal length of the zoom lens can be continuously changed from the shortest focal length FW to the longest pseud focal length with the minimum kinds of the trimming magnifications β. Furthermore, the time taken to complete the printing process can be shortened and the cost required to complete the printing process can be reduced.

Figure 5:
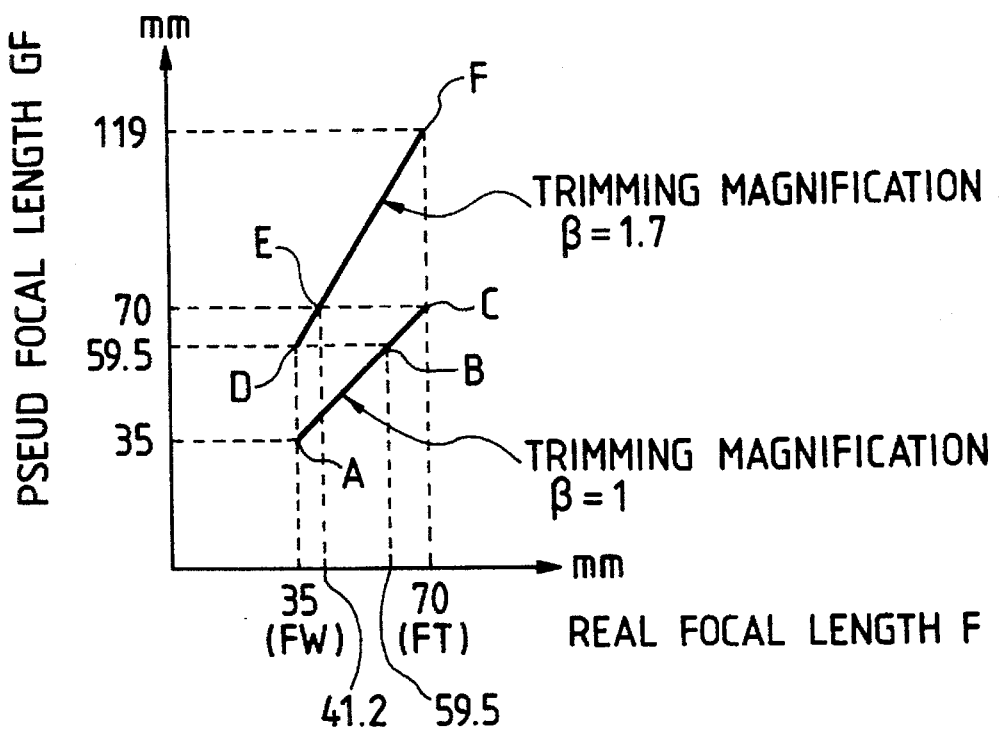
FIG. 5 is a diagram of the real focal length F and the pseudo focal length GF of a camera capable of trimming photographing in yet another aspect of the present invention.
Figure 6:
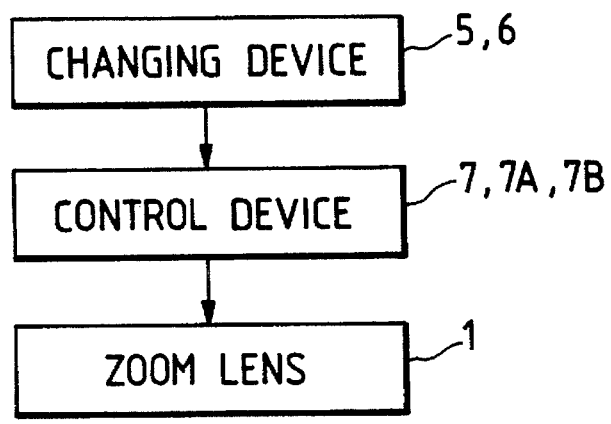
FIG. 6 is a diagram of a camera in a further aspect of the present invention.

A fourth embodiment of the present invention will now be described with reference to FIG. 5.

According to this embodiment, the range of the focal length F=59.5 to 70 mm in the zoom range of the zoom lens 11 overlaps with the range of the pseud focal length GF=59.5 to 70 mm at the time of the trimming photographing operation performed with the magnification β=1.7.

When the zoom up button 2 or the zoom down button 3 is operated, the real focal length F, the trimming magnification β and the pseud focal length GF of the zoom lens 1, the finder zoom lenses 27 and 28 are changed as follows:

Assumptions are made here that the zoom lens 1 and the finder zoom lenses 27 and 28 are located at the wide end FW and the photographing mode is the normal photographing mode in which the trimming magnification β is 1. When the zoom up button 2 is operated, the zoom lens 1 and the finder zoom lenses 27 and 28 are zoomed up from the point A, causing the real focal length F and the pseud focal length GF to be increased. As a result, zooming arrives at point C via the point B. Thus, zoom up of the zoom lens 1 and those of the finder zoom lenses 27 and 28 are stopped. When the zoom up button 2 is further operated at the point C, only the zoom lens 1 is zoomed down, and it arrives at the point E. As a result, the trimming magnification β is set to 1.7. All of the zoom lens 1 and the finder zoom lenses 27 and 28 are zoomed up from the point E. Thus, zooming arrives at the point F at which the real focal length F and the pseud focal length GF=119 mm.

When the zoom down button 3 is then operated at the point F, the zoom lens 1 and the finder zoom lenses 27 and 28 are zoomed down while maintaining the trimming magnification β=1.7. As a result, the real focal length F and the pseud focal length GF are decreased, causing zooming to arrive at the point D via the point E. When the zoom down button 3 is further operated at the point D, only the zoom lens 1 is zoomed up, and zooming arrives at the point B. Therefore, the trimming magnification β is again set to 1. Then, all of the zoom lens 1 and the finder zoom lenses 27 and 28 are zoomed down and zooming returns to the point A. That is, the normal photography is performed with any one of the real focal lengths F on a straight line passing from the point A to the point C, while the trimming photographing operation with the trimming magnification β=1.7 is performed with any one of the pseud focal lengths GF on a straight line passing from the point F to the point D. That is, the photographing mode can be selected from a group consisting of normal photographing and the trimming photographing in a range of the focal length from 59.5 to 70 mm.

Figure 24:
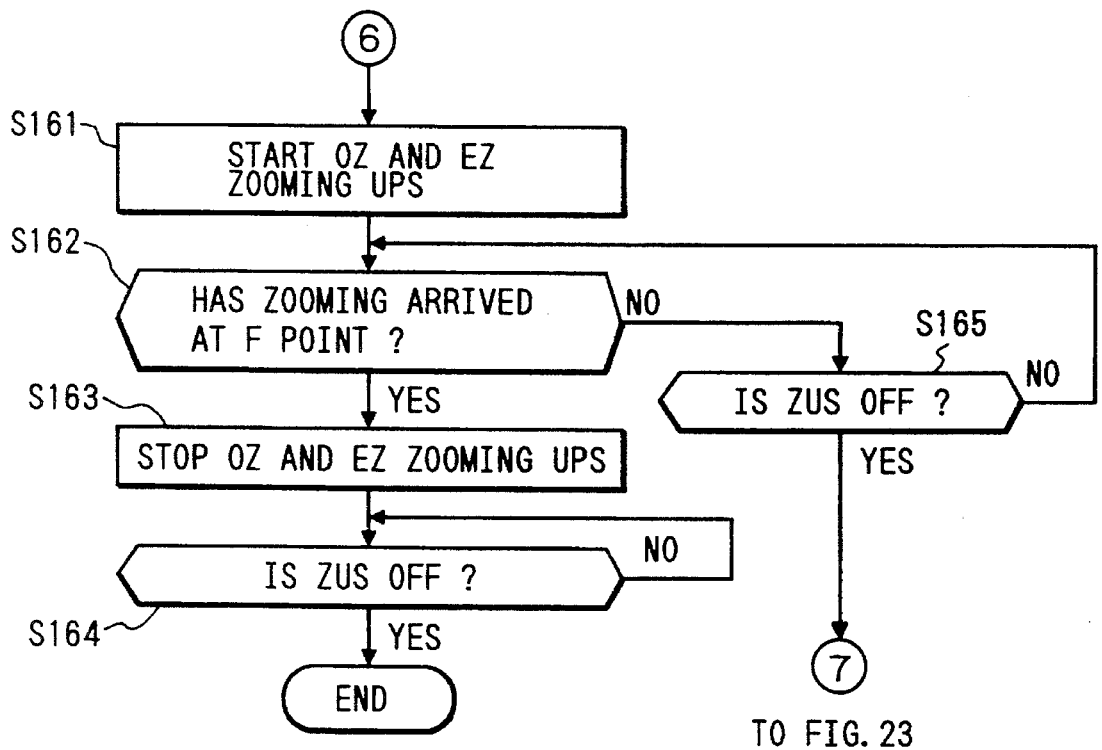
FIGS. 23 and 24 are flowcharts of an example of a zoom-up process program.
Figure 23:
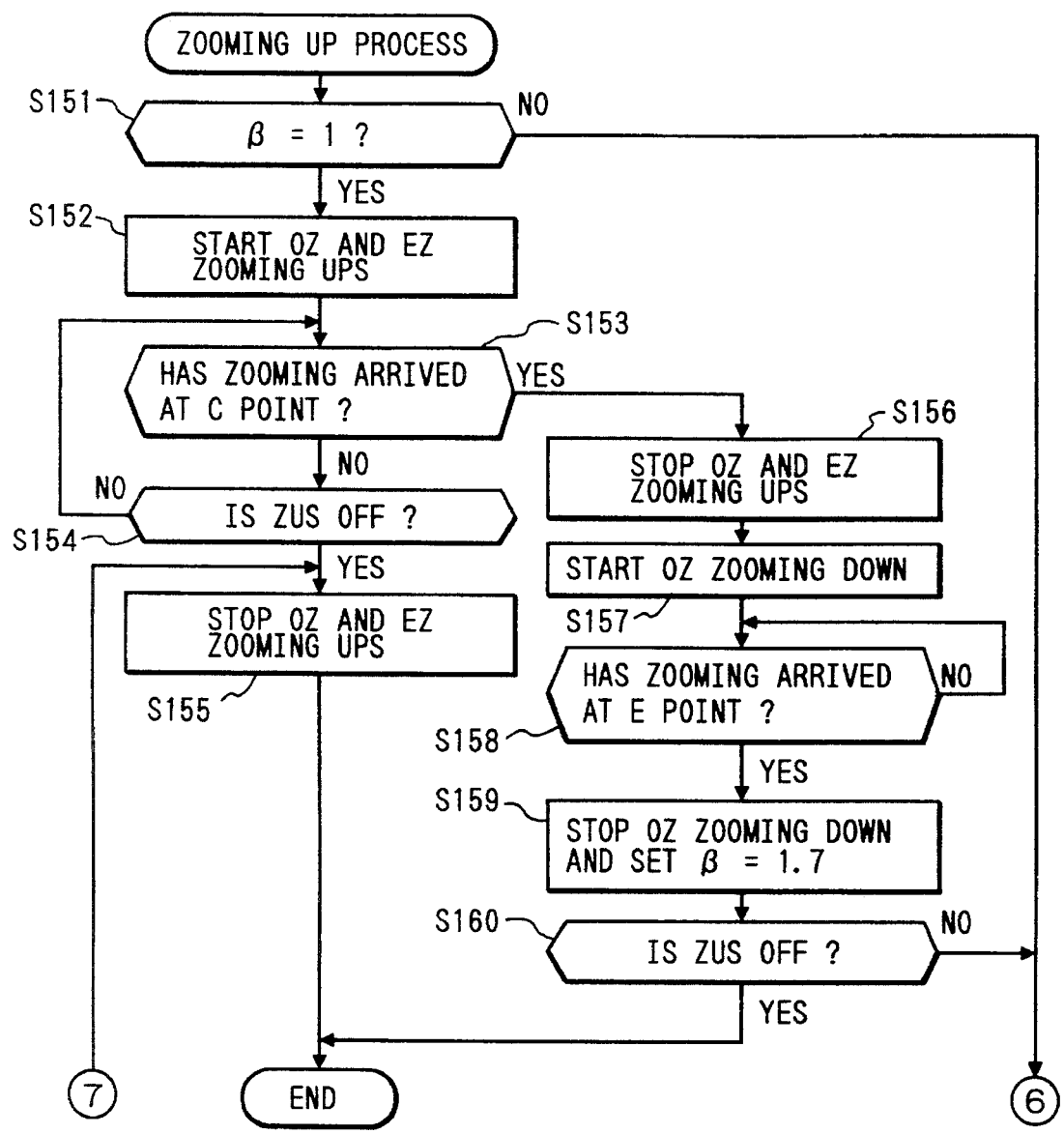

FIGS. 23 and 24 illustrate a program for the zoom up process to be executed in the microcomputer of the control circuit 4. The microcomputer starts executing the program when the zoom up button 2 is operated and the switch ZUS is switched on. The zoom up process will now be described with reference to FIGS. 23 and 24. The operation of zooming the zoom lens 1 is hereinafter called "OZ zoom up/down", while the operation of zooming the finder zoom lenses 27 and 28 is hereinafter called "EZ zoom up/down".

In step S151, whether or not the trimming magnification β is 1 is discriminated. If β=1, that is, the photographing mode is the normal photographing mode, the flow proceeds to step S152. If it has been negated, the flow proceeds to step S161 shown in FIG. 24. In step S152, the zoom lens motor driving circuit 12 is controlled so as to zoom up the zoom lens 1 (OZ zoom up). Furthermore, the finder zoom lens motor driving circuit 16 is controlled so as to zoom up the finder zoom lenses 27 and 28 (EZ zoom up). In next step S153, whether or not zooming has arrived at the point C shown in FIG. 5 is discriminated. If it has arrived at the point C, the flow proceeds to step S156. If it has been negated, the flow proceeds to S154. In step S154, whether or not the switch ZUS has been switched off, that is, whether or not the zoom up button 2 has been released, is discriminated. If it has been released, the flow proceeds to step S155. If it has been negated, the flow returns to step S153. In step S155, the OZ and EZ zoom up operations are stopped. Thus, the execution of the program is completed.

If a discrimination has been made in step 153 that zooming has arrived at the point C, the OZ and EZ zoom up operations are stopped in step S156. In next step S157, the OZ zoom down operation is started. In step S158, whether or zooming has arrived at the point E is discriminated. If zooming has arrived at the point E, the flow proceeds to step S159, the OZ zoom down operation is stopped and the trimming magnification β is set to 1.7. In step S160, whether or not the switch ZUS has been switched off is discriminated. If it has been switched off, the execution of the program is completed. If it has not been switched off, the flow proceeds to step S161 shown in FIG. 24.

In step S161 shown in FIG. 23, the OZ and EZ zoom up operations are started. In next step S162, whether or not zooming has arrived at the point F is discriminated. If zooming has arrived at the point F, the flow proceeds to step S163. If it has been negated, the flow proceeds to step S165. The OZ and EZ zoom up operations are stopped in step S163, and whether or not the switch ZUS has been switched off is discriminated in step S164. If it has been switched off, the execution of the program is completed. If a discrimination has been made in step S162 that zooming has not arrived at the point F, whether or not the switch ZUS has been switched off is discriminated in step S165. If it has been switched off, the flow proceeds to step S155 shown in FIG. 23. If it has been negated, the flow returns to step S162.

Figure 25:
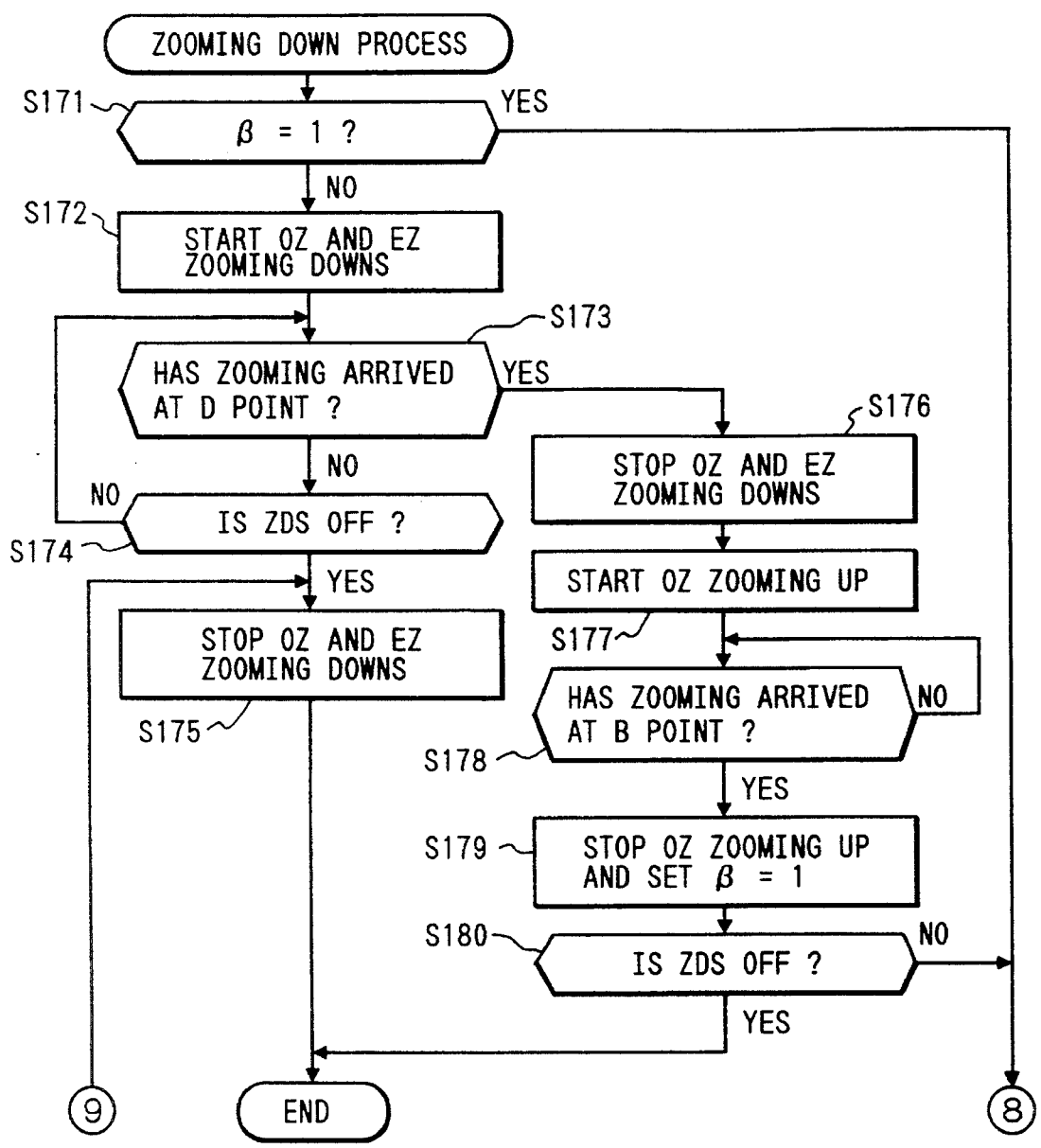
FIGS. 25 and 26 are flowcharts of an example of a zoom-down process program.
Figure 26:
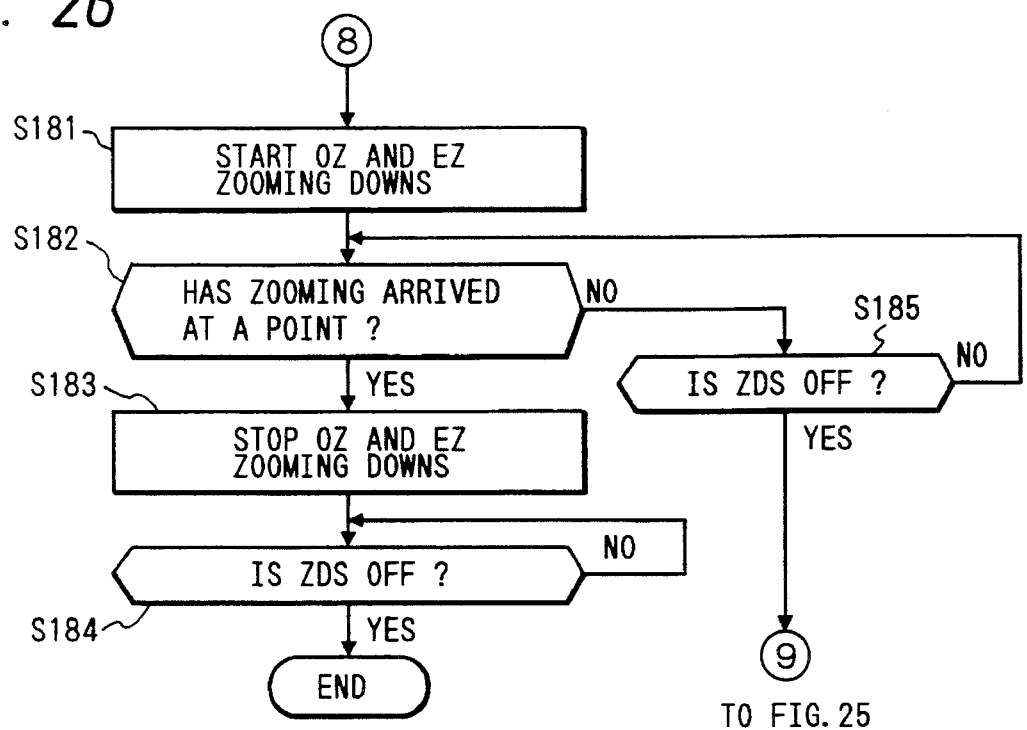

FIGS. 25 and 26 illustrate the program for the zoom down process to be executed by the microcomputer of the control circuit 4. The microcomputer starts executing the program when the zoom button 3 is operated and thereby the switch ZDS is switched on. The zoom down process will now be described with reference to FIGS. 25 and 26.

In step S171, whether or not the trimming magnification β is 1 is discriminated. If the photographing mode is the normal photographing mode in which the trimming magnification β is 1, the flow proceeds to step S181 shown in FIG. 26. If it has been negated, the flow proceeds to step S172. In step S172, the OZ and EZ zoom down operations are started since the present photographing mode is the trimming photographing mode in which the trimming magnification β is 1.7. In next step S173, whether or not zooming has arrived at the point D is discriminated. IF the zooming has arrived at the point D, the flow proceeds to step S176. If it has been negated, the flow proceeds to step S174. In step S174, whether or not the switch ZDS has been switched off, that is, whether or not the zoom down button 3 has been released, is discriminated. If it has been opened, the flow proceeds to step S175. If it has been negated, the flow returns to step S173.

If a discrimination has been made in step S173 that zooming has arrived at the point D, the OZ and EZ zoom down operations are stopped in step S176. In next step S177, the OZ zoom up operation is started. In next step S178, whether or not zooming has arrived at the point B is discriminated. If zooming has arrived at the point B, the flow proceeds to step S179. In step S179, the OZ zoom up operation is stopped and the trimming magnification β is set to 1. In next step S180, whether or not the switch ZDS has been switched off is discriminated. If it has been switched off, the execution of the program is completed. If it has been negated, the flow proceeds to step S181 shown in FIG. 26.

In step S181 shown in FIG. 26, the OZ and EZ zoom down operations are started. In next step S182, whether or not zooming has arrived at the point A is discriminated. If a discrimination has been made that zooming had arrived at the point A, the flow proceeds to step S183. If it has been negated, the flow proceeds to step S185. In step S183, the OZ and EZ zoom down operations are stopped. In next step S184, whether or not the switch ZDS has been switched off is discriminated. If it has been switched off, the execution of the program is completed. If a discrimination is made in step S182 that zooming has not arrived at the point A, whether or not the switch ZDS has been switched off is discriminated in step S185. If it has been switched off, the flow proceeds to step S175 shown in FIG. 25. If it has been negated, the flow returns to step S182.

As described above, the trimming magnification β is set so as to make the focal length F=59.5 to 70 mm (B to C) which is a part of the optical zoom range F=35 to 70 mm (A to C) overlap the focal length GF=59.5 to 70 mm (D to E) which is a part of the pseud zoom range GF 59.5 to 119 mm (D to F). Furthermore, the focal length of the optical zoom range is selected by the zoom up operation and the pseud zoom range is selected by the zoom down operation. Therefore, pseud zoom photographing in which the wide side of the zoom lens is used or normal zoom photographing in which the telephoto side of the zoom lens is used can be selected according to the photographing status. That is, in the latter case in which trimming photographing is performed in such a manner that the pseud focal length GF=59.5 to 70 mm corresponding to D to E shown in FIG. 5, the zoom lens 1 is in a range from the real focal length F=35 and F=41.2 mm. Therefore, the photography can be performed by using a bright portion of the lens in which the aperture F-value is small as compared with that on the telephoto side. On the other hand, in the latter case in which the normal zoom photographing operation is performed in the real focal length F is ranged from 59.5 mm to 70 mm, the photographed frame is printed as it is as compared with the aforesaid trimming photographing operation in which the photographed frame is trimmed and enlarged. Therefore, a zoom up picture having fine image particles can be obtained at the time of the printing operation. In both cases, zoom up pictures of the same magnification can be obtained and the optimum side can be selected according to the status of the photographing operation.

Although the aforesaid embodiment uses the camera having the zoom lens having a focal length variable range of 35 to 70 mm and a zoom ratio FT/FW=2 and capable of performing the trimming photographing operation, the focal length variable range and the zoom ratio of the zoom lens are not limited to the aforesaid values.

The overlap range of the real focal length F of the optical zoom range and the pseud focal length GF of the pseud zoom range is not limited to the value according to the aforesaid embodiment.

In general, a portion of the optical zoom range and a portion of the pseud zoom range are able to overlap in a case where the shortest focal length FW, the longest focal length FT and the trimming magnification β of the zoom lens hold the following relationship:

$$FT > \beta FW$$

That is, $$\alpha > \beta$$

where α is the zoom ratio of the zoom lens expressed by α=FT/FW.

In general, the trimming magnification β must be determined, for example, as follows in order to achieve the object of the present invention while taking the limit present in designing the zoom lens into consideration:

$$\beta < (FT/FW)/1.15 \text{ (when } \alpha \leq 2)$$

$$\beta < \alpha/1.15 \text{ (when } \alpha \leq 2) \qquad (2)$$

$$\beta < (FT/FW)/1.25 \text{ (when } \alpha > 2)$$

$$\beta < \alpha/1.25 \text{ (when } \alpha > 2) \qquad (3)$$

As described above, the trimming magnification is set so as to make the portion of the focal length of the optical zoom range overlap the portion of the focal length of the pseud zoom range. The pseud zoom photographing operation in which the wide side of the zoom lens having a small aperture F-value is used or the normal zoom photographing operation in which the telephoto side of the zoom lens is used so as to obtain a print having fine image particles can be selected according to the status of the photographing operation.

A fifth embodiment of the present invention will now be described.

Figure 27:
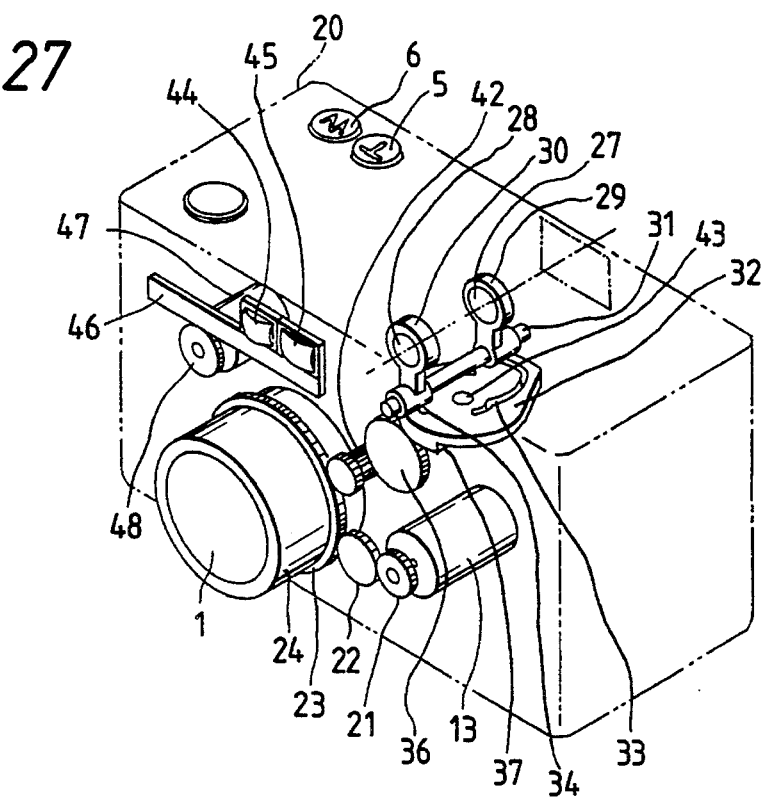
FIG. 27 is a perspective view of a camera capable of trimming photographing in accordance with a fifth embodiment of the present invention.

FIG. 27 is a perspective view which illustrates a fifth embodiment of the camera capable of performing the trimming photographing operation.

The lens barrel ring 24 for holding the zoom lens 1 is fastened to the camera body 20, the lens barrel ring 24 being rotated by the zoom lens motor 13 by means of the gear 21 fastened to the rotational shaft of the zoom lens motor 13, the synchronizing gear 22 and a lens barrel gear 23 fastened to the outer surface of the lens barrel ring 24 so as to be zoomed from the wide end to the telephoto end. According to this embodiment, a zoom lens having a focal length F=35 to 70 mm and a zoom ratio FT/FW=2 is used. The lens barrel ring 24 includes an encoder (omitted from illustration) so as to detect the position of the zoom lens 1, that is, the focal length F.

The finder zoom lenses 27 and 28 are held by the lens holding members 29 and 30. The lens holding members 29 and 30 are held by the guide shaft 31 slidably in the longitudinal direction, and are also respectively engaged with the cam grooves 33 and 34 of the finder cam 32. The finder cam 32 is driven in synchronization with the rotation of the lens barrel ring 24 which is driven by the zoom lens motor 13, the finder cam 32 being driven via a two-step gear 42, the synchronizing gear 36 and the gear portion 37 formed on the reverse side of the finder cam 32. As a result, the finder cam 32 is rotated around a cam shaft 43. When the finder cam 32 is rotated, the lens holding members 29 and 30 slide on the guide shaft 31 in the longitudinal direction, so that the finder zoom lenses 27 and 28 are zoomed from the shortest focal length 35 mm to the longest focal length 70 mm.

Converters 44 and 45 are inserted into a portion on the optical axis of the zoom finder so as to vary the focal length of the finder zoom lenses 27 and 28 according to the trimming magnification β at the time of the pseud zoom photographing operation. According to this embodiment, the converter lens 44 has a magnification variation ratio corresponding to the trimming magnification β=1.7, while the converter lens 45 has a magnification variation ratio corresponding to the trimming magnification β=2.0. Since the finder zoom lenses are zoomed in its focal length range from 35 to 70 mm by the aforesaid driving mechanism, the insertion of the converter lens 44 into a portion on the optical axis of the zoom finder causes the focal length of the zoom finder to be varied from in a range from 59.5 to 119 mm. That is, the thus varied focal length is the pseud focal length GF in a case where the trimming magnification β is 1.7. Similarly, when the converter lens 45 is inserted into a portion on the optical axis of the zoom finder, the focal length of the zoom finder is varied in a range from 70 to 140 mm. The aforesaid focal length becomes the pseud focal length GF in a case where the trimming magnification β is 2.0.

The converter lenses 44 and 45 are held by a rack 46. The rack 46 is engaged with a pinion gear 48 provided on the rotational shaft of the converter lens motor 47. The converter lenses 44 and 45 are driven by the converter lens motor 47 via the pinion gear 48, so that a lens corresponding to the trimming magnification β is moved to the optical axis of the zoom finder at the time of the pseud zoom photographing operation. The method of varying the magnification of the zoom finder at the time of the pseud zoom photographing operation is not limited to the method according to the aforesaid embodiment. Another method may be employed in which the zoom finder is driven by a power source provided individually from that for the zoom lens 1 and zooming is performed from the shortest focal length of the zoom lens 1 to the longest pseud focal length with the trimming magnification β. In the normal zoom photographing mode in the optical zoom range, the aforesaid converter lenses 44 and 45 are retracted from the optical axis of the zoom finder. Reference numeral 5 represents a zoom up button for zooming up the zoom lens 1, and 6 represents a zoom down button for zooming down the zoom lens 1.

Figure 28:
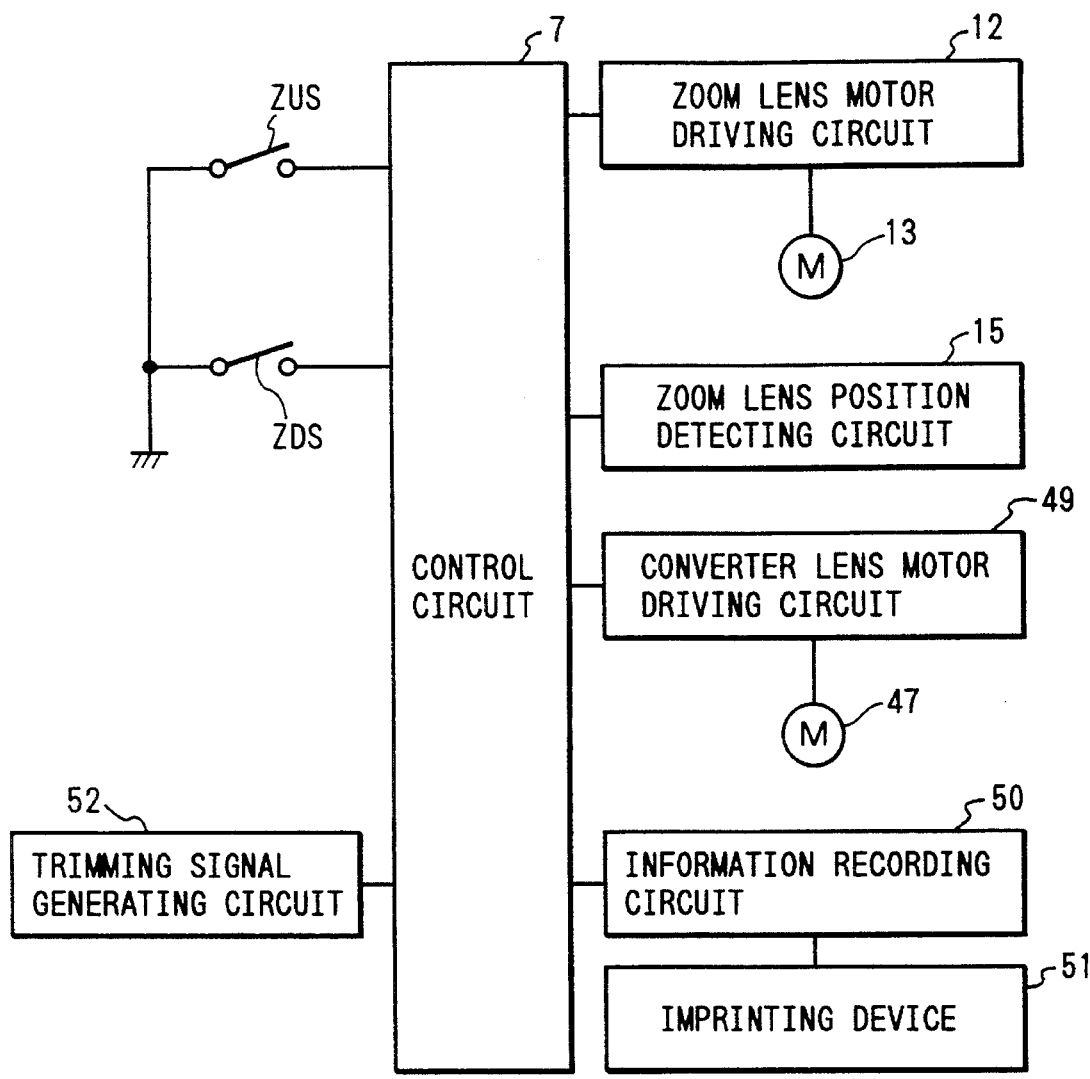
FIG. 28 is a block diagram of the construction of the fifth embodiment.

FIG. 28 is a block diagram which illustrates the structure of the fifth embodiment of the present invention.

Reference numeral 7 represents a control circuit composed of a microcomputer and its peripheral elements, the control circuit 7 performing the sequence process of the camera and as well as executing a control program to be described later so as to control the zooming operation. Reference numeral 12 represents a zoom lens motor driving circuit for driving the zoom lens motor 13 so as to zoom the zoom lens 1 and the finder zoom lenses 27 and 28. Reference numeral 15 represents a zoom lens position detection circuit for detecting the position of the zoom lens 1, that is, the focal length F by means of the aforesaid encoder. Reference numeral 49 represents a converter lens motor driving circuit for driving the converter lens motor 47 so as to move the converter lenses 44 and 46 to the optical axis of the zoom finder. Reference numeral 50 represents an information recording circuit for driving a imprinting device 51 so a to imprint the trimming magnification β and the like at the time of the pseud zoom photographing mode to a portion outside the frame adjacent to the photographed frame. The method of recording information is not limited to the aforesaid optical method. A method of magnetically recording information to a magnetic track on the film via a magnetic head or a method in which information is recorded to an IC card or the like while making information to correspond to the photographed frame number.

Reference numeral 52 represents a trimming signal generating circuit for generating a signal denoting the type of the converter lenses 44 or 45 inserted into the portion on the optical axis of the zoom finder. That is, the trimming signal generating circuit generates a signal denoting that the trimming magnification β is 1.7 in a case where the converter lens 44 is inserted, while the same generates a signal denoting that the trimming magnification β is 2.0 in a case where the converter lens 45 is inserted. Symbol ZUS represents a switch which is switched on when the zoom up button 5 is depressed and ZDS represents a switch which is switched on when the zoom down button 6 is depressed.

In the structure according to the aforesaid embodiment, the zoom up button 5 and the zoom down button 6 constitute a switch device and the control circuit 7 constitutes a control device.

Figure 29:
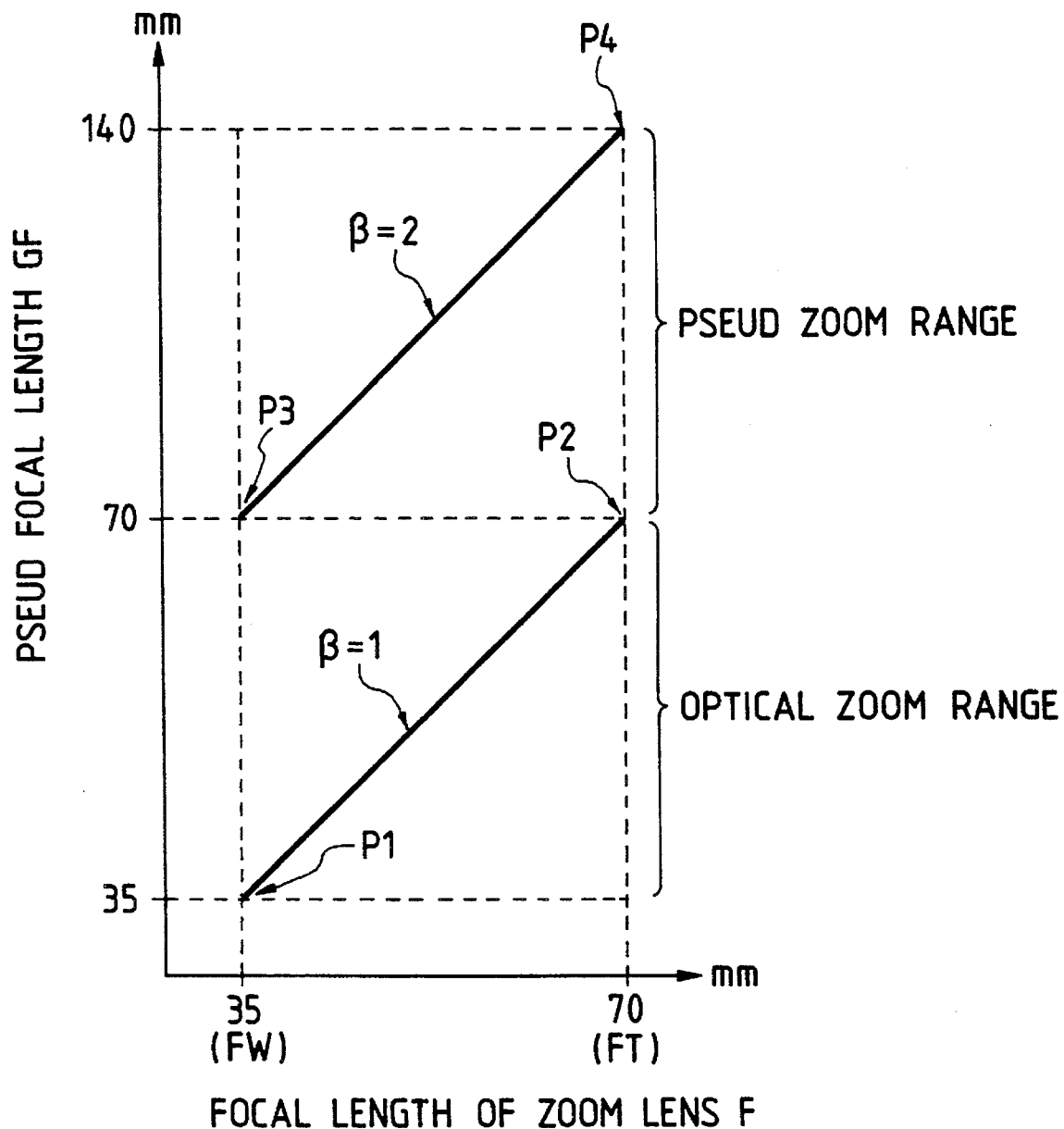
FIG. 29 is a diagram of an example of zooming of the zoom lens.

FIG. 29 illustrates an example of zooming of the zoom lens 1. In this example, the focal length F of the zoom lens is assumed to be 35 to 70 mm and the trimming magnification β is assumed to be 2.0.

In a case where the trimming magnification β=1, that is, the photographing mode is the normal zoom photographing mode, both of the focal length F of the zoom lens 1 and the pseud focal length GF of the zoom finder are increased in synchronization with the zooming up operation of the zoom lens 1. As a result, the zoom lens 1 arrives at the telephoto end (F=70 mm) at point P2. When the zoom lens 1 is once zoomed down to point P3, the converter lens 45 having the magnification variation ratio corresponding to the trimming magnification β=2.0 is inserted into the portion on the optical axis of the zoom finder. That is, the pseud zoom photographing mode in which the trimming magnification β=2.0 is realized. The pseud focal length GF at this time is the focal length when the pseud zoom photographing operation in which the trimming magnification β=2.0 is performed at the wide end (F=35 mm) of the zoom lens. If a state in which the zoom up button 5 is being depressed is maintained, both of the focal length F of the zoom lens 1 and the pseud focal length GF of the zoom finder are increased in synchronization with the zooming up operation of the zoom lens 1. Therefore, the zoom lens 1 arrives at point P4 at which the pseud focal length GF is the longest length of 140 mm. The longest pseud focal length GF=140 mm is the focal length when the pseud zoom photographing operation in which the trimming magnification β=2.0 is performed at the telephoto end (F =70 mm) of the zoom lens 1.

In the pseud zoom photographing mode in which the trimming magnification β is 2.0, both of the focal length F of the zoom lens 1 and the pseud focal length GF of the zoom finder are decreased in synchronization with the zooming down operation of the zoom lens 1. Therefore, the zoom lens 1 arrives at the point P3. At this time, the zoom lens 1 is temporarily zoomed up to the point P2 and the converter lens 45 is retracted from the optical axis of the zoom finder. That is, the normal zoom photographing mode in which the trimming magnification β is 1 is realized. In the normal zoom photographing mode, the focal length F of the zoom lens 1 and the pseud focal length GF are the same value. If the state in which the zoom button 6 is being depressed is maintained, both of the focal length F of the zoom lens 1 and the pseud focal length GF of the zoom finder are decreased in synchronization with the zoom down operation of the zoom lens 1. Therefore, the zoom lens 1 arrives at the wide end (F=35 mm), that is, the point P1.

Figure 30:
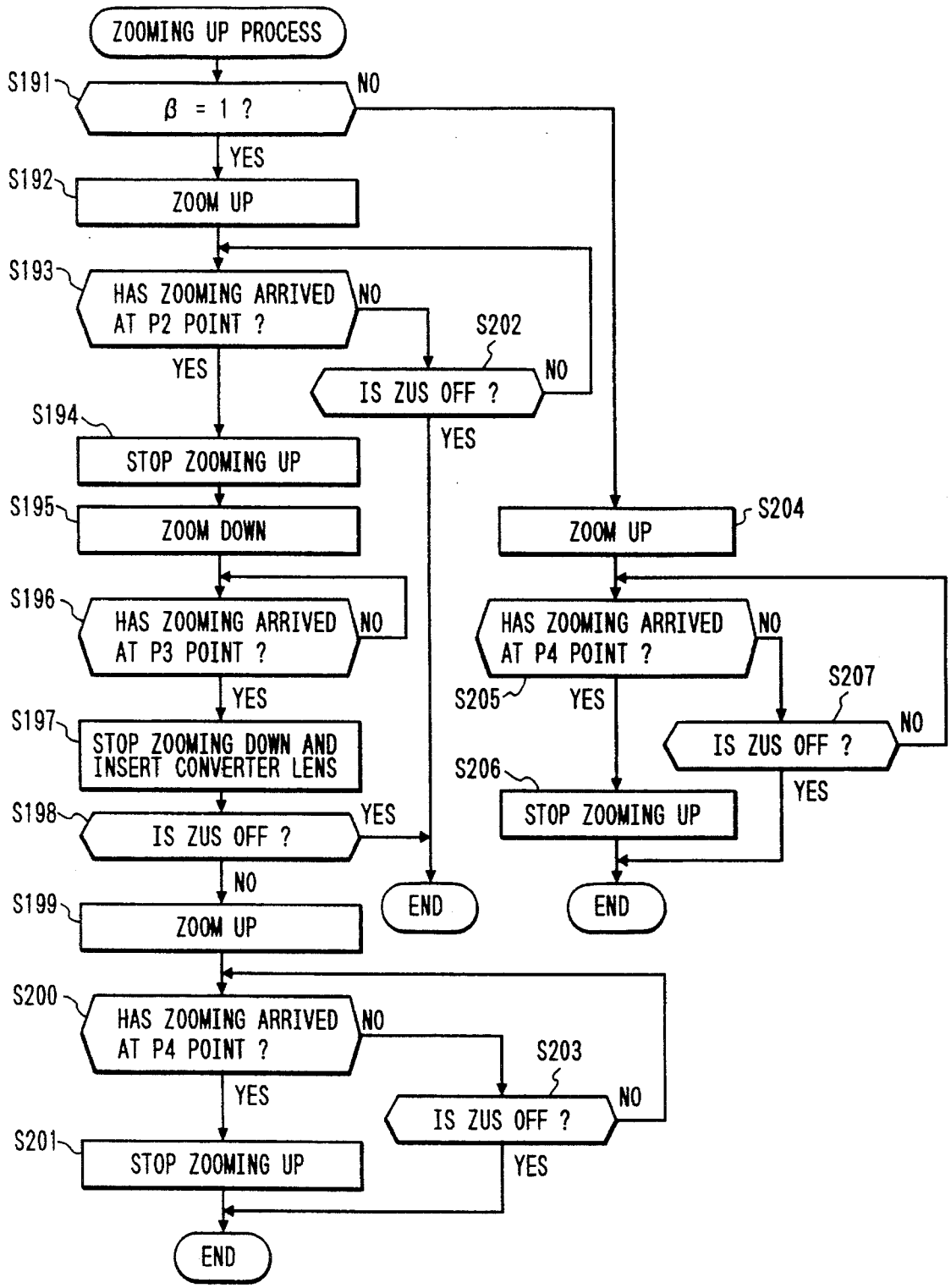
FIGS. 30 and 31 are flowcharts of a zoom-up process program of a microcomputer.
Figure 31:
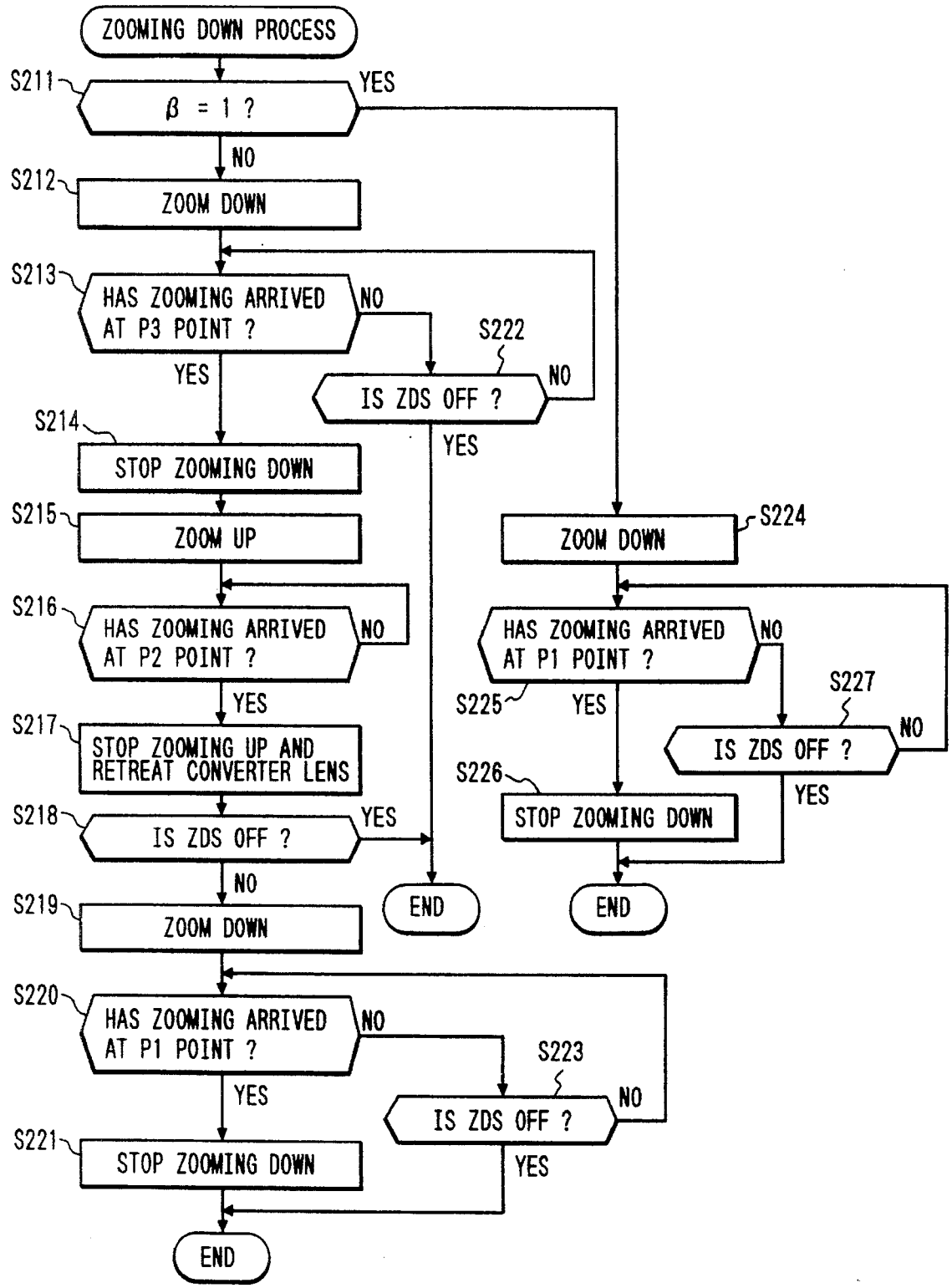

FIGS. 30 and 31 are flow charts which illustrate an example of the program for controlling the microcomputer in a case where the zoom lens 1 is driven according to the graph of the zooming operation. The operation will now be described with reference to the flow charts.

The microcomputer starts executing the program for the zoom up process shown in FIG. 30 when the zoom up button 5 is depressed. After the execution has been started, whether or not the trimming magnification β is 1 is discriminated according to information supplied from the trimming signal generating circuit 52 in step S191. If the trimming magnification β is 1, that is, when the photographing mode is the normal zoom photographing mode, the flow proceeds to step S192. If it has been negated, the flow proceeds to step S204. In step S192, the zoom lens motor driving circuit 12 is controlled so as to start the zooming up of the zoom lens 1. In next step 193, whether or not the zoom lens 1 has arrived at the point P2 is discriminated according to information about the focal length supplied from the zoom lens position detection circuit 15. If it has arrived at the point P2, the flow proceeds to step S194. If it has been negated, the flow proceeds to step S202. In step S202, whether or not the switch ZUS has been switched off, that is, whether or not the zoom up button 5 has been released, is discriminated. If it has been released, the execution of the program is complete. If it has been negated, the flow returns to step S193. In step S194, the zoom lens motor driving circuit 12 is controlled since the zoom lens has arrived at the point P2. As a result, the zooming up of the zoom lens 1 is stopped.

Then, the zooming down of the zoom lens 1 is started in step S195. In next step S196, whether or not zooming has arrived at the point P3 is discriminated. When zooming has arrived at the point P3, the flow proceeds to step S197 in which the zoom down of the zoom lens 1 is stopped and the converter lens motor driving circuit 49 is controlled so as to insert the converter lens 45 into a portion on the optical axis of the zoom finder. In step S198, whether or not the switch ZUS has been switched off is discriminated. If it has been switched off, the execution of the program is completed. If it has been negated, the flow proceeds to step S199. In step S199, zoom up of the zoom lens 1 is restarted. In next step S200, whether or not zooming has arrived at the point P4 is discriminated. If zooming has arrived at the point P4, the flow proceeds to step S201. If it has been negated, the flow proceeds to step S203. In step S201, zooming up is stopped and the execution of the program is completed. In step S203, whether or not the switch ZUS has been switched off is discriminated. If it has been switched off, the execution of the program is completed. If it has been negated, the flow returns to step S200.

If a discrimination is made in step S191 in which the trimming magnification β is not 1, the photographing mode is the pseud zoom photographing mode in which the trimming magnification β is 2.0. Therefore, the zoom lens 1 is zoomed up in step S204. In next step S205, whether or not zooming has arrived at the point P4 is discriminated. If zooming has arrived at the point P4, the flow proceeds to step S206. If it has been negated, the flow proceeds to step S207. In step S206, the zoom up of the zoom lens 1 is stopped and the execution of the program is completed. In step S207, whether or not the switch ZUS has been switched off is discriminated. If it has been switched off, the execution of the program is completed. If it has been negated, the flow returns to step S205.

Then, the microcomputer starts executing the control program shown in FIG. 31 when the zoom down button 6 is depressed. In step S211 after the execution has been started, whether or not the trimming magnification β is 1 is discriminated. If the photographing mode is the normal zoom photographing mode in which the trimming magnification β is 1, the flow proceed to step S224. If it has been negated, the flow proceeds to step S212. In step S212, zoom down of the zoom lens 1 is started. In next step S213, whether or not zooming has arrived at the point P3 is discriminated. If zooming has arrived at the point P3, the flow proceeds to step S214. If it has been negated, the flow proceeds to step S222. In step S222, whether or not the switched ZDS has been switched off, that is, whether or not the zoom down button 212 has been released, is discriminated. If it has ben released, the execution of the program is completed. If it has been negated, the flow returns to step S213. In step S214, zoom down of the zoom lens 1 is stopped.

In next step S215, zoom up of the zoom lens 1 is started. In next step S216, whether or not zooming has arrived at the point P2 is discriminated. If zooming has arrived at the point P2, the flow proceeds to step S217 in which the zoom up of the zoom lens 1 is stopped and the converter lens 45 is retracted from the optical axis of the zoom finder. In next step S218, whether or not the switch ZDS has been switched off is discriminated. If it has been switched off, the execution of the program is completed. If it has been negated, the flow proceeds to step S219. In step S219, zoom down of the zoom lens 1 is restarted. In next step S220, whether or not zooming has arrived at the point P1 is discriminated. If zooming has arrived at the point P1, the flow proceeds to step S221. If it has been negated, the flow proceeds to step S223. In step S221, zoom down of the zoom lens 1 is stopped and the execution of the program is completed. In step S223, whether or not the switch ZDS has been switched off is discriminated. If it has been switched off, the execution of the program is completed. If it has been negated, the flow returns to step S220.

If a discrimination is made in step S211 that the photographing mode is the normal zoom photographing mode in which the trimming magnification β=1, zoom down of the zoom lens 1 is started in step S224. In next step S225, whether or not zooming has arrived at the point P1 is discriminated. If it has arrived at the point P1, the flow proceeds to step S226. If it has been negated, the flow proceeds to step S227. In step S226, zoom down of the zoom lens 1 is stopped and the execution of the program is completed. In step S227, whether or not the switch ZDS has been switched off is discriminated. If it has been switched off, the execution of the program is completed. If it has been negated, the flow returns to step S225.

Figure 32:
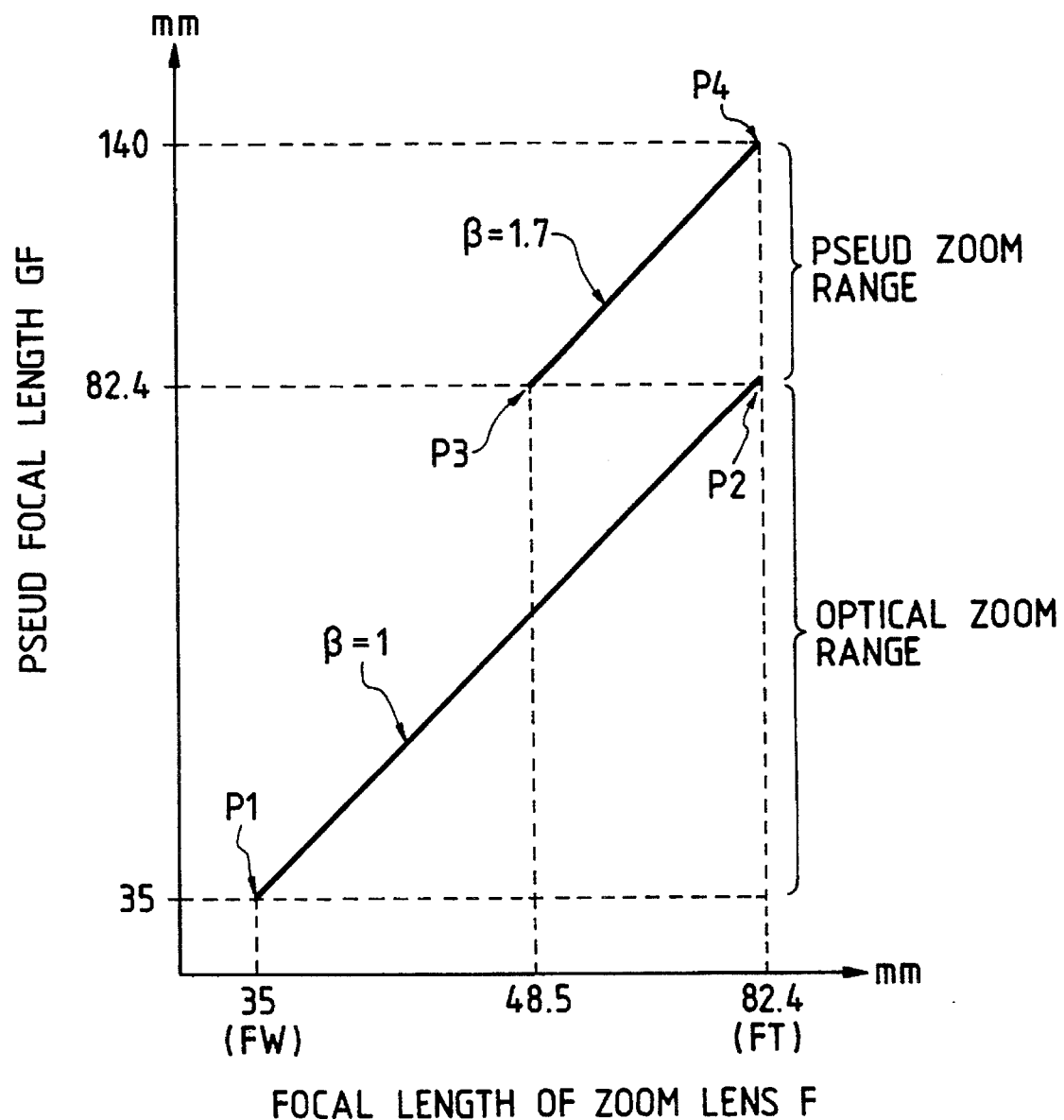
FIG. 32 is a diagram of another example of zooming of the zoom lens.
Figure 33:
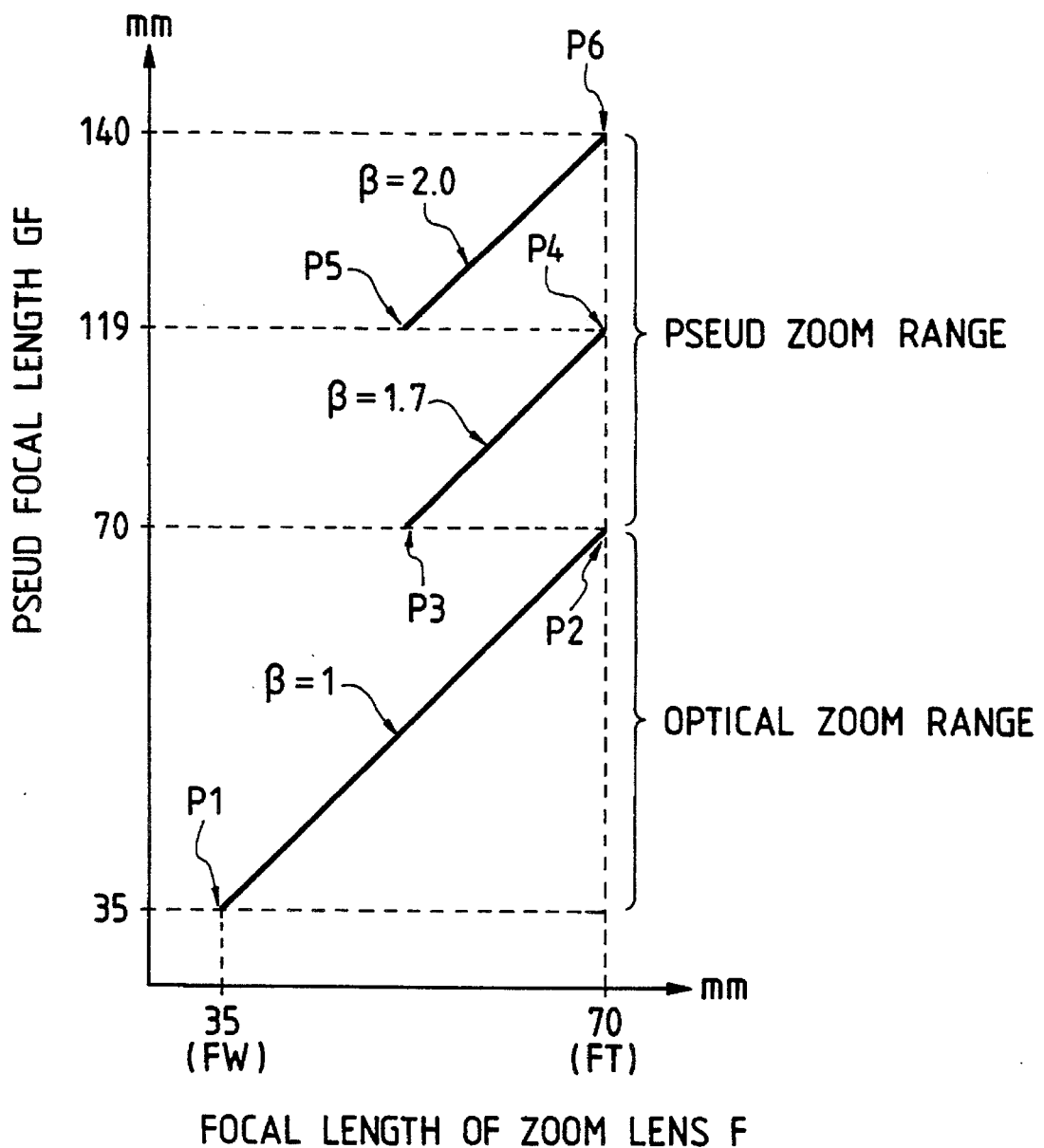
FIG. 33 is a diagram of another example of zooming of the zoom lens.

FIGS. 32 and 33 illustrate another example of zooming of the zoom lens. In the example shown in FIG. 32, the zoom ratio of the zoom lens is enlarged as compared with that shown in FIG. 29, the focal length F is made to be 35 to 82.4 mm and the trimming magnification $\beta$ is made to be 1.7 which is smaller than the zoom ratio. Similarly to the example of zooming shown in FIG. 29, this example is arranged in such a manner that the zoom lens is zoomed up sequentially in the following order as P1→P2→P3→P4. Furthermore, the zoom lens is temporarily zoomed down to the point P3 at the intermediate point P2. In addition, the converter lens 44 is inserted into the portion on the optical axis of the zoom finder so as to switch the photographing mode into the pseud photographing mode. At the time of the zoom down operation, the zoom lens is zoomed down sequentially in the following order as P4→P3→P2→P1. Furthermore, the zoom lens is temporarily zoomed up at the intermediate point P3. Furthermore, the converter lens 44 is retracted from the optical axis of the zoom finder and the photographing mode is switched into the normal zoom photographing mode.

In the example of zooming shown in FIG. 33, the zoom ratio of the zoom lens is made to be the same as that shown in FIG. 29. Furthermore, the trimming magnification $\beta$ at the time of the pseud zoom photographing mode is made to be two kinds, that is, 1.7 and 2.0. At the time of the zoom up operation, the zoom lens is sequentially zoomed up in the following order as P1→P2→P3→P4→P5→P6. Furthermore, the zoom lens is temporarily zoomed down at the intermediate point P2. In addition, the converter lens 44 is inserted into a portion of the optical axis of the zoom finder so as to switch the photographing mode into the pseud zoom photographing mode. Furthermore, the zoom lens is further temporarily zoomed down at an intermediate point P4 and the converter lens 45 is inserted into a portion on the optical axis of the zoom finder. That is, the converter lenses 44 and 45 are switched to each other at an intermediate time according to the trimming magnification $\beta$. At the time of the zoom down operation, the zoom lens is zoomed down sequentially in the following order as P6→P5→P4→P3→P2→P1. Furthermore, the zoom lens is temporarily zoomed at at an intermediate point P5 and the converter lens 45 inserted into the portion on the optical axis of the zoom finder is replaced by the converter lens 44. Furthermore, the zoom lens is temporarily zoomed up at the intermediate point P3 and the converter lens 44 inserted into the portion on the optical axis of the zoom finder is retracted from the optical axis.

According to the aforesaid example of the zooming operation, the zoom lens is zoomed down in such a manner that the focal length F of the zoom lens is changed from 1/1.4 of the focal length in the normal zoom photographing mode to 1/2 of the same at the time of switching from the normal zoom photographing mode to the pseud zoom photographing mode. As a result, an advantage can be obtained in that the composition of the photograph can be continuously set in the boundary between the optical zoom range and the pseud zoom range thanks to the structure arranged in such a manner that the focal length is continuously changed at the time of switching from the normal zoom photographing mode to the pseud zoom photographing mode. However, the operation of zooming the zoom lens must be performed at the time of switching the photographing mode. Therefore, problems arise in that the electric power consumption increases in order to drive the zoom lens and a too long time takes to switch the operation of the zoom lens. Therefore, the movable range of the zoom lens is limited to the above described range at the time of switching the normal zoom photographing mode to the pseud zoom photographing mode.

By limitting the movable range of the zoom lens at the time of switching the mode, the trimming magnification $\beta$ which can be set in the pseud zoom photographing mode is limited. Then, the trimming magnification $\beta$ will now be considered. For example, a comparison is made between a subject photographed with the trimming magnification $\beta=1.2$ and that photographed with the trimming magnification $\beta=1$. The size is not considerably changed and therefore the necessity of continuously changing the trimming magnification can be eliminated and no problem arises even if it is changed in a stepped manner. However, if the trimming magnification $\beta$ is changed from 1 to 1.4, the photographing range, that is, the area, is halved excessively. In this case, the handling facility can be improved by arranging the structure in such a manner that the pseud focal length, that is, the photographing magnification is continuously changed as described above. If the trimming magnification $\beta$ is larger than 2, the enlarging magnification is raised excessively, causing a problem to take place in that the particles of the print become remarkable. Therefore, the normal photographing mode and the pseud zoom photographing mode are switched in a range of the trimming magnification $\beta$ from 1.4 to 2.0 and as well as the focal length is continuously changed at the time of the switching operation.

When the mode is switched from the normal zoom photographing mode to the pseud zoom photographing mode, the zoom lens is zoomed down to a position at which the focal length in the optical zoom range before the switching operation is the same as the pseud focal length in the pseud zoom range after the switching operation. Then, the zoom lens is zoomed up when the zoom up button is then depressed. When the pseud zoom photographing mode is switched to the normal photographing mode, the zoom lens is zoomed up to a position at which the pseud focal length in the pseud zoom range before the switching operation is the same as the focal length in the optical zoom range after the switching operation. Then, the zoom lens is zoomed down when the zoom down button is then depressed. Therefore, the focal length can be continuously changed from the optical zoom range to the pseud zoom range with the minimum trimming magnification. Furthermore, since the number of the kinds of the trimming magnifications can be reduced, the time taken to complete the trimming operation in the printing process can be shortened and therefore the cost required to complete the printing process can be reduced.

Although the aforesaid embodiment is described with reference to the structure in which the zoom lens having the focal length F of 35 to 70 mm and 35 to 82.4 mm is used, the specifications of the zoom lens are not limited to those according to the embodiment. Although the trimming magnification $\beta$ is made to be 1.7 and 2.0, the trimming magnification $\beta$ is not limited to those. The necessity of switching the mode at the telephoto end of the zoom lens can be eliminated. It may be switched at any point in the range in which the focal length of the zoom lens can be varied. In this case, the photographing mode switch may be provided so as to switch the photographing mode. Similarly, the method of switching mode from the pseud zoom photographing mode to the normal zoom photographing mode is not limited to the aforesaid embodiment.

As described above, according to the fifth embodiment, when the mode is switched from the normal zoom photographing mode to the aforesaid pseud zoom photographing mode, the zoom lens is zoomed down to a position at which the focal length in the optical zoom range before the switching operation is the same as the pseud focal length in the pseud zoom range after the switching operation. Therefore, the focal length can be continuously changed with the minimum number of types of the trimming magnifications and thereby the photography composition can be continuously set. Furthermore, the time taken to complete the trimming operation in the printing process can be shortened and therefore the cost required to complete the printing process can be reduced.

According to the fifth embodiment, the zoom lens is zoomed up to a position at which the pseud focal length in the pseud zoom range before the switching operation is the same as the focal length in the optical zoom range after the switching operation when the mode is switched from the pseud zoom photographing mode to the normal zoom photographing mode. Therefore, the focal length can be continuously changed with the minimum number of types of the trimming magnifications and thereby the photography composition can be continuously set. Furthermore, the time taken to complete the trimming operation in the printing process can be shortened and therefore the cost required to complete the printing process can be reduced.

According to the fifth embodiment, when the mode is switched from the normal zoom photographing mode to the aforesaid pseud zoom photographing mode, the zoom lens is zoomed down to a position at which the focal length of the zoom lens is ranged from 1/1.4 to 1/2 of the maximum focal length. Therefore, the time taken to switch the mode can be shortened and the power consumption required to drive the zoom lens can be reduced.

A sixth embodiment of the present invention will now be described.

Figure 34:
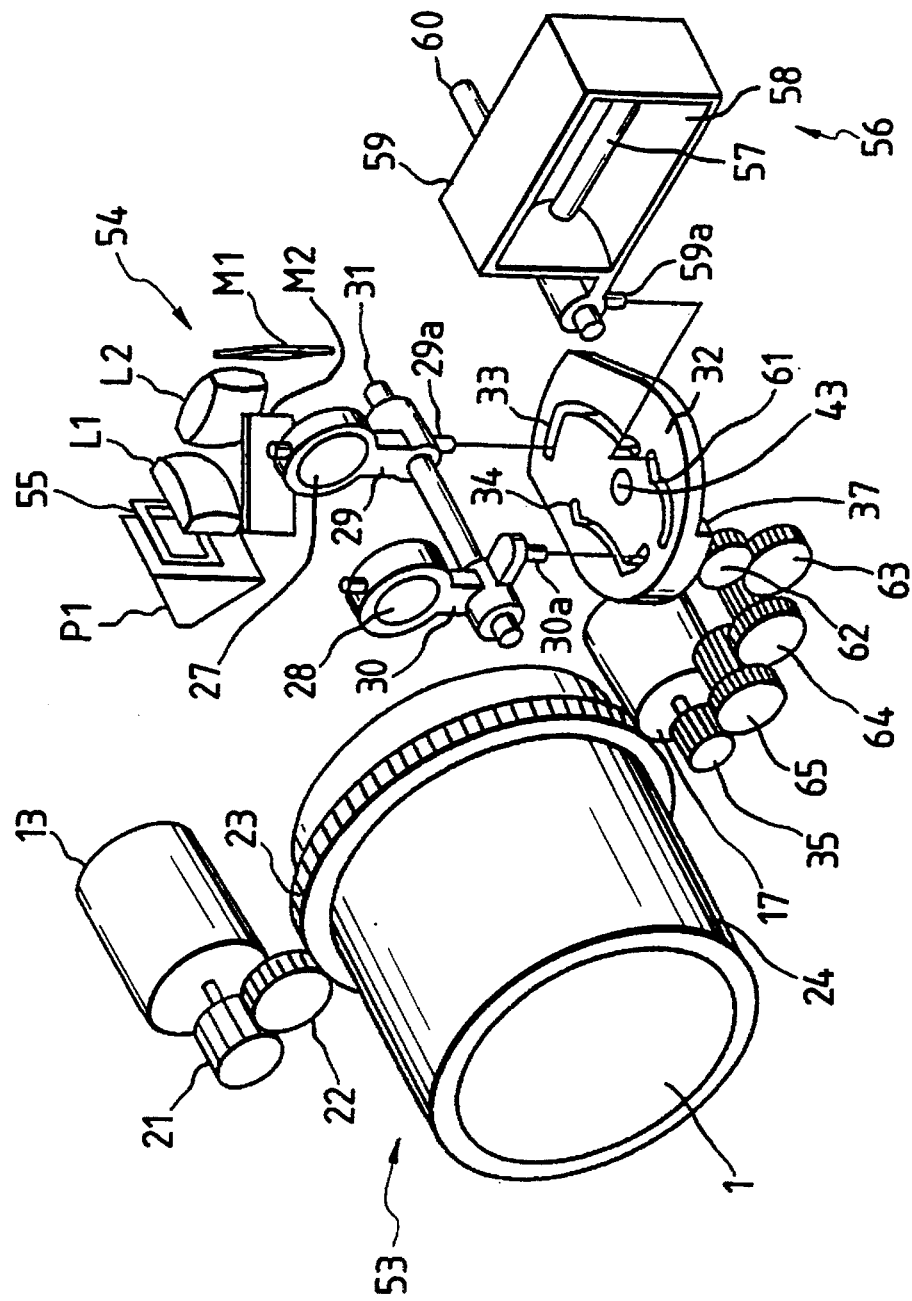
FIG. 34 is a diagram of a zoom lens, a zoom finder and a strobe of a camera in accordance with a sixth embodiment of the present invention.

FIG. 34 illustrates a zoom lens part, a zoom finder part and an electronic flash part of the camera according to the sixth embodiment.

A zoom lens part 53 is composed of the zoom lens 1, the mirror barrel ring 24, the gear part 23 provided on the outer surface of the mirror barrel ring 24, the motor 13, the gear 21 provided on the rotational shaft of the motor 13 and the synchronizing gear 22. The lens barrel ring 24 is driven by the motor 13 via the gear 21, the synchronizing gear 22 and the gear part 23. When the lens barrel ring 24 is rotated, the focal length F of the photographing zoom lens 1 accommodated in the lens barrel ring 24 is changed.

The zoom finder part 54 is composed of the finder zoom lenses 27 and 28, the lens holding members 29 and 30 for holding the finder zoom lenses 27 and 28, the guide shaft 31 for holding the lens holding members 29 and 30 slidably in the direction of the optical axis, mirrors M1 and M2, a prism P1, a field lens L1, a visual field frame 55 and an ocular lens L2. The electronic flash part 56 is composed of a flash tube 57, a reflecting mirror 58, an electronic flash holder 59 for holding the flash tube 57 and the reflecting mirror 58 and guide rode 60 for holding the electronic flash holder 59 slidably in the longitudinal direction.

Follower pins 29a and 30a of the lens holding members 29 and 30 are respectively engaged with cam grooves 33 and 34 of the cam 32. A follower pin 59 of the electronic flash holder 59 is engaged with a cam groove 61 of the cam 32. The cam 32 is driven by the motor 17 via a crown gear part 37 of the cam 32, gears 62, 63 and 64, a two-step gear 65 and the gear 35 provided on the rotational shaft of the motor 17. When the cam 32 is rotated around the cam shaft 43, the zoom finder part 54 and the electronic flash part 56 are zoomed.

Figure 7:
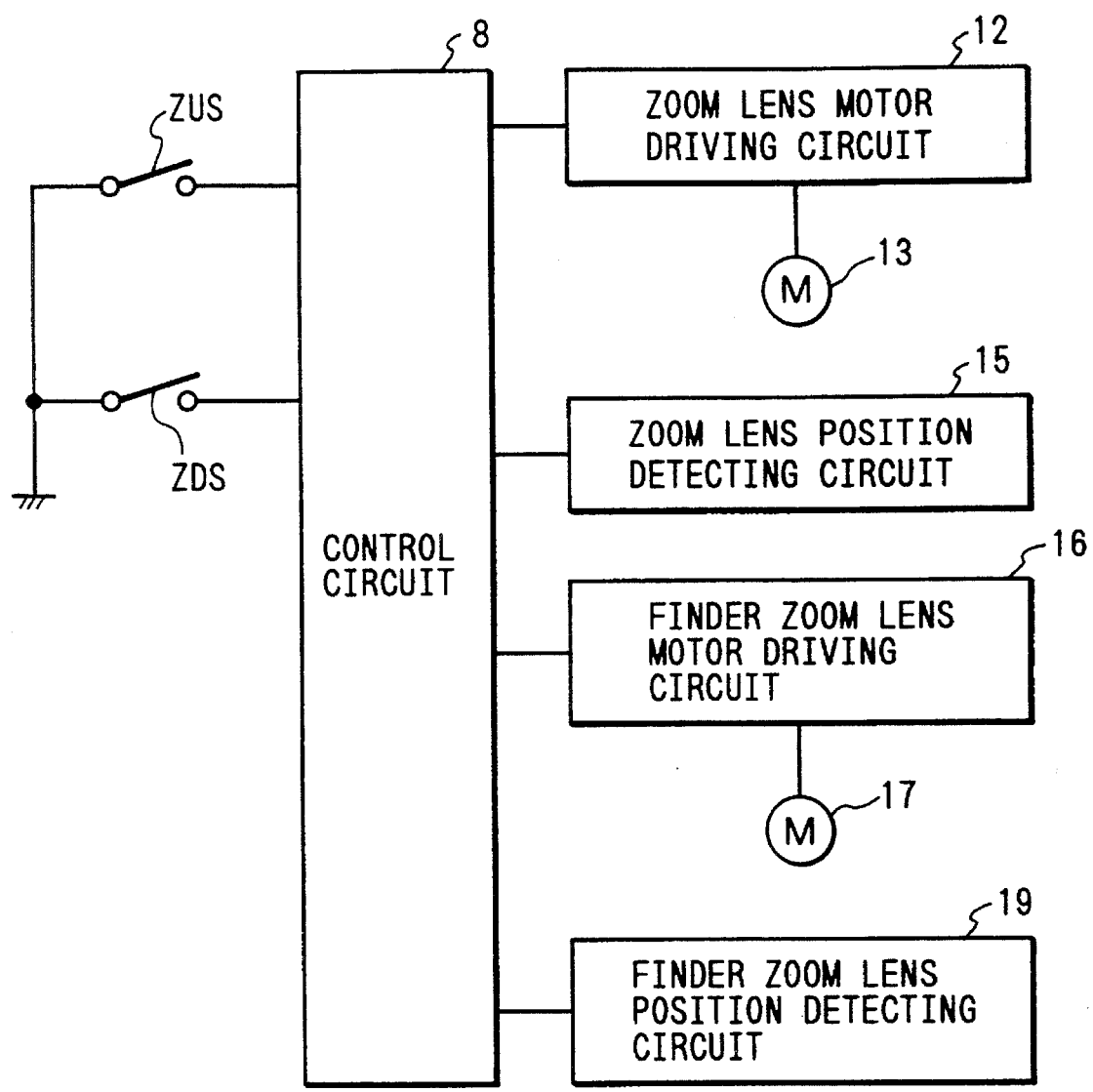
FIG. 7 is a block diagram of the construction of in still a further aspect of the present invention.

FIG. 7 is a block diagram which illustrates the structure of a sixth embodiment.

Referring to FIG. 7, reference numeral 12 represents a zoom lens motor driving circuit for moving the photographing zoom lens 1 by rotating the motor 13. Reference numeral 15 represents a zoom lens position detecting circuit which detects the position, that is, the focal length F, of the photographing zoom lens 1, by means of an encoder included in the lens barrel ring 24 and omitted from illustration. Reference numeral 16 represents a motor driving circuit for zooming the zoom finder part 54 and the electronic flash part 56 by rotating the motor 17. Reference numeral 19 represents a finder zoom lens position detecting circuit for detecting the positions of the finder zoom lenses 27 and 28 of the zoom finder part 54, that is, the pseud focal length GF by an encoder (omitted from illustration). Symbol ZUS represents a switch which is switched on when the zoom up button for zooming up the photographing zoom lens 1 is depressed. Symbol ZDS represents a switch which is switched on when the zoom down button for zooming down the photographing zoom lens ZL is depressed. Reference numeral 8 represents a control circuit composed of a microcomputer and its peripheral elements, the control circuit 8 performing the various operations and the operation sequence process required for the camera and as well as executing a control program to be described later for the purpose of controlling the zoom lens part 53 and the zoom finder part 54.

In the above described structure, the control circuit 8 constitutes a magnification selection device.

Figure 35:
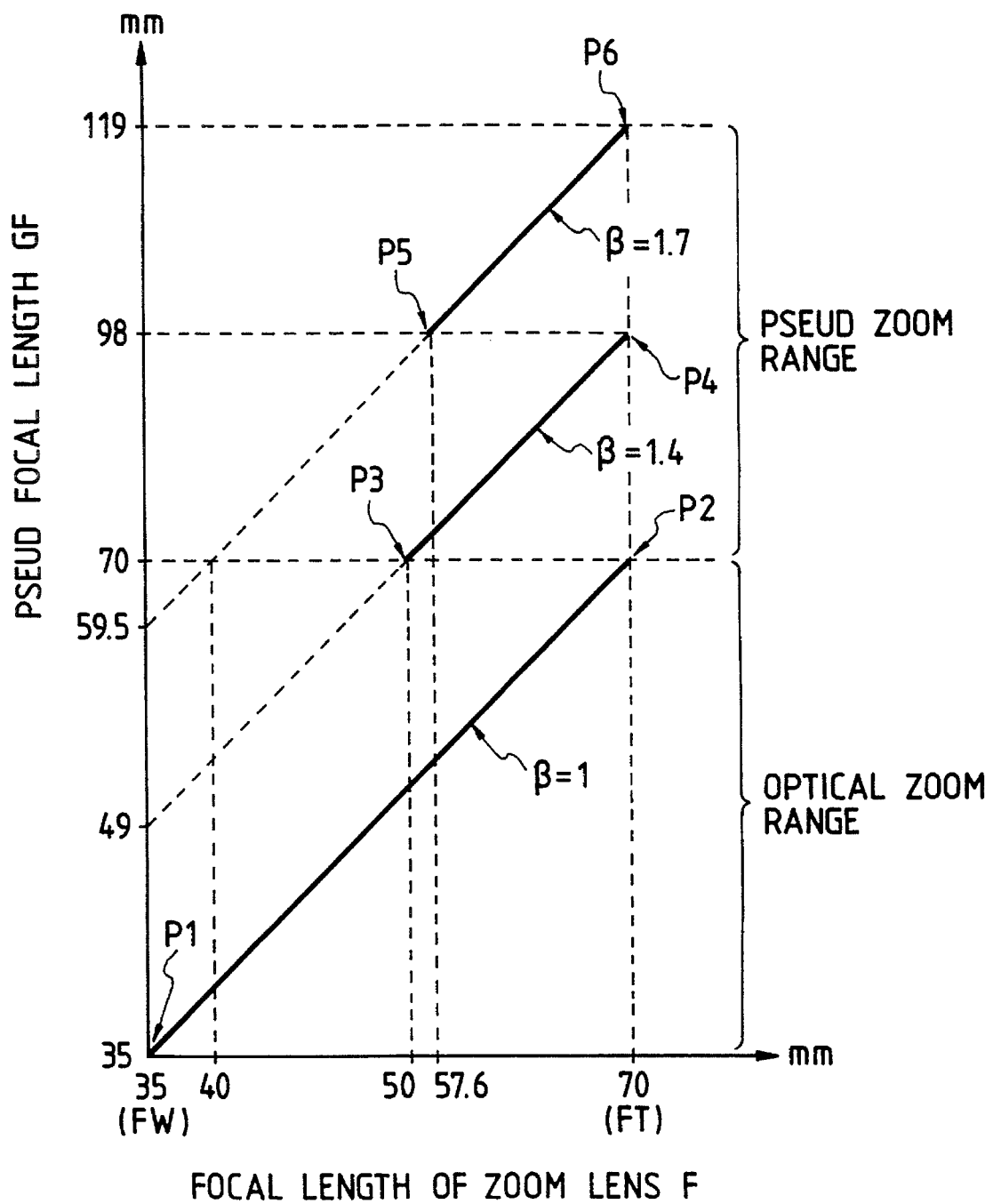
FIG. 35 is a diagram of an example of zooming of the photographing zoom lens and the zoom finder.

FIG. 35 illustrates an example of an operation of zooming the photographing zoom lens 1 and the finder zoom lenses 27 and 28 of the zoom finder part 54. According to this embodiment, the focal length F of the photographing lens 1 is assumed to be 35 to 70 mm and the trimming magnification β is assumed to be three magnifications, that is, 1, 1.4 and 1.7.

In the normal zoom photographing mode in which the trimming magnification β is 1, the pseud focal length GF is the same value as the focal length F of the photographing zoom lens 1 and is varied in a range from 35 to 70 mm. In the pseud zoom photographing mode in which the trimming magnification β is 1.4, the pseud focal length GF is changed in a range from 49 to 98 mm obtained by multiplying the focal length F=35 to 70 mm of the photographing zoom lens 1 by the trimming magnification β=1.4. Therefore, the pseud focal length GF=49 to 70 mm and the focal length F=49 to 70 mm in the optical zoom range overlap.

In the pseud zoom photographing mode in which the trimming magnification β=1.7, the pseud focal length GF is changed in a range from 59.5 to 119 mm obtained by multiplying the focal length F=35 to 70 mm of the photographing zoom lens 1 by the trimming magnification β=1.7. Therefore, the pseud focal length GF=59.5 to 98 mm in this case and the pseud focal length GF=59.5 to 98 mm in the pseud zoom range in a case where the trimming magnification β is 1.4 overlap. Furthermore, the pseud focal length GF=59.5 to 70 mm overlaps the focal length F=59.5 to 70 mm in the optical zoom range.

In a case where the same focal length can be set by a plurality of trimming magnifications β, a mode having a small trimming magnification β is selected in order to obtain a print having a superior image quality. That is, in a case where the photographing operation is performed while making the focal length F to be 35 mm≦F≦70 mm, the optical zoom range of the photographing zoom lens 1 is used. In a case where the photographing operation is performed while making the pseudo focal length GF to be 70 mm≦GF≦98 mm, the pseud zoom range in which the trimming magnification β is 1.4 is used. In a case where the photographing operation is performed while making the pseud focal length GF to be 98 mm<GF≦119 mm, the pseud zoom range in which the trimming magnification β is 1.7 is used.

The actual zooming operation is performed as follows: at the time of the zooming up operation, zooming is performed sequentially in the following order as P1→P2→P3→P4→P5→P6 as shown in FIG. 35. Furthermore, the photographing zoom lens 1 is temporarily zoomed down at an intermediate point P2 to point P3 at which the focal length F is 50 mm. In addition, the trimming magnification β is set to 1.4. Furthermore, the photographing zoom lens 1 is temporarily zoomed down at an intermediate point P4 to point P5 at which the focal length F=57.6 mm and as well as the trimming magnification β is set to 1.7. In a case of the zoom down operation, zooming is performed sequentially in the following order as: P6→P5→P4→P3→P2→P1 and the photographing zoom lens 1 is temporarily zoomed up at intermediate point P5 to point P4 at which the focal length F is 70 mm. Furthermore, the trimming magnification β is set to 1.4. In addition, the photographing zoom lens 1 is temporarily zoomed up at the intermediate point P3 to the point P2 at which the focal length F is 70 mm and the trimming magnification β is set to 1.

The photographing zoom lens 1 is driven by the motor 13 and its focal length F is changed in a range from 35 to 70 mm. On the other hand, the zoom finder part 54 is driven by the motor 17 and its focal length, that is, the pseud focal length GF is changed in a range from 35 to 119 mm as designated by a solid line shown in FIG. 35, the change being made according to each trimming magnification β. Furthermore, the electronic flash part 56 is driven in synchronization with the zoom finder part 54 so as to illuminate a range of an angle of field which corresponds to the pseud focal length GF.

Figure 36B:
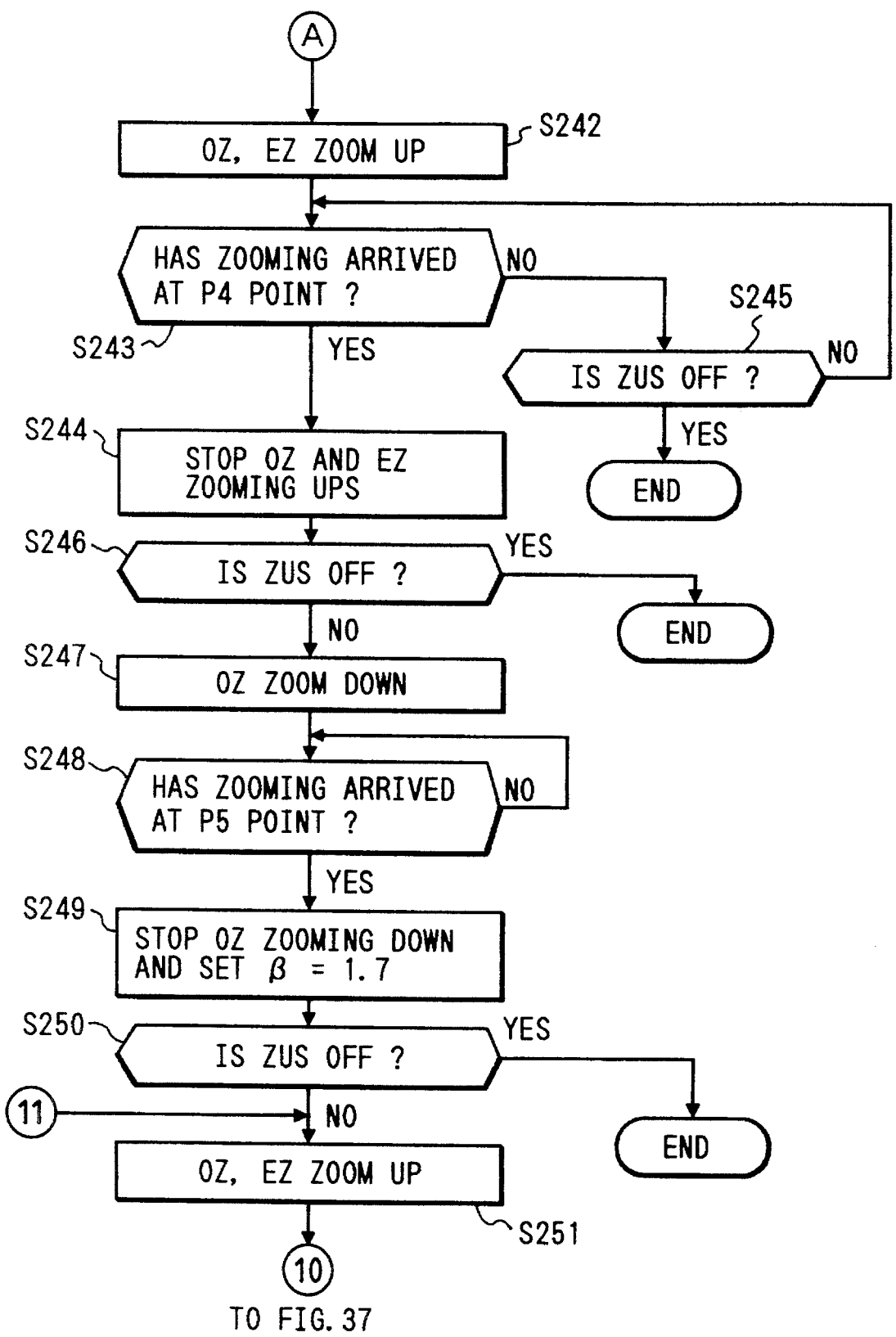
Figure 37:
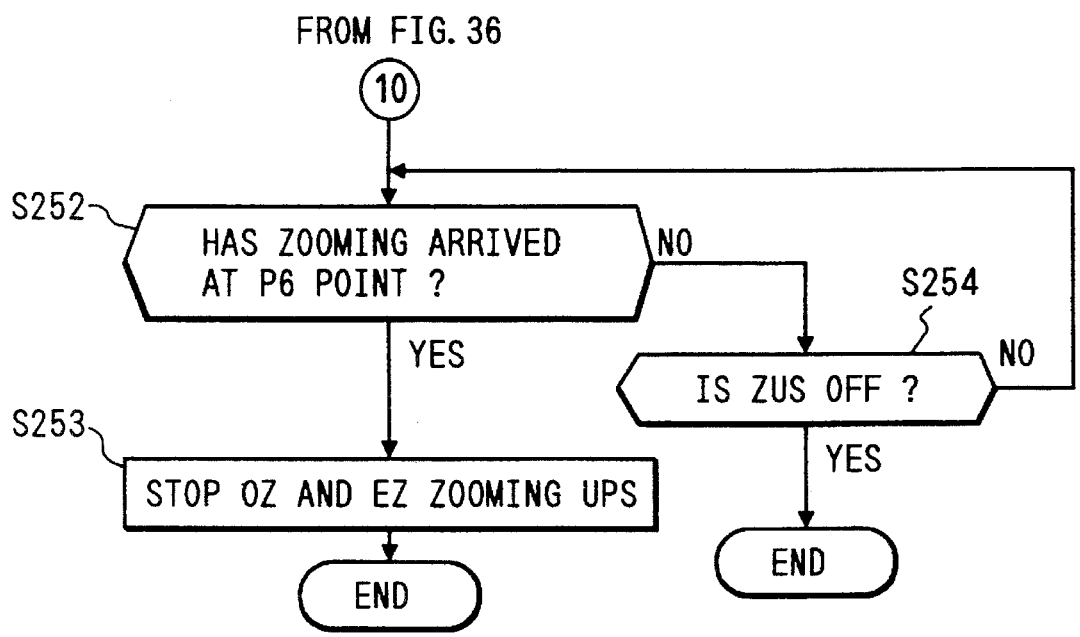

FIGS. 36 and 37 are flow charts which illustrate an example of a program for the zoom up process. The zoom up operation will now be described with reference to the flow chart. Description will be made hereinafter that zooming of the photographing zoom lens 1 is called "OZ zoom" and zooming of the zoom finder part 54 and that of the electronic flash part 56 are called "EX zoom".

The microcomputer of the control circuit 8 starts executing the program when the zoom up button is depressed and thereby the switch ZUS is switched on. In step S231 after the execution has been started, whether or not the photographing mode is the pseud photographing mode in which the trimming magnification β is 1.7. If an affirmative discrimination has been made, the flow proceeds to step S251. If it has been negated, the flow proceeds to step S232. In step S232, whether or not the photographing mode is the pseud photographing mode in which the trimming magnification β is 1.4. If an affirmative discrimination has been made, the flow proceeds to step S242. If it has been negated, the flow proceeds to step S233.

If the trimming magnification β is not 1.7 or 1.4, the photographing mode is the normal zoom photographing mode in which β is 1. In step S233, the motor driving circuit 12 is controlled so as to commence zoom up of the photographing zoom lens 1. Furthermore, the motor driving circuit 16 is controlled so as to commence zooming up of the zoom finder part 54 and the electronic flash part 56. In next step S234, whether or not the photographing zoom lens 1 and the finder zoom lenses 27 and 28 have arrived at the point P2 shown in FIG. 35 is discriminated by the zoom lens position detecting circuit 15 and the finder zoom lens position detection circuit 19. If an affirmative discrimination has been made, the flow proceeds to step S235. If it has been negated, the flow proceeds to step S236. In step S236, whether or not the switch ZUS has been switched off by the zoom up button released is discriminated. If it has been switched off, the execution of the program is completed. If it has been negated, the flow returns to step S234. In step S235, the OZ and EZ zoom up operations are stopped and the flow proceeds to step S237. In step S237, whether or not the switch ZUS has been switched off is discriminated. If it has been switched off, the execution of the program is completed. If it has been negated, the flow proceeds to step S238.

In step S238, the OZ zoom down operation is started. In next step S239, whether or not zooming has arrived at the point P3 is discriminated. If zooming has arrived at the point P3, the flow proceeds to step S240 in which the OZ zoom down operation is stopped and the trimming magnification β is set to 1.4. In next step S241, whether or not the switch ZUS has been switched off is discriminated. If it has switched off, the execution of the program is completed. If it has been negated, the flow proceeds to step S242. In step S242, the OZ and EZ zoom up operations are started. In next step S243, whether or not zooming has arrived at the point P4 is discriminated. If an affirmative discrimination has been made, the floe proceeds to step S244. If it has been negated, the flow proceeds to S245. In step S245, whether or not the switch ZUS has been switched off is discriminated. If it has been switched off, the execution of the program is completed. If it has been negated, the flow returns to step S243. In step S244, the OZ and EZ zoom up operations are stopped.

In step S246, whether or not the switch ZUS has been switched off is discriminated. If it has been switched off, the execution of the program is completed. If it has been negated, the flow proceeds to step S247. In step S247, the OZ zoom down operation is started. In next step S248, whether or not zooming has arrived at the point P5 is discriminated. If zooming has arrived at the point P5, the flow proceeds to step S249 in which the OZ zoom down is stopped and the trimming magnification β is set to 1.7. In step S250, whether or not the switch ZUS has been switched off is discriminated. If it has been switched off, the execution of the program is completed. If it has been negated, the flow proceeds to step S251. In step S251, the OZ and EZ zoom up operations are started. In next step S252 shown in FIG. 37, whether or not zooming has arrived at the point P6 is discriminated. If an affirmative discrimination has been made, the flow proceeds to step S253. If it has been negated, the flow proceeds to step S254. In step S254, whether or not the switch ZUS has been switched off is discriminated. If it has been switched off, the execution of the program is completed. If it has been negated, the flow returns to step S252. In step S253, the OZ and EZ zoom up operations are stopped and the execution of the program is completed.

Figure 39:
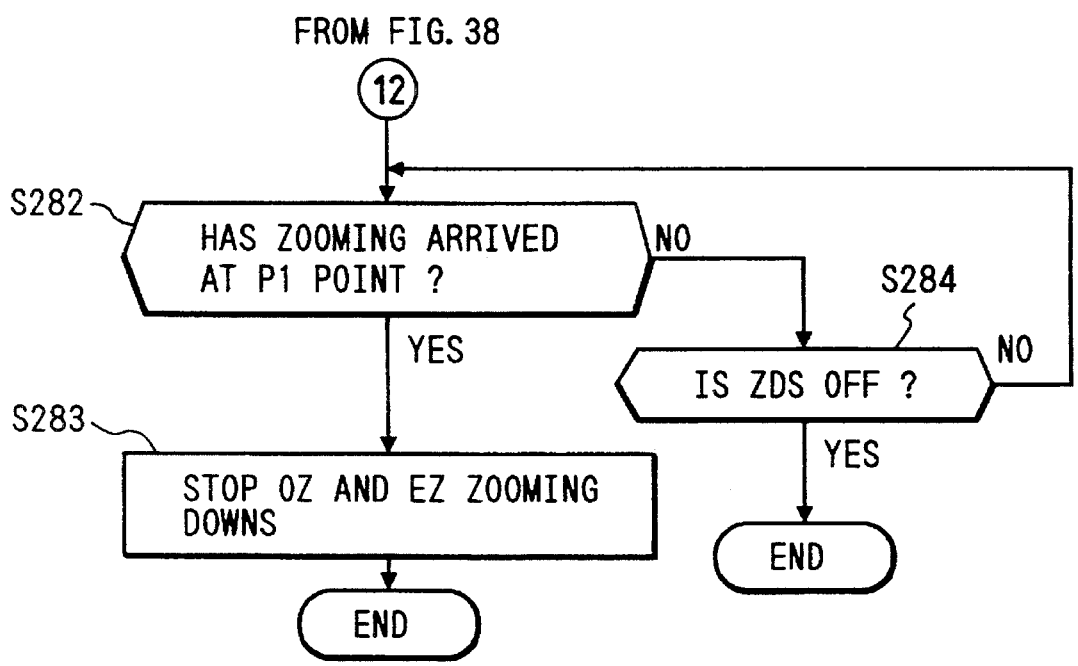
Figure 38B:
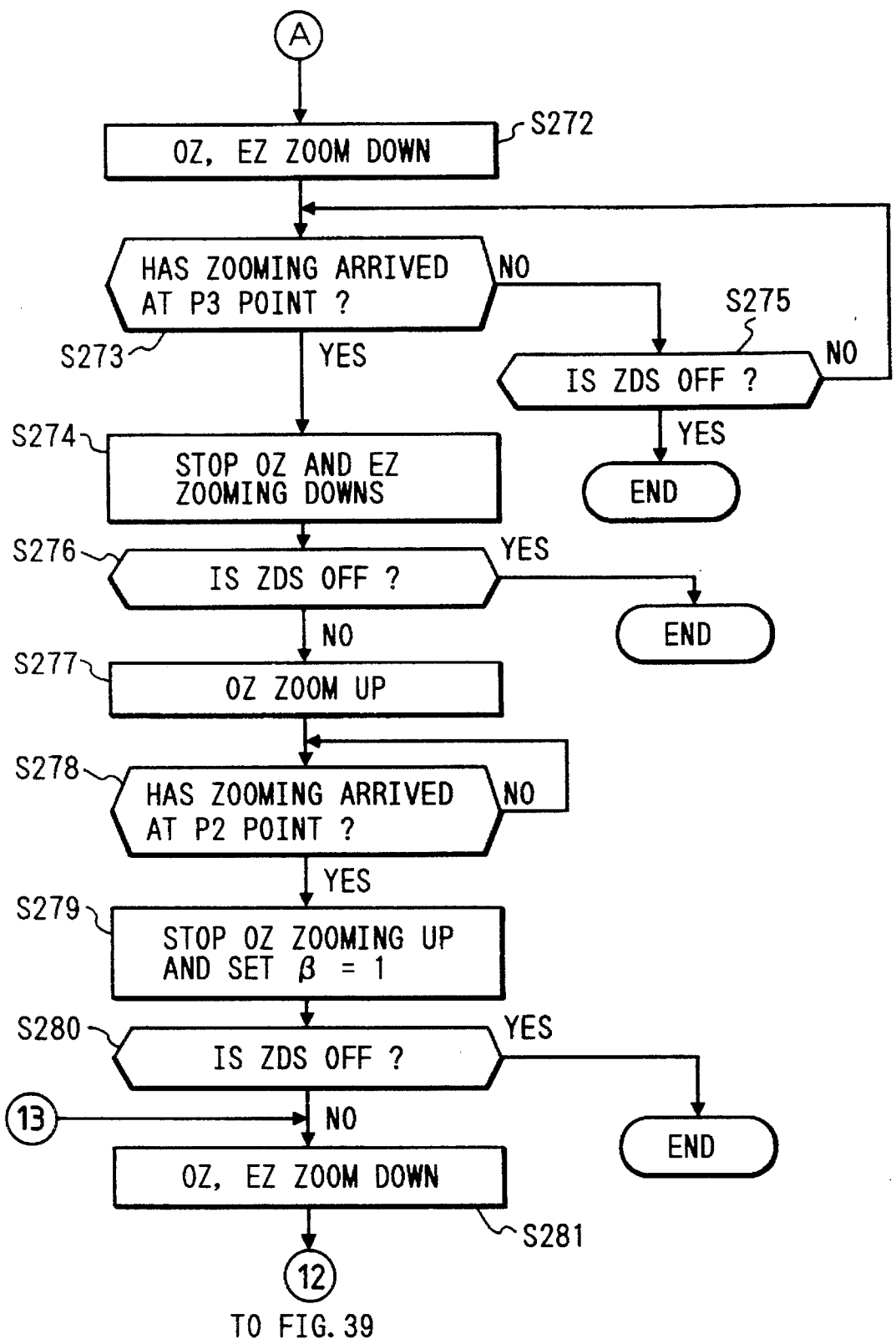

FIGS. 38 and 39 are flow charts which illustrate an example of a program for the zoom down process. The zoom down operation will now be described with reference to the flow charts.

The microcomputer of the control circuit starts executing the program when the zoom down button is depressed and thereby the switch ZDS is switched on. In step S261 after the execution has been started, whether or not the photographing mode is the normal zoom photographing mode in which the trimming magnification β is 1 is discriminated. If an affirmative discrimination has been made, the flow proceeds to step S281. If it has been negated, the flow proceeds to step S262. In step S262, whether or not the photographing mode is the pseud zoom photographing mode in which the trimming magnification β is 1.4 is discriminated. If an affirmative discrimination has been made, the flow proceeds to step S272. If it has been negated, the flow proceeds to step S263.

If the trimming magnification β is not 1 or 1.4, the photographing mode is the pseud zoom photographing mode in which β is 1.7. In step S263, the motor driving circuit 12 is controlled so as to start zooming down of the zoom lens 1. Furthermore, the motor driving circuit 16 is controlled so as to start zooming down of the zoom finder part 54 and the electronic flash part 56. In next step S264, whether or not the photographing zoom lens 1 and the finder zoom lenses 27 and 28 have arrived at the point P5 is discriminated by the zoom lens position detecting circuit 15 and the finder zoom lens position detecting circuit 19. If an affirmative discrimination has been made, the flow proceeds to step S265. If it has been negated, the flow proceeds to step S266. In step S266, whether or not the switch ZDS has been switched off by the zoom button released is discriminated. If it has been switched off, the execution of the program is completed. If it has been negated, the flow returns to step S264. In step S265, the OZ and EZ zoom up operations are stopped and the flow proceeds to step S267. In step S267, whether or not the switch ZDS has been switched off is discriminated. If it has been switched off, the execution of the program is completed. If it has been negated, the flow proceeds to step S268.

In step S268, the OZ zoom up operation is started. In next step S269, whether or not zooming has arrived at the point P4 is discriminated. If it has arrived at the point P4, the flow proceeds to step S270 in which the OZ zoom up operation is stopped and the trimming magnification β is set to 1.4. In next step S271, whether or not the switch ZDS has been switched off is discriminated. If it has been switched off, the execution of the program is completed. If it has been negated, the flow proceeds to step S272. In step S272, the OZ and EZ zoom down operations are started. In next step S273, whether or not zooming has arrived at the point P3 is discriminated. If an affirmative discrimination has been made, the flow proceeds to step S274. If it has been negated, the flow proceeds to step S275. In step S275, whether or not the switch ZDS has been switched off is discriminated. If it has been switched off, the execution of the program is completed. If it has been negated, the flow returns to step S273. In step S274, the OZ and EZ zoom down operations are stopped.

In step S276, whether or not the switch ZDS has been switched off is discriminated. If it has been switched off, the execution of the program is completed. If it has been negated, the flow proceeds to step S277. In step S277, the OZ zoom up operation is started. In next step S278, whether or not zooming has arrived at the point P2 is discriminated. If zooming has arrived at the point P2, the flow proceeds to step S279 in which the OZ zoom up operation is stopped and the trimming magnification β is set to 1. In step S280, whether or not the switch ZDS has been switched off is discriminated. If it has been switched off, the execution of the program is completed. If it has been negated, the flow proceeds to step S281. In step S281, the OZ and EZ zoom down operations are started. In next step S282 shown in FIG. 39, whether or not zooming has arrived at the point P1 is discriminated. If an affirmative discrimination has been made, the flow proceeds to step S283. If it has ben negated, the flow proceeds to step S284. In step S284, whether or not the switch ZDS has been switched off is discriminated. If it has been switched off, the execution of the program is completed. If it has been negated, the flow returns to step S282. In step S283, the OZ and EZ zoom down operations are stopped and the execution of the program is completed.

As described above, in a case where a plurality of trimming magnifications which can be set to a desired focal length are present in a plurality of trimming magnifications, the minimum trimming magnification is selected and the desired focal length is set according to the selected trimming magnification. Therefore, the photograph operation is always performed with the minimum trimming magnification. As a result, a print exhibiting excellent image quality can be obtained.

Furthermore, as shown in FIG. 35, a proper trimming magnification is set according to the zoom ratio of the photographing zoom lens. Therefore, the necessity of zooming down the photographing zoom lens to the wide end at the time of switching the mode from the normal photographing mode to the pseud zoom photographing mode or at the time of switching the trimming magnification in the pseud zoom range is switched can be eliminated. Therefore, the switching operation can be performed smoothly and the handling facility is therefore improved.

Although the aforesaid embodiment is described about a camera provided with the photographing zoom lens having a range in which the focal length can be varied from 35 to 70 mm and the zoom ratio of 2, the camera having the trimming magnifications of 1, 1.4 and 1.7. The range of the photographing zoom lens in which the focal length can be varied, the zoom ratio and the trimming magnification are not limited to the values according to the aforesaid embodiment.

Although the aforesaid embodiment is arranged in such a manner that the zoom lens and the zoom finder are driven by individual driving devices. They may be driven by the same driving device in synchronization with each other.

As described above, according to the sixth embodiment, in a case where a plurality of trimming magnifications which can be set to a desired focal length are present in a plurality of trimming magnifications, the minimum trimming magnification is selected and the desired focal length is set according to the selected trimming magnification. Therefore, the photograph operation is always performed with the minimum trimming magnification. As a result, a print exhibiting excellent image quality can be obtained.

A seventh embodiment of the present invention will now be described with reference to the drawings.

Figure 8:
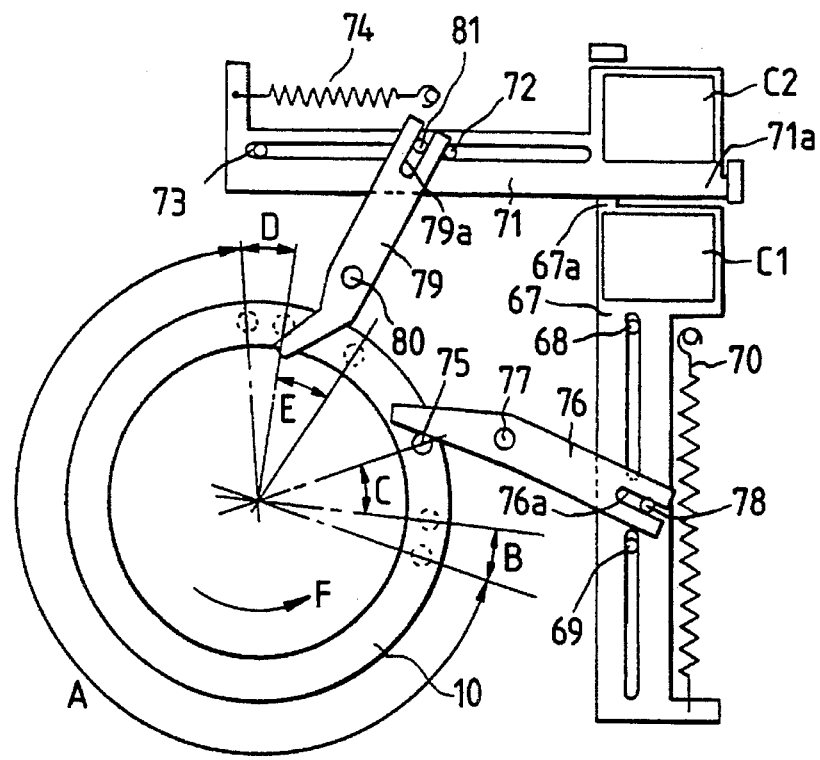
FIG. 8 is a front view of the construction of a finder and a converter lens of a camera capable of trimming photographing in still a further aspect of the present invention.
Figure 9:
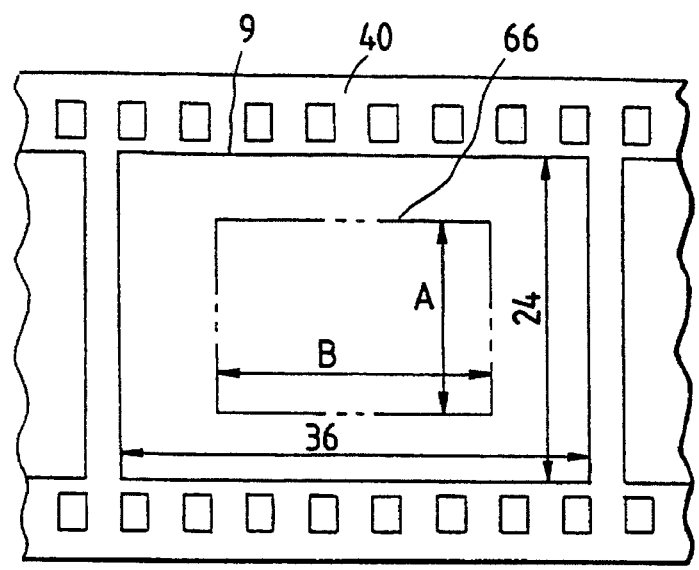
FIG. 9 is a diagram of an exposed region and a trimmed region of a film.

FIG. 8 is a front elevational view which illustrates the structure of a finder of a camera capable of performing the trimming photographing operation according to the seventh embodiment of the present invention. The camera according to this embodiment is capable of performing the normal photographing operation in which printing of the overall body of a rectangular exposure region 9 on a film 40 shown in FIG. 9 is instructed and a trimming photographing operation in which printing of only a trimming region 66 in the exposure region 9 is instructed. The photographing magnification at the time of the trimming photographing operation is smaller than that at the time of the normal photographing operation. The exposure region 9 is made to be 24 mm×36 mm if the film 40 is the normal 35 mm-film. Assuming that the longitudinal dimension of the trimming region 66 is A and the horizontal dimension is B, magnification M can be obtained from the following equation:

$$M=24/A=36/B$$

Figure 40:
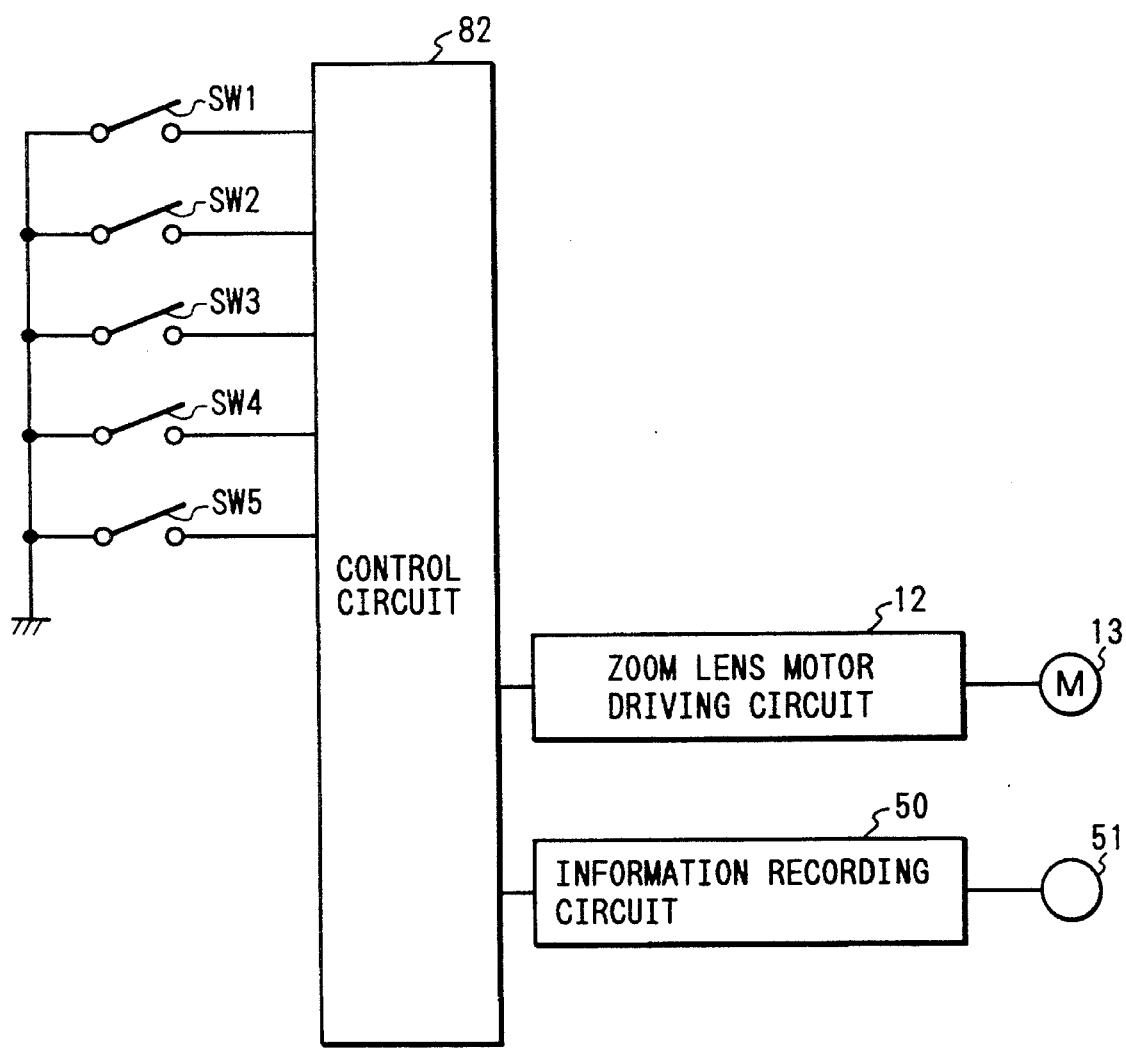
FIG. 40 is a block diagram of the circuit construction of a seventh embodiment of the present invention.

The operation of switching the mode between the normal photographing mode in which the normal photographing operation is performed and the trimming photographing mode in which the trimming photographing operation is performed is instructed by the operation of a mode switch SW5 shown in FIG. 40. In a case where the trimming photographing operation has been instructed, trimming information is, corresponding to the exposure region 9 of each of the frames, recorded to, for example, a marginal portion of the film. The recording method may be an optical method, an electrical method or a magnetic method or the like. Also the recording region is not limited to the marginal portion of the film. It may be recorded to a predetermined recording region of a patrone. The recorded trimming information is read on the laboratory side and only the trimming region 66 is enlarged and printed according to the read trimming information. Information recording is not performed at the time of the normal photographing operation.

Figure 41:
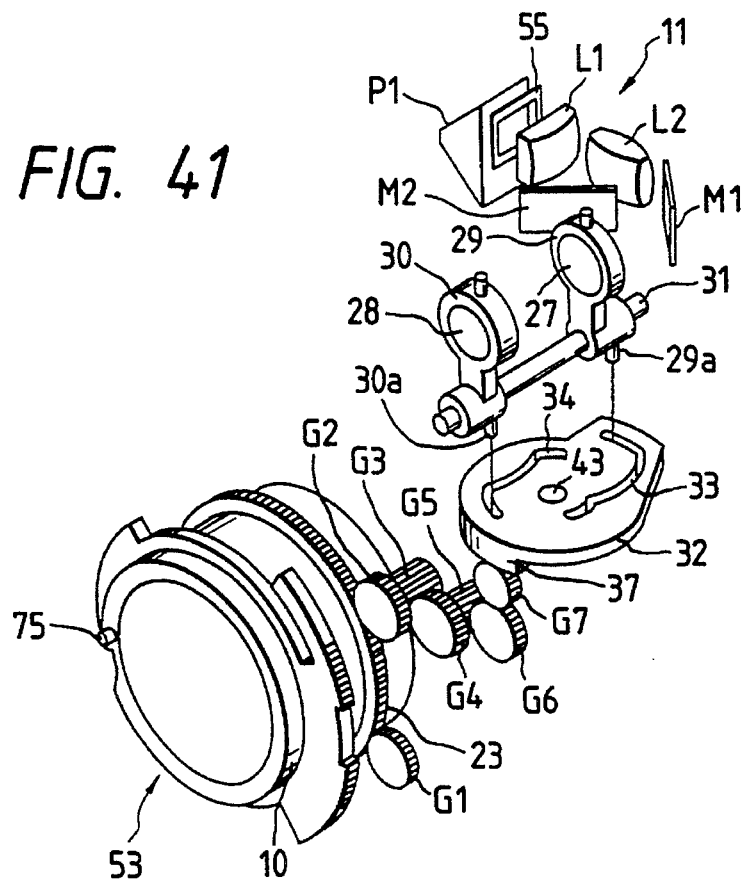
FIG. 41 is a perspective view of the construction of the finder of the seventh embodiment.

FIG. 41 is a perspective view which illustrates the structure of a finder of a camera. Reference numeral 10 represents a zoom ring which constitutes the zoom lens part 53, the zoom ring accommodating a zoom lens optical system (omitted from illustration). A gear G1 is engaged with the gear part 23 formed on the outer surface of the zoom ring 10. When the gear G1 is rotated by the zoom lens driving motor 13 (see FIG. 40), the zoom ring 10 is rotated. According to the quantity of the rotation of the zoom ring 10, the focal length of the zoom optical system, that is, the photographing magnification is changed by a driving system (omitted from illustration). The rotation of the zoom ring 10 is transmitted to the crown gear 37 of the cam 32 via the gear part 23 and the gears G2 to G7 in this sequential order. The rotation of the gear G7 rotates the cam 32 around the shaft 43. The cam 32 has two cam grooves 33 and 34 in such a manner that the cam grooves 33 and 34 are moved when the cam 32 is rotated.

Reference numeral 11 represents a zoom finder part. The finder part 11 comprises a reverse optical system consisting of a pair of finder zoom lenses 27 and 28 held by the lens holding members 29 and 30, the mirrors M1 and M2 and the prism P1. The finder part 11 further comprises the field lens L1, the visual field frame 55 and the ocular lens L2. The finder zoom lens 28 faces an objective window (omitted from illustration) formed in the front portion of the body of the camera. Light of the subject made incident through the objective window passes through the lenses 27 and 28 and is reflected by the mirror M1. Reflected light passes through the field lens L1 and imaged adjacent to the visual field frame 55. A photographer is able to observe the image thus formed by means of the ocular lens L2 via the prism P1 and the mirror M2.

The lens holding members 29 and 30 are supported slidably in the longitudinal direction (in the direction of the optical axis of each of the finder zoom lenses 27 and 28) relatively to the guide shaft 31. The follower pins 29a and 30a of the lens holding members 29 and 30 are respectively engaged to the cam grooves 33 and 34 of the cam 32. Therefore, the movement of the cam grooves 33 and 34 due to the rotation of the cam 32 moves the lens holding members 29 and 30 along the guide shaft 31. As a result, the distance between the finder zoom lenses 27 and 28 is changed and thereby the finder magnification is changed.

Figure 42:
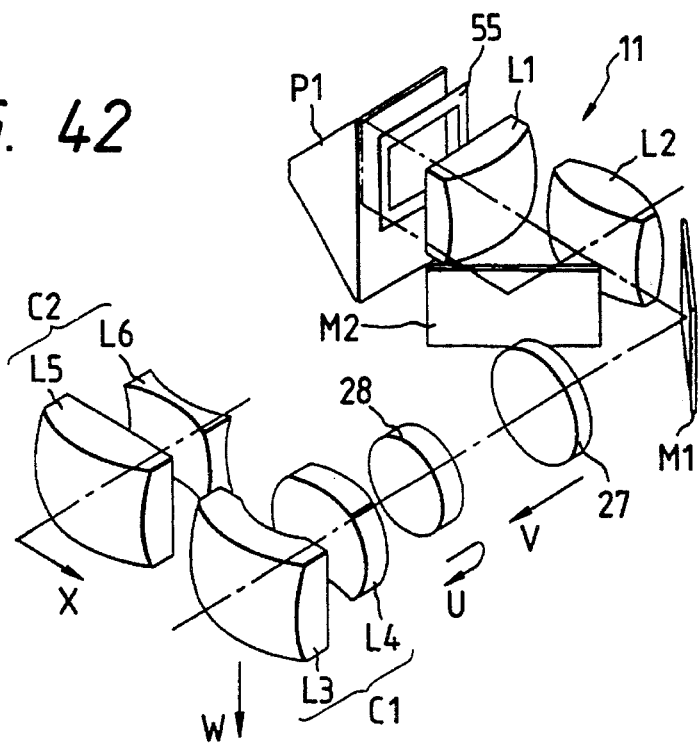
FIG. 42 is a perspective view of the construction of the finder and converter lenses of the seventh embodiment.

FIG. 42 is a perspective view which illustrates the structure of the finder and that of the converter lens. According to this embodiment, a wide converter lens C1 for use in the normal photographing mode and a telephoto-converter lens C2 for use in the trimming photographing mode are provided. The wide converter lens C1 is composed of a negative lens L3 and a positive lens L4, while the telephoto-converter lens C2 is composed of a positive lens L5 and a negative lens L6. Either of the aforesaid wide and telephoto-converter lenses C1 and C2 is disposed in the optical path of the finder part 11 in front of the finder zoom lens 28 so as to be used. In a case where either of the converter lens C1 or C2 is disposed in the optical path of the finder part 11, the other converter lens C1 or C2 is retracted from this optical path (to be described later).

The magnification required for the converter lenses C1 and C2 to possess will now be described. Assumptions are made that the minimum magnification of the zoom finder part 11 is Mzw, the maximum magnification of the same is Mzt, the magnification of the wide converter lens C1 is Mwc and the magnification of the telephoto-converter lens C2 is MTc. If the wide converter lens C1 is used, the magnification can be changed in a range from Mzw×Mwc to Mzt×Mwc. If the telephoto-converter lens C2 is used, the magnification can be changed in a range from Mzw×Mtc to Mzt×Mtc. The magnification M is expressed as follows as shown in FIG. 9:

$$M=24/A=36/B$$

Therefore, by setting the relationship between the magnification of the converter lens C1 and that of C2 as follows, the visual angle of the finder is caused to correspond to the change in the field angle in the trimming photographing operation in which the converter lenses C1 and C2 are used:

$$M=Mtc/Mwc$$

Referring back to FIG. 8, reference numeral 67 represents a holder for holding the wide converter lens C1, the holder 67 being arranged to be capable of vertically moving by the guiding action of guide pins 68 and 69. The holder 67 is always urged upwards when viewed in FIG. 8 by a spring 70. Reference numeral 71 represents a holder for holding the telephoto-converter lens C2, the holder 71 being arranged to be capable of horizontally moving by the guiding actions of guide pins 72 and 73. The holder 71 is always urged to the right when viewed in FIG. 8 by a spring 74.

Reference numeral 10 represents a zoom ring also shown in FIG. 41, the zoom ring 10 having, on the front surface thereof, a driving pin 75 projecting therefrom. Reference numeral 76 represents a wide converter lens driving lever. The driving lever 76 is arranged to be capable of rotating around a rotational shaft 77. Each end of the driving lever 76 is allowed to extend to the front portion of the zoom ring 10 and that of the holder 67. A slit 76a is formed in the end portion of the driving lever 76 adjacent to the holder 67. Furthermore, the holder 67 has a projecting synchronizing pin 78 to be inserted into the slit 76a. Therefore, in the range in which the driving lever 76 is rotated at the time of the operation, the aforesaid synchronizing pin 78 and the slit 76a (the driving lever 76) are engaged to each other.

Similarly, reference numeral 79 represents a telephoto-converter lens driving lever. The driving lever 79 is able to rotate around the rotational shaft 80. Each end of the driving lever 79 is allowed to extend to the front portion of the zoom ring 10 and the holder 71. A slit 79a is formed in the end portion of the driving lever 79 adjacent to the holder 71. Furthermore, the holder 71 has a projecting synchronizing pin 81 to be inserted into the slit 79a. Therefore, in the range in which the driving lever 79 is rotated at the time of the operation, the aforesaid synchronizing pin 81 and the slit 79a (the driving lever 79) are engaged to each other.

According to this embodiment, the range designated by region A shown in FIG. 8 corresponds to the zooming region in which the focal length of the zoom optical system is changed from the wide end to the telephoto end. Referring to FIG. 8, when the zoom ring 10 is rotated counterclockwise, the focal length of the zoom optical system is changed to the long focus side (the telephoto side), while it is changed to the short focus side (the wide side) when the zoom ring 10 is rotated clockwise. Furthermore, when the zoom ring 10 is further rotated from the telephoto end toward the long focus side until it arrives at a range designated by a region C shown in FIG. 8, the driving pin 75 of the zoom ring 10 is engaged to the driving lever 76. On the other hand, if the zoom ring 10 is further rotated from the wide end toward the short focus side until it arrives at the range designated by a region E shown in FIG. 8, the driving pin 75 of the zoom ring 10 is engaged to the driving lever 79. The range designated by the region C is assumed to be the wide converter lens driving region, while the range designated by the region E is assumed to be the telephoto-converter lens driving region. Referring to FIG. 8, ranges designated by regions B and D are reserved angles.

Referring to FIG. 40, reference numeral 82 represents a control circuit including a microcomputer for controlling the overall operation of the camera and its peripheral circuits, the control circuit having a memory, a discriminating circuit, a calculating circuit, a timer and the like. Reference numeral 12 represents a photographing zoom lens motor driving circuit for controlling the operation of the zoom lens driving motor 13 for moving a zoom lens optical system (omitted from illustration) from the wide end to the telephoto end. Reference numeral 50 represents a recording circuit for recording information about the trimming photographing operation on a film (omitted from illustration) by means of a recording device 51.

SW1 and SW2 respectively are a half-depression switch and a full-depression switch which are operated in synchronization with a release button of the body of the camera. The switch SW1 is switched on when the release button is depressed to its first stroke, while the switch SW2 is switched on when the release button is depressed to its second stroke. SW3 is a zoom up switch for moving the zoom lens so as to zoom up it and SW4 is a zoom down switch for moving the zoom lens to zoom down it. SW5 is a mode switch for switching and setting the mode, the mode being switched between the normal photographing mode for performing the normal photographing operation and the trimming photographing operation for performing the trimming photographing operation.

In the structure according to this embodiment, the holders 67, 71, the springs 70 and 74, the driving pin 75, the driving levers 76 and 79 and the synchronizing pins 78 and 81 constitute an insertion device and a retracting device.

The operation of this embodiment will now be described.

(1) Normal Photography Mode

Figure 43:
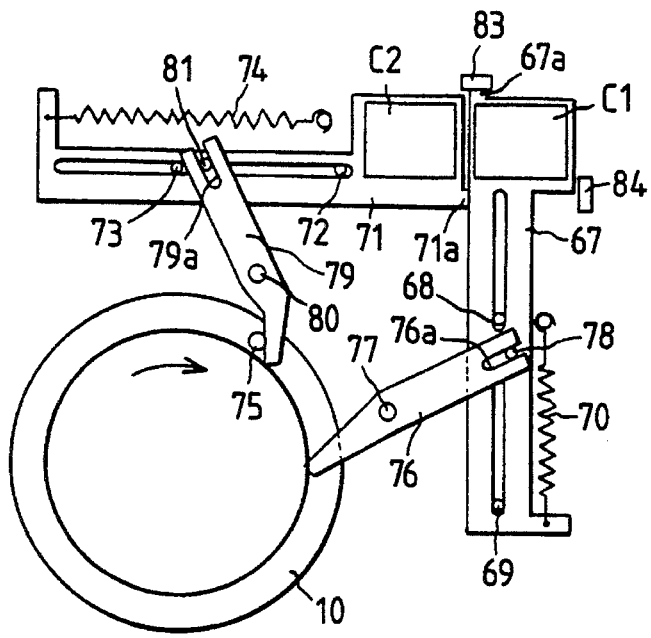
FIG. 43 is a front view showing the operation of the finder and the converter lenses.

In the normal photographing mode, the converter lenses C1 and C2 are in a state shown in FIGS. 42 and 43 in which the wide converter lens C1 has been inserted into the optical path of the finder 11 and the telephoto-converter lens C2 has been retracted from the optical path of the finder 11. That is, the finder magnification for the normal photographing operation has been set. In this state, although the holder 71 of the telephoto-converter lens C2 is being urged in the right direction by the spring 74, the projection 71a of the holder 71 is positioned in contact with the holder 67 of the wide converter lens C1 and therefore the illustrated state is maintained. Although also the holder 67 is being urged upwards by the spring 70, the projection 67a of the holder 76 is positioned in contact with the stopper 83 and therefore the illustrated state is maintained.

When the zoom up (or down) switch SW3 (or SW4) is operated in this state, the control circuit 82 rotates forwards (reversely) the zoom lens driving motor 13 via the photographing zoom lens driving circuit 12. As a result, the zoom ring 10 is rotated in a predetermined direction, causing the photographing lens to be zoomed up (or zoomed down). At this time, the cam 32 is rotated by means of the gears G2 to G7 and the crown gear 37 when the zoom ring 10 is rotated. Therefore, the finder zoom lenses 27 and 28 are moved in the direction of the optical axis because the cam grooves 33 and 34 are moved. As a result, the finder 11 is zoomed.

Specifically, the finder zoom lens 28 is placed at the front end position (adjacent to the subject) at the wide end when viewed in FIG. 4. The finder zoom lens 28 is then gradually moved rearwards as the movement toward the long focus side as designated by an arrow U shown in FIG. 42. Then, it is moved forwards until it arrives at the telephoto end which is the same position as as the wide end. On the other hand, the finder zoom lens 27 is placed at the rearmost (adjacent to the film) at the wide end. Then, it is gradually moved forwards as it moves toward the long focus side as designated by an arrow V shown in FIG. 42. As a result, it is positioned at the front end position at the telephoto end. As a result, the distance between the finder zoom lenses 27 and 28 is longest at the wide end, while the same is narrowest at the telephoto end. Therefore, the finder magnification is changed to a value corresponding to the focal length (the photographing magnification) of the photographing zoom optical system. Since the driving pin 75 of the zoom ring 10 is not engaged to any of the driving levers 76 and 79, the insertion and the retraction of the converter lenses C1 and C2 are not performed.

(2) Trimming Photography Mode

When the trimming photographing mode is instructed by operating the mode switch SW5, the control circuit 82 rotates the zoom lens driving motor 13 via the photographing zoom lens driving circuit 12. As a result, the zoom ring 10 is rotated counterclockwise, that is, in a direction toward the telephoto side (in a direction designated by an arrow F shown in FIG. 8) by means of the gear G1.

When the zoom ring 10 is further rotated toward the long focus side until it is rotated to a region C shown in FIG. 8, the driving pin 75 of the zoom ring 10 is engaged to the driving lever 76. When the zoom ring 10 is further rotated toward the long focus side in this state, the driving lever 76 is rotated clockwise when viewed in FIG. 8. Since the driving lever 76 (its slit 76a) is engaged to the synchronizing pin 78, the holder 67 is moved downwards (in a direction designated by an arrow W shown in FIG. 42) against the urging force of the spring 70. In a state in which the wide converter lens C1 has been completely retracted from the optical path of the finder 11, the contact between the projection 71a of the holder 71 and the holder 67 is released. Therefore, the holder 71 is moved to the right (in a direction designated by an arrow X shown in FIG. 42) by the urging force of the spring 74. Then, the projection 71a of the holder 71 comes in contact with the stopper 84 and the holder 71 is therefore maintained at this position.

Figure 44:
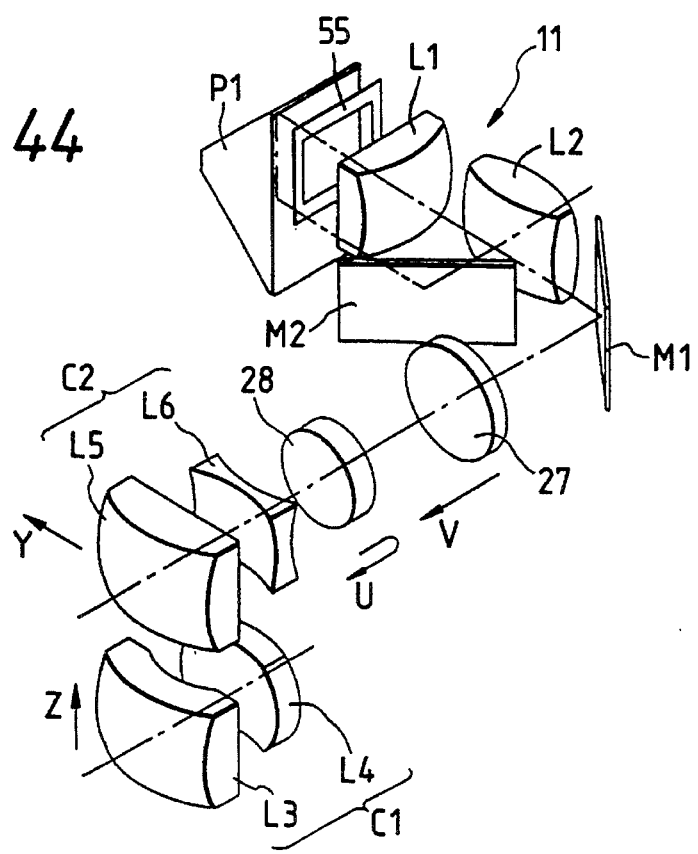
FIG. 44 is a perspective view showing the operation of the finder and the converter lenses.

As a result, in the trimming photographing mode, the converter lenses C1 and C2 are brought to a state as shown in FIGS. 8 and 44 in which the telephoto-converter lens C2 is inserted into the optical path of the finder 11 and the wide converter lens C1 is retracted from the optical path of the finder. As a result, the finder magnification for the trimming photographing operation is set. Although the holder 67 of the wide converter lens C1 is urged upwards by the spring 70 in this state, the projection 67a of the holder 67 is positioned in contact with the holder 71 of the telephoto-converter lens C2 and thereby the illustrated state is maintained.

When the zoom up switch SW3 (or the zoom down switch SW4) is operated in this state, zooming of the photographing zoom optical system and that of the zoom finder 11 are performed similarly to the descriptions made above in a state in which the telephoto-converter lens C2 has been inserted. Therefore, the magnification of the finder is made to be a value which corresponds to the trimming photographing mode and the focal length of the photographing lens similarly to the above made description.

When the normal photographing mode is instructed in this state by operating the mode switch SW5, the control circuit 82 rotates the zoom lens driving motor 13 in a predetermined direction by means of the photographing zoom lens driving circuit 12. As a result, the zoom ring 10 is, via the gear G1, rotated clockwise, that is, in a direction toward the wide side.

Figure 1:
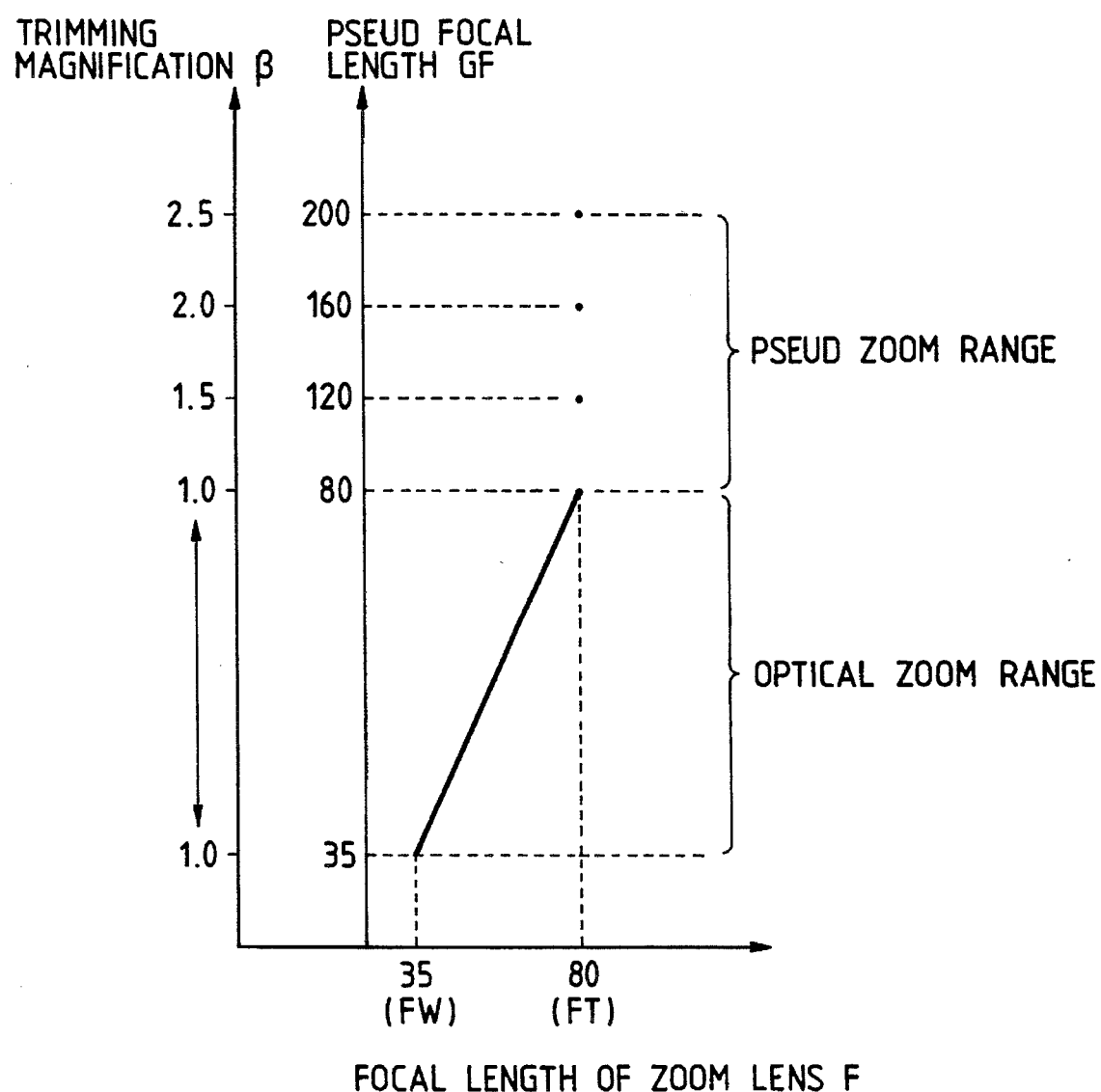
FIG. 1 is a diagram of the relationship between a focal length F and a pseudo focal length GF of a zoom lens of a conventional camera capable of trimming photographing.
Figure 2:
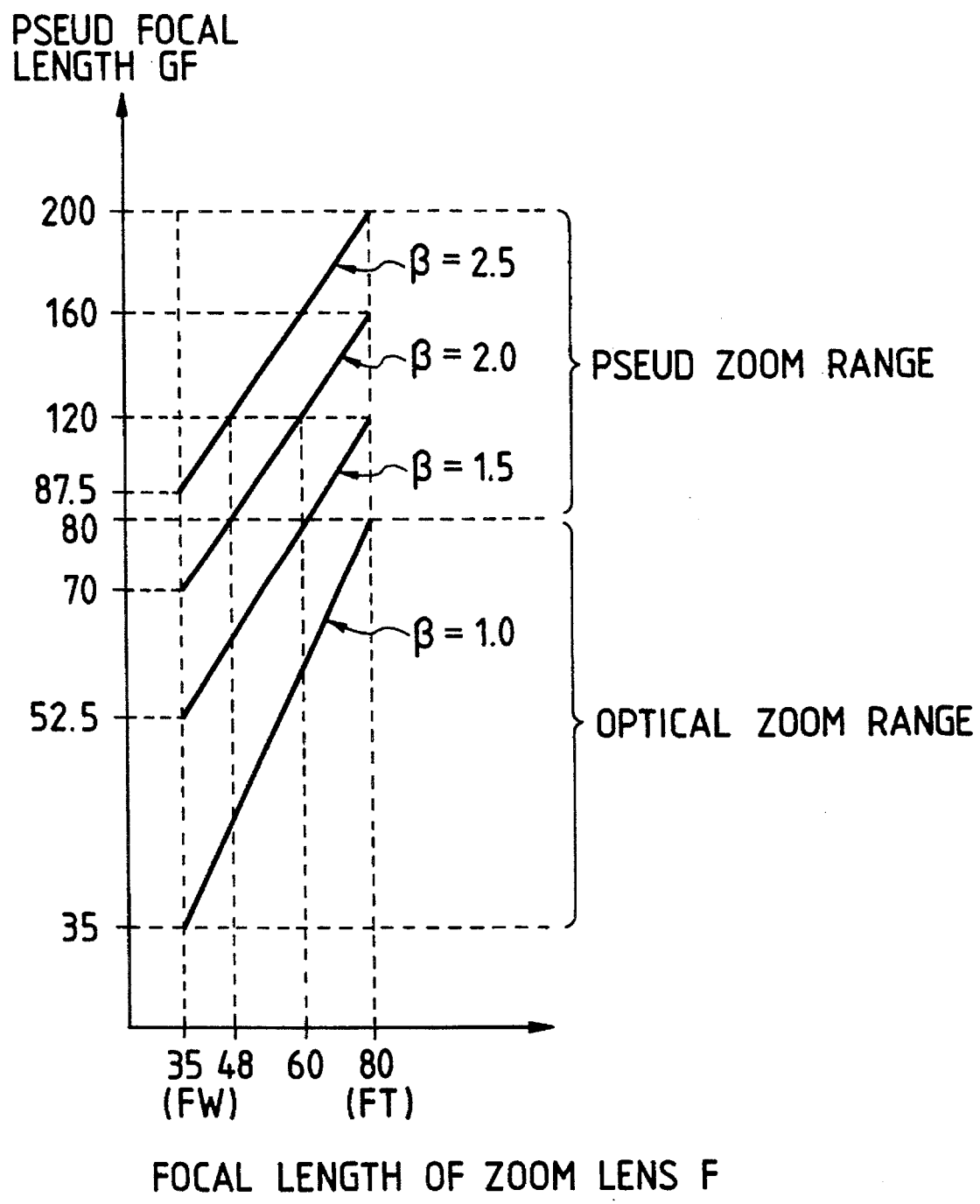
FIG. 2 is a diagram of an example of zooming of a conventional camera capable of trimming photographing.
Figure 3:
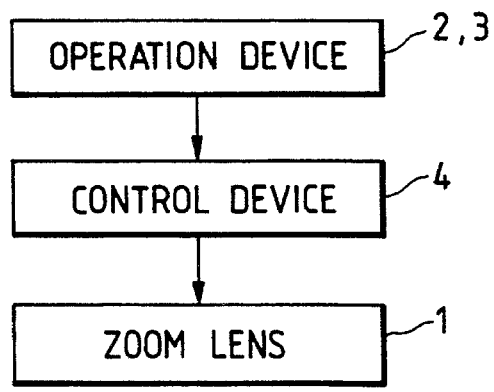
FIG. 3 is a diagram of a camera in one aspect of the present invention.

When the zoom ring 10 is further rotated from the wide end toward the short focus side until it arrives at the region E shown in FIG. 8, the driving pin 75 of the zoom ring 10 is engaged to the driving lever 23. When the zoom ring 10 is further rotated toward the short focus side in this state, the driving lever 23 is rotated counterclockwise when viewed in FIG. 1. Since its driving lever 79 (its slit 79a) is engaged to the synchronizing pin 81, the holder 71 is moved to the left (in a direction designated by an arrow Y shown in FIG. 44) against the urging force of the spring 74. In a state in which the telephoto-converter lens C2 has been completely retracted from the optical path of the finder 11, the contact between the projection 67a of the holder 67 and the holder 71 is released. Therefore, the holder 67 is moved upwards (in a direction designated by an arrow Z shown in FIG. 44) by the urging force of the spring 70. Then, the projection 67a of the holder 67 comes in contact with the stopper 83 and thereby the holder 67 is maintained at this position.

As described above, the converter lenses C1 and C2 are returned to the state shown in FIGS. 42 and 43 in which the wide converter lens C1 is inserted into the optical path of the finder 11 and the telephoto-converter lens C2 is retracted from the optical path of the finder 11. As a result, the magnification of the finder for the normal photographing operation is set.

Figure 45:
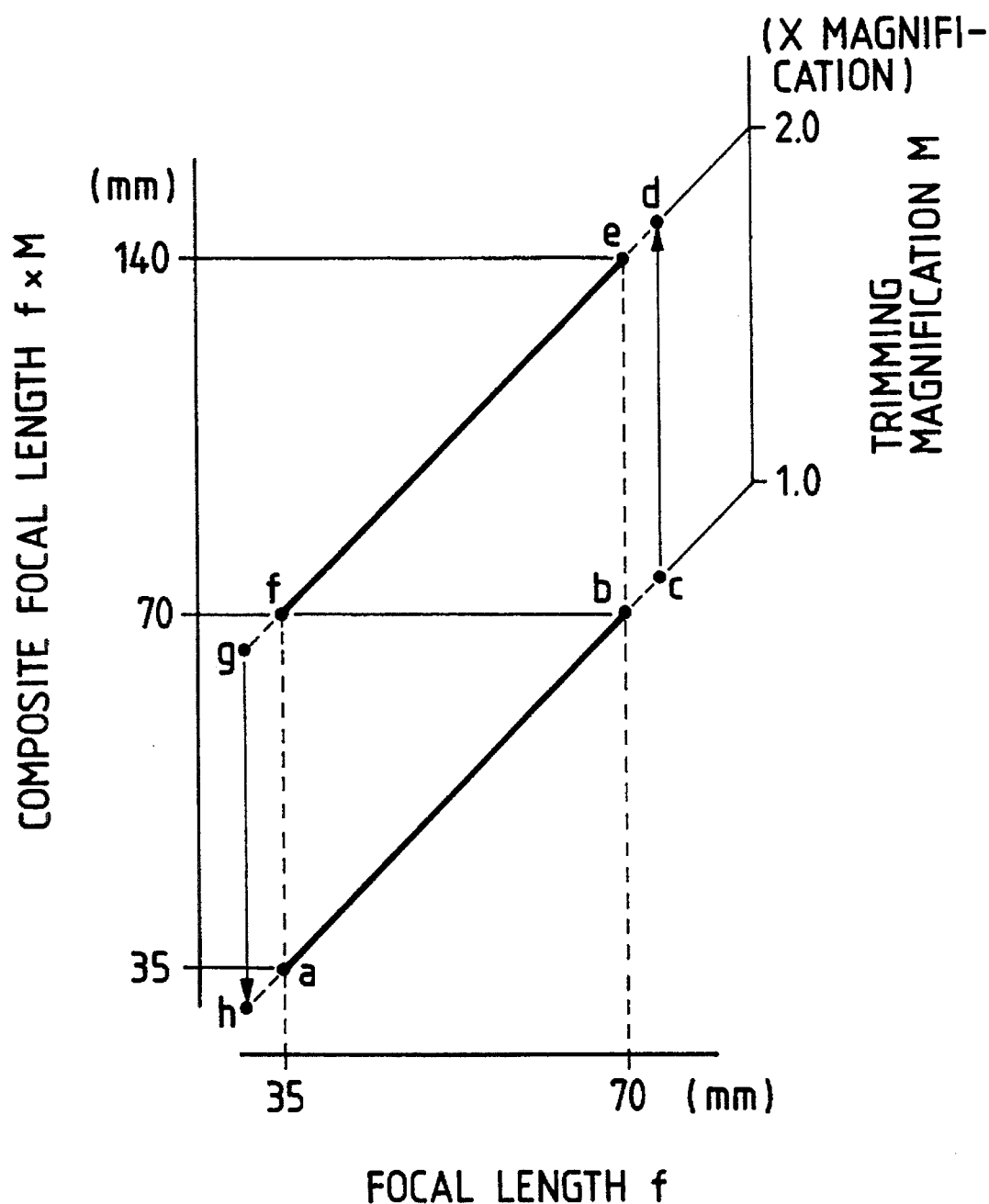
FIG. 45 is a diagram of the relationship between the focal length and the combined focal length of the photographing zoom lens.

The aforesaid operation will be described with reference to FIG. 45. The axis of abscissa of FIG. 45 stands for the focal length f of the photographing zoom lens, while the axis of ordinate stands for a composite focal length obtained by converting the angle of field obtained from the relationship between the focal length f of the zoom lens and the trimming magnification M into the focal length. The aforesaid composite focal length can be expressed by f×M.

The photographing zoom lens according to this embodiment is arranged to be zoomed in its focal length range from 35 mm to 70 mm. Therefore, in the normal photographing mode in which trimming is not performed, the trimming magnification M is 1 (time). Therefore, the composite focal length is ranged from 35 mm to 70 mm. According to this embodiment, the trimming magnification M is set to 2 (times). Therefore, the composite focal length in the trimming photographing mode is ranged from 70 mm to 140 mm.

In the normal photographing mode, the photographing zoom lens can be zoomed between the wide end a and a telephoto end b. In this state, the wide converter lens C1 has been inserted into the optical path of the finder 11. The region from the point a to the point b corresponds to the region A shown in FIG. 8.

When the trimming photographing mode is instructed in this state, the zoom ring 10 is further rotated from the telephoto end b toward the long focus side. Then, the wide converter lens C1 and the telephoto-converter lens C2 are interchanged with each other in a state where the focal length of the zoom lens has arrived at point c which exceeds the telephoto end b. Simultaneously, the trimming photographing mode is set and the composite focal length is shifted from the position of the point c to the point d. Then, the photographing zoom lens can be zoomed from the wide end f for the trimming photographing operation and the telephoto end e. The region from the point b to the point c and the region from the point d to the point e correspond to the region B shown in FIG. 1, the region from the point c to the point d corresponds to the region C and the region from the point e to the point f corresponds to the region A.

When the normal photographing mode is instructed in this state, the zoom ring 10 is further rotated from the wide end f toward the short focus side. In a state where the focal length of the zoom lens has arrived at point g which exceeds the wide end f, the telephoto-converter lens C2 and the wide converter lens C1 are interchanged with each other. Simultaneously, the normal photographing mode is set and the composite focal length is shifted from the position of the point g to the point h. The photographing zoom lens can be then zoomed from the wide end a for the normal photographing operation to the telephoto b. The region from the point f to the point g and the region from the point h to the point a correspond to the region D shown in FIG. 8 and the region from the point g to the point h corresponds to the region E.

Therefore, according to this embodiment, the wide converter lens C1 and the telephoto-converter lens C2 can be interchanged with each other in synchronization with the rotation of the zoom ring 10. Therefore, the zoom lens can be driven and the converter lenses C1 and C2 can be interchanged with each other by a single power source. As a result, the cost can be reduced and the size of the finder device can be reduced. In addition, the interchange of the converter lenses C1 and C2 can be performed by the rotation of the zoom ring 10 and this interchange can be performed in synchronization with the zooming operation. Therefore, a necessity of performing a special operation can be eliminated. Furthermore, the interchange of the converter lenses C1 and C2 is performed outside the zooming region of the zoom lens. Therefore, the interchange of the converter lenses C1 and C2 can be performed while eliminating the affection made on the zooming region.

The camera capable of trimming photographing according to the present invention is not limited to the aforesaid embodiments and various modifications can be performed. For example, although the aforesaid embodiment is arranged in such a manner that the two types of the converter lenses, that is, the wide converter lens C1 and the telephoto-converter lens C2 are provided and the normal photographing mode and the trimming photographing mode are realized by interchanging the aforesaid converter lenses C1 and C2, another structure may be employed in which one kind of the converter lens is used and this converter lens is inserted in either of the normal photographing mode and the trimming photographing mode.

As described above, according to the seventh embodiment of the present invention, the converter lens can be inserted/retracted in synchronization with the rotation of the zoom ring. Therefore, the zoom lens can be driven and the converter lens can be inserted/retracted by a single power source. As a result, the cost can be reduced and the size of the finder device can be reduced. In addition, the insertion and the retraction of the converter lenses can be performed by the rotation of the zoom ring and this insertion and the retraction can be performed in synchronization with the zooming operation. Therefore, a necessity of performing a special operation can be eliminated. Furthermore, the insertion and the retraction of the converter lenses are performed outside the normal photography region of the zoom lens. Therefore, the insertion and the retraction of the converter lenses can be performed while eliminating an effect on the normal photography region.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A camera capable of trimming photographing comprising:

photographing means having a normal photographing mode for printing the whole of a photographed picture, and a trimming photographing mode for obtaining a pseudo zoomed-up photograph by partially trimming a photographed picture;

a photographing zoom lens;

drive means for zooming said photographing zoom lens;

a zoom finder zoomed by being interlocked with said drive means to change a finder magnification;

a zoom ring rotatable in each of a normal photographing mode driving range and at least one driving range out of the normal photographing mode driving range, the rotation of said zoom ring in the normal photographing mode driving range causing said drive means to zoom said photographing zoom lens;

a first converter lens movable from a position out of an optical path of said zoom finder to a position in the optical path of said zoom finder in the normal photographing mode to change the finder magnification separately of zooming of said zoom finder;

a second converter lens movable from a position out of the optical path of said zoom finder to a position in the optical path of said zoom finder in the trimming photographing mode to change the finder magnification separately of zooming of said zoom finder;

means for moving one of said first and second converter lenses to a position out of the optical path of said zoom finder by being interlocked with the rotation of said zoom ring in the driving range out of the normal photographing driving range; and means for moving the other of said first and second converter lenses to a position in the optical path of said zoom finder when said one of said first and second converter lenses is moved to a position out of the optical path of said zoom finder.

2. A camera capable of trimming photographing comprising:

a photographing device having a normal photographing mode for printing the whole of a photographed picture, and a trimming photographing mode for obtaining a pseudo zoomed-up photograph by partially trimming a photographed picture;

a photographing zoom lens;

a driving device which zooms said photographing zoom lens;

a zoom finder zoomed by being interlocked with said driving device to change a finder magnification;

a zoom ring rotatable in each of a normal photographing mode driving range and at least the driving range out of the normal photographing mode driving range, the rotation of said zoom ring in the normal photographing mode driving range causing said driving device to zoom said photographing zoom lens;

a first converter lens movable from a position out of an optical path of said zoom finder to a position in the optical path of said zoom finder in the normal photographing mode to change the finder magnification separately of zooming of said zoom finder;

a second converter lens movable from a position out of the optical path of said zoom finder to a position in the optical path of said zoom finder in the trimming photographing mode to change the finder magnification separately of zooming of said zoom finder;

a first moving device which moves one of said first and second converter lenses to a position out of the optical path of said zoom finder by being interlocked with the rotation of said zoom ring in the driving range out of the normal photographing driving range; and a second moving device which moves the other of said first and second converter lenses to a position in the optical path of said zoom finder when said one of said first and second converter lenses is moved to a position out of the optical path of said zoom finder.

* * * * *